(12) United States Patent
Trappen et al.

(10) Patent No.: US 7,010,542 B2
(45) Date of Patent: Mar. 7, 2006

(54) RESULT SET FORMATTING AND PROCESSING

(75) Inventors: Anthony R. Trappen, Fargo, ND (US); Dempsey Swan, Fargo, ND (US); Raymond Holzhey, Hickson, ND (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 10/199,944

(22) Filed: Jul. 20, 2002

(65) Prior Publication Data

US 2004/0019599 A1 Jan. 29, 2004

(51) Int. Cl.
*G06F 17/30* (2006.01)

(52) U.S. Cl. .............................. 707/102; 707/1; 707/10; 709/217; 715/741

(58) Field of Classification Search ............... 707/1–10, 707/100–104.1, 200–206; 709/217, 219; 715/741
See application file for complete search history.

(56) References Cited

U.S. PATENT DOCUMENTS

| | | | | | |
|---|---|---|---|---|---|
| 5,630,127 | A | * | 5/1997 | Moore et al. | 707/103 R |
| 5,878,419 | A | * | 3/1999 | Carter | 707/10 |
| 6,035,300 | A | * | 3/2000 | Cason et al. | 707/102 |
| 6,615,214 | B1 | * | 9/2003 | Bird et al. | 707/100 |
| 6,839,701 | B1 | * | 1/2005 | Baer et al. | 707/3 |

* cited by examiner

*Primary Examiner*—Shahid Alam
*Assistant Examiner*—Jean Bolte Fleurantin
(74) *Attorney, Agent, or Firm*—Joseph R. Kelly; Westman, Champlin & Kelly, P.A.

(57) ABSTRACT

The select list for the query is thus constructed such that it produces a result set having a predefined structure. Columns representing identifier properties of an entity are added to the select list. If the entity is an inheritance entity or a collection, then entities from a least derived entity to all descendants are identified and columns representing their identifiers are added to the select list and columns representing non-inherited properties for those entities are added. If the entity is not an inheritance entity or a collection, then columns representing properties of the entity are added to the select list.

13 Claims, 41 Drawing Sheets

FIG. 5
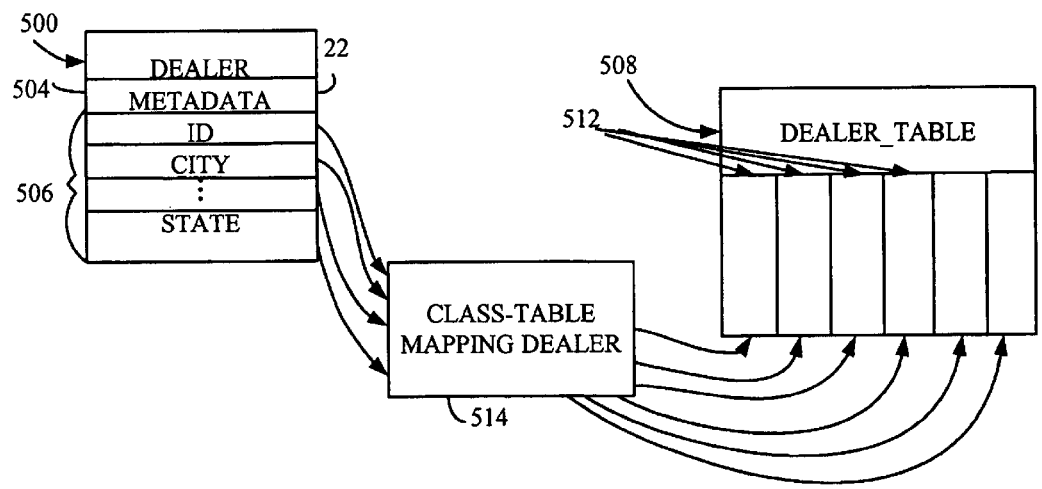
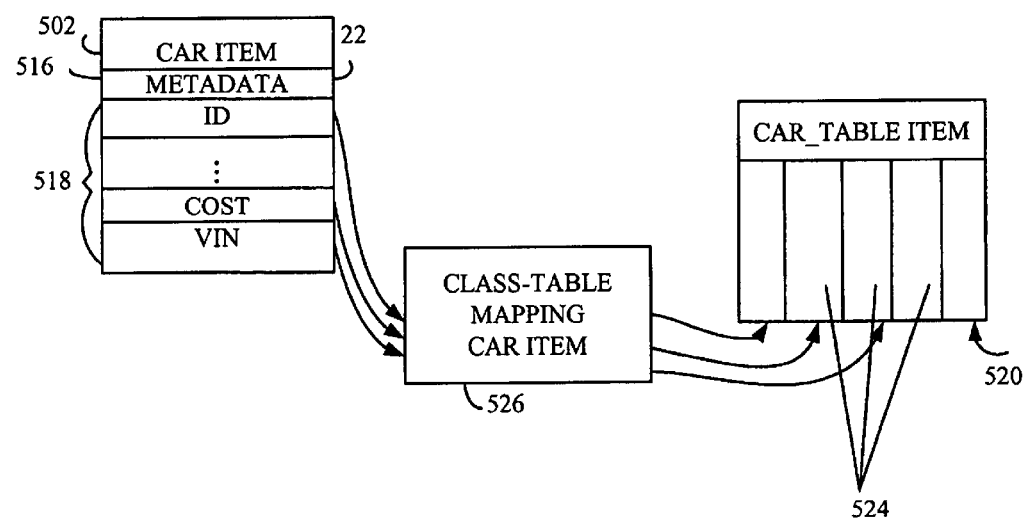

```
class CarItem {           // these properties are mapped to a database table
    public string ID
    public string Vin;
    public string Color;
    public decimal Cost;
    ... many others omitted ...
}
class Dealer {            // these properties are mapped to a different database table
    public string ID;
    public string City;
    public string State;
    ... many others omitted ...
}

AdHocQueryCriteria adHocCriteria = Criteria.AdHocQueryCriteria(
    Criteria.EntityAliases(    // describes the objects involved in the query
        Criteria.EntityAlias(itemParentKey, typeof(CarItem))
        Criteria.EntityAlias(dealerParentKey, typeof(Dealer)) ),
    Criteria.JoinList(
        /* entity to entity join */
        Criteria.InnerJoin("CarItem", "Dealer",
        (Property)"CarItem.DealerID" == (Property)"Dealer.ID")),
    Criteria.Select(          // the specific properties to retrieve
        (Property)"CarItem.ID",    // references the field in the above class
        (Property)"CarItem.Vin",
        (Property)"CarItem.Cost",
        (Property)"Dealer.ID",
        (Property)"Dealer.City",
        (Property)"Dealer.State"),
    Criteria.Where(
        (Property)"CarItem.Make" == "Geo" &&
        (Property)"CarItem.Model" == "Prism" &&
        (Property)"Dealer.State" == "ND")
    Criteria.OrderBy((Property)"Dealer.Cost"));
```

FIG. 6

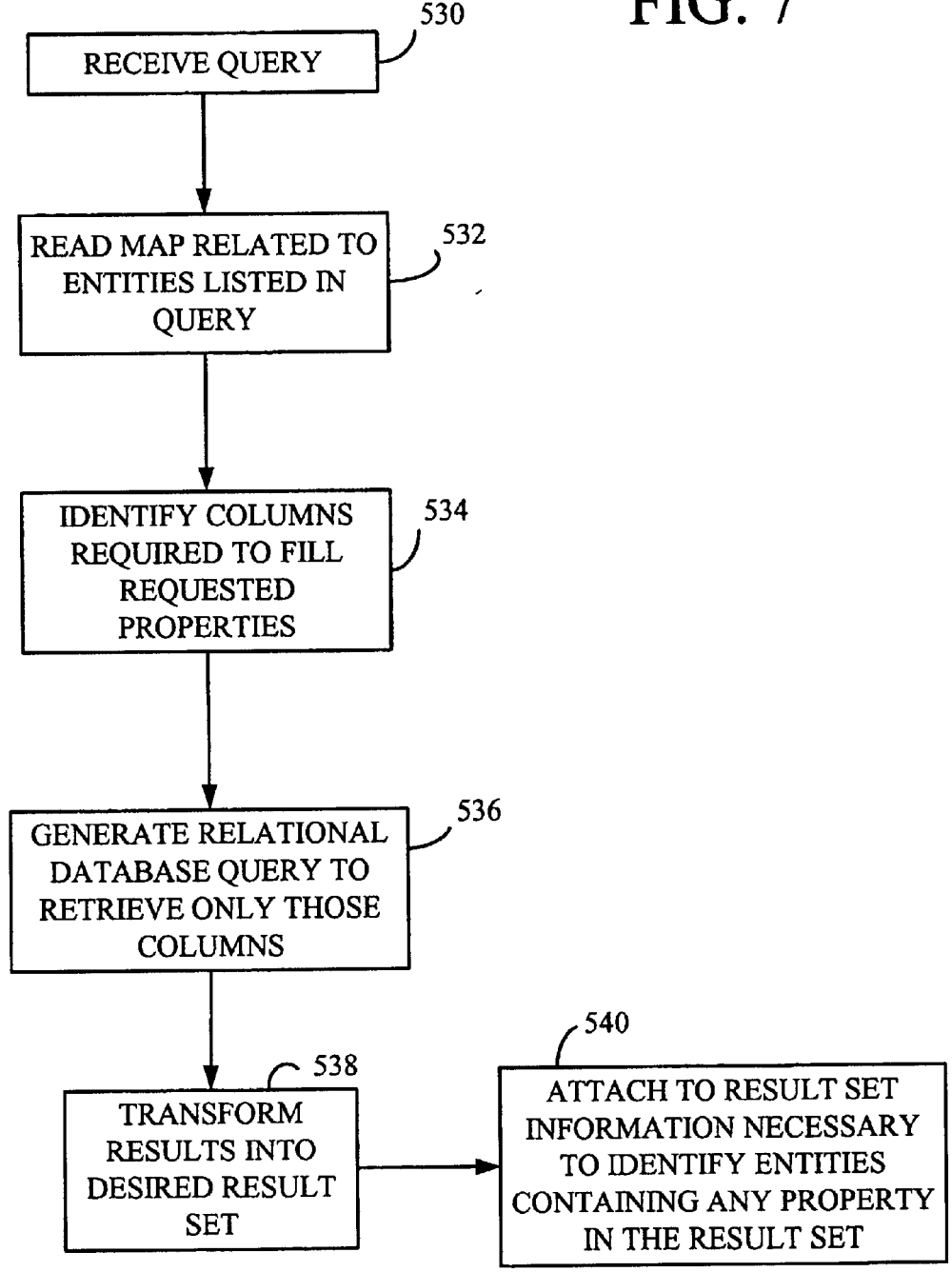

JOIN TYPE=INNER
EXPRESSION

INNER
EXPRESSION

INNER
EXPRESSION

LEFT DAG

RIGHT DAG

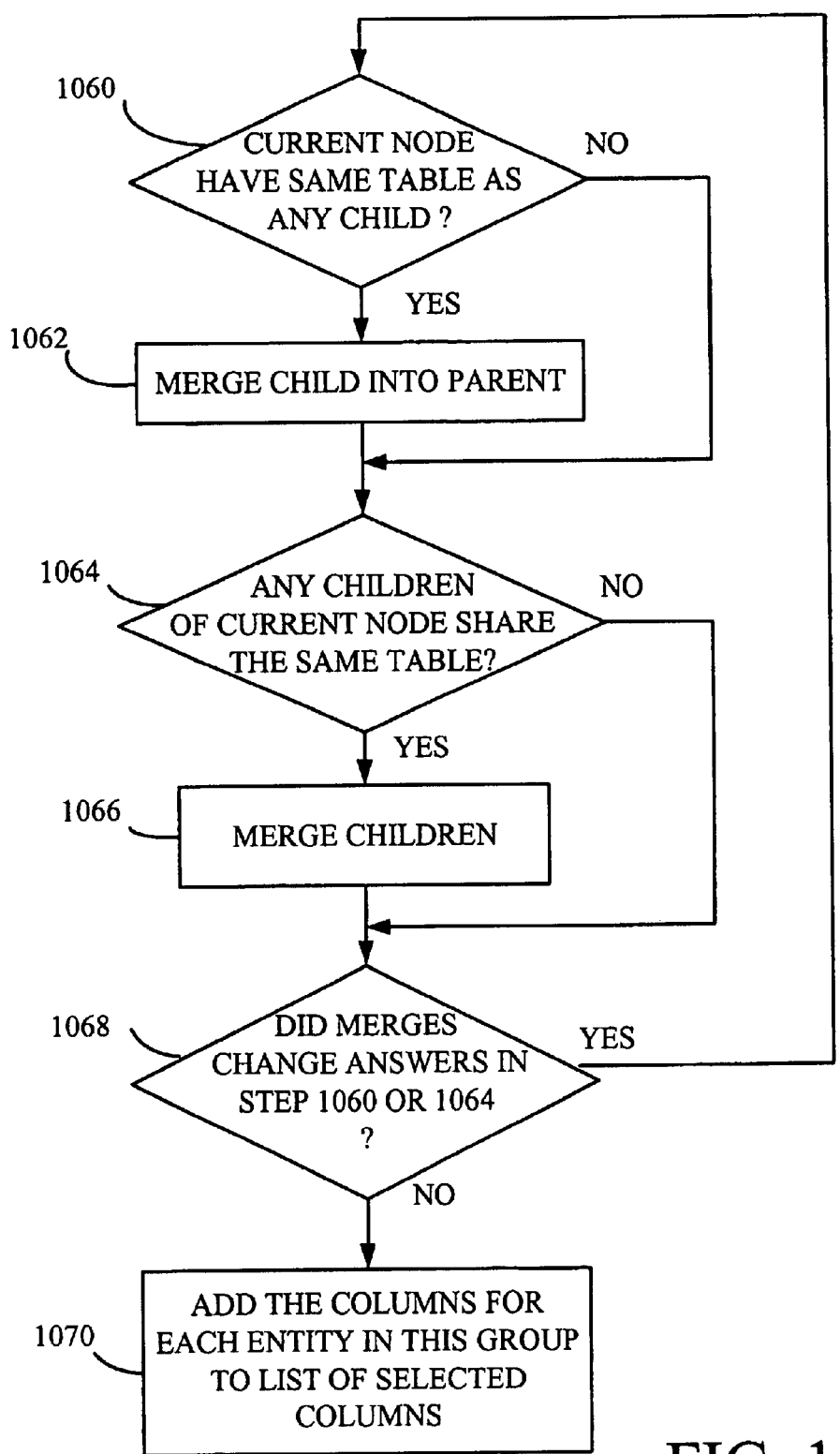
FIG. 18-A

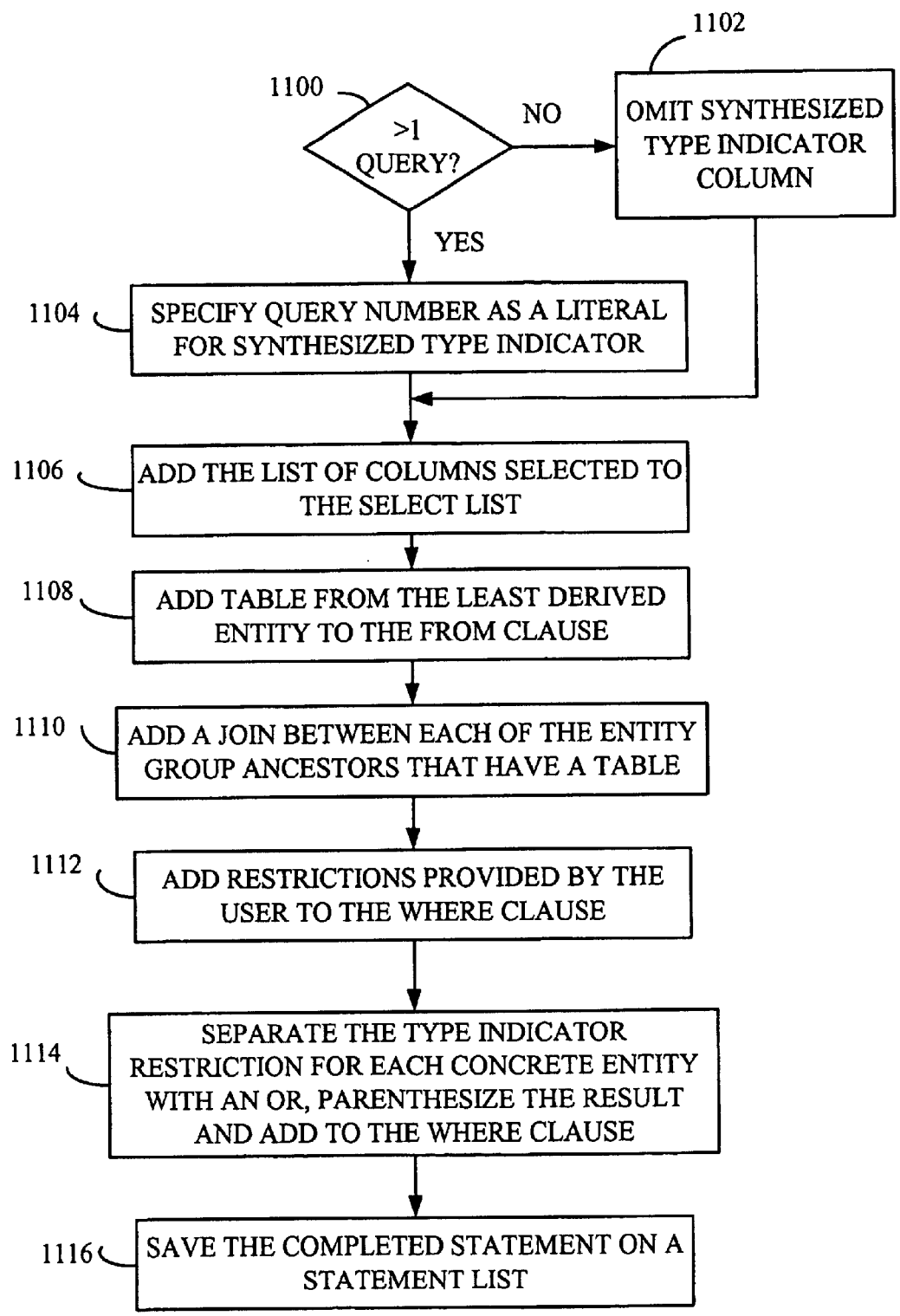
FIG. 18-B

FIG. 25

| ORDER DATE | ORDER DETAILS ID | ORDERDetails KEY FIELDS | ALL COLUMNS REPRESENTING SubstitutionsPrefs AND ITS PROPERTIES | ALL COLUMNS IDENTIFYING THE ENTITIES AND NON-INHERITED COLUMNS FOR PROPERTIES OF ALL ENTITIES IN THE INHERITANCE HIERARCHY FOR OrderDetails | ALL IDENTIFYING ENTITIES IN THE ITEMS COLLECTION AND NON-INHERITED COLUMNS FOR THE ITEMS COLLECTION | PARSE |

ORDER KEY FIELDS FOR ORDER 1160
1162

| TAX | SUBTOTAL | TOTAL | ALL COLUMNS IDENTIFYING ShippingPrefs AND COLUMNS FOR ITS PROPERTIES |

FIG. 25A

```
CLASS ORDER {
    ID
    DATE
    OrderDDetails
    Collection
    Tax
    Subtotal
    Total
    ShippingPrefs
}
```

FIG. 25B

```
CLASS OrderDetail {
    ID
    SubstitutionP
    refs
    Items
    Collection
    Misc
}
```

RESULT SET FORMATTING AND PROCESSING

BACKGROUND OF THE INVENTION

The present invention relates to database systems.

In conventional relational databases, all data are stored in named tables. The tables are described by their features. In other words, the rows of each table contain items of identical type, and the definitions of the columns of the table (i.e., the column names and the data types stored in the column) describe the attributes of each of the instances of the object. By identifying its name, its column names and the data types of the column contents, a table is completely described. Queries to a relational data base are formulated in a query language. One such language is SQL (Structure Query Language) which is widely used in commercial relational data base systems. The data types offered by SQL can be classified as character arrays (names), numbers, and data types related to date and time. Tables can be modified or combined by several operations of relational algebra such as the application of Boolean operators, projection (i.e. selection of columns) or the Cartesian product.

Relational databases offer several advantages. Data base queries are based on a comparison of the table contents. Thus, no pointers are required in relational databases, and all relations are treated uniformly. Further, the tables are independent (they are not related by pointers), so it is easier to maintain dynamic data sets. The tables are easily expandable by simply adding new columns. Also, it is relatively easy to create user-specific views from relational databases.

There are, however, a number of disadvantages associated with relational databases as well. For example, access to data by reference to properties is not optimal in the classical relational data model. This can make such databases cumbersome in many applications.

Another recent technology for database systems is referred to as object oriented data base systems. These systems offer more complex data types in order to overcome the restrictions of conventional relational databases. In the context of object oriented data base models, an "object" includes both data and the functions (or methods) which can be applied to the object. Each object is a concrete instance of an object class defining the attributes and methods of all its instances. Each instance has its unique identifier by which it can be referred to in the database.

Object oriented databases operate under a number of principles. One such principle is referred to as inheritance. Inheritance means that new object classes can be derived from another class. The new classes inherit the attributes and methods of the other class (the super-class) and offer additional attributes and operations. An instance of the derived class is also an instance of the super-class. Therefore, the relation between a derived class and its super-class is referred to as the "isA" relation.

A second principle related to object oriented databases is referred to as "aggregation." Aggregation means that composite objects may be constructed as consisting of a set of elementary objects. A "container object" can communicate with the objects contained therein by their methods of the contained objects. The relation between the container object and its components is called a "partOf" relation because a component is a part of the container object.

Yet another principle related to object oriented databases is referred to as encapsulation. According to encapsulation, an application can only communicate with an object through messages. The operations provided by an object define the set of messages which can be understood by the object. No other operations can be applied to the object.

Another principle related to object oriented databases is referred to as polymorphism. Polymorphism means that derived classes may re-define methods of their super-classes.

Objects present a variety of advantages. For example, operations are an important part of objects. Because the implementations of the operations are hidden to an application, objects can be more easily used by application programs. Further, an object class can be provided as an abstract description for a wide variety of actual objects, and new classes can be derived from the base class. Thus, if an application knows the abstract description and using only the methods provided by, the application can still accommodate objects of the derived classes, because the objects in the derived classes inherit these methods. However, object oriented databases are not yet as widely used in commercial products as relational databases.

Yet another database technology attempts to combine the advantages of the wide acceptance of relational data bases and the benefits of the object oriented paradigm. This technology is referred to as object-relational database systems. These databases employ a data model that attempts to add object oriented characteristics to tables. All persistent (database) information is still in tables, but some of the tabular entries can have richer data structure. These data structures are referred to as abstract data types (ADTs). An ADT is a data type that is constructed by combining basic alphanumeric data types. The support for abstract data types presents certain advantages. For example, the methods associated with the new data type can be used to index, store, and retrieve records based on the content of the new data type.

Some conventional object-relational databases support an extended form of SQL, sometimes referred to as ObjectSQL. The extensions are provided to support the object model (e.g., queries involving object attributes). However, these object-relational databases are still relational because the data is stored in tables of rows and columns, and SQL, with some extensions, is the language for data definition, manipulation, and query. Both the target of a query and the result of a query are still tables. The extended SQL language is often still the primary interface to the database. Therefore, there is no direct support of host object languages and their objects. This forces programmers to continue to translate between objects and tables.

Prior technologies have not readily enabled developers to work only with "entities" or "objects".

SUMMARY OF THE INVENTION

For developers to interact with a database only in terms of entities, a request expressed in terms of entities must be translated by a translator into a database request. For example when the database is a relational database, the request must be translated into a relational database select statement and sent to the relational database server for execution. The result set for the query returned by the relational database server must be processed to create appropriate entities.

The select list for the query is thus constructed such that it produces a result set having a predefined structure. Columns representing identifier properties of an entity are added to the select list. If the entity is an inheritance entity or a collection, then entities from a least derived entity to all descendants are identified and columns representing their identifiers are added to the select list and columns representing non-inherited properties for those entities are added. If the entity is not an inheritance entity or a collection, then columns representing properties of the entity are added to the select list.

BRIEF DESCRIPTION OF THE DRAWINGS

FIG. 5 illustrates a plurality of class-table mappings for different exemplary entities.

FIG. 6 illustrates an ad hoc query.

FIG. 7 is a flow diagram illustrating the operation of a data access system in performing an ad hoc query.

FIGS. 10A-C-2 are flow diagrams showing a process for building a directed acyclic graph (DAG) from a parse tree.

FIGS. 18-1 and 18-2 are flow diagrams illustrating portions of FIG. 18 in greater detail.

FIG. 25 is an exemplary select list containing columns for the objects in FIG. 24 that are to be queried.

FIGS. 25A and 25B show the class definitions (pseudo-code) for the objects.

DETAILED DESCRIPTION OF ILLUSTRATIVE EMBODIMENTS OVERVIEW

It should be noted that the inventive features of the invention can be applied to O-R databases or relational databases, because the invention bridges the capabilities of both types of databases as well as the capabilities of object oriented programming languages. The result is an O-R database system that provides significant advantages over prior database technology. It will be described herein in terms of applying to an O-R database, for the sake of illustration only, as it is equally beneficial for relational databases.

Figure 1:
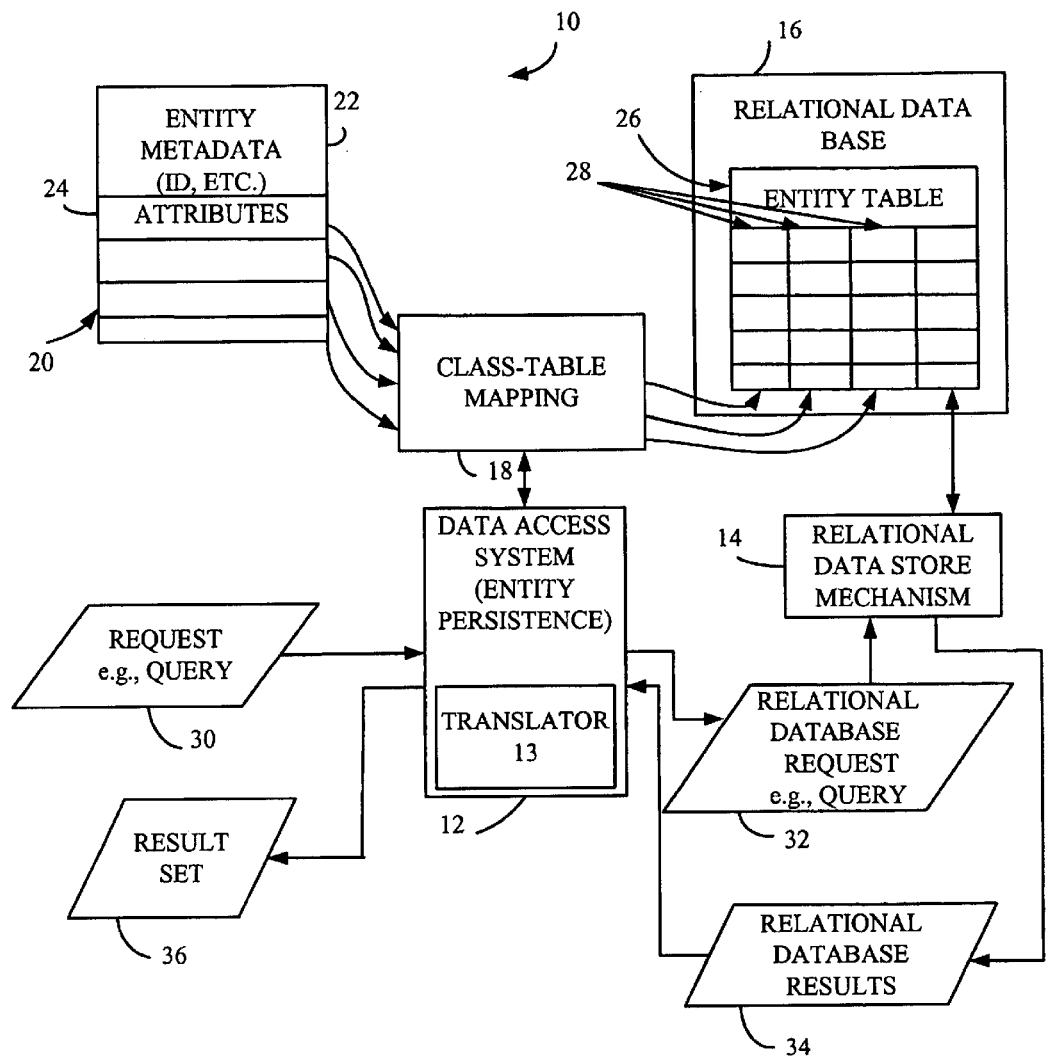
FIG. 1 is a block diagram of one embodiment of an object-relational data storage system.

FIG. 1 is a block diagram illustrating one embodiment of a data storage and accessing system 10 in accordance with the present invention. System 10 includes data access system (or entity persistence system) 12, relational data store mechanism 14, relational database 16, and class-table mapping 18. System 10 is illustratively an object-relational (O-R) data storage system in which stored data can be referred to in terms of entities (or objects) and their properties, rather than elements of the data base schema, such as tables and columns. FIG. 1 illustrates one mechanism for doing this.

As shown in FIG. 1, the data can be organized in terms of entities 20 (which is used interchangeably herein with the term objects). Each entity illustratively includes a metadata portion 22 and a remaining attributes portion 24. The metadata portion 22 describes the entity 20, while the remaining attributes 24 define further attributes of entity 20, such as the data stored therein. Each of the attributes in entity 20 is mapped to a corresponding entity table 26 and a specific column 28 in a given entity table 26.

Data access system 12 can receive various forms of requests such as a query 30 which specifies an entity, or portions of an entity or group of entities, to be retrieved. Query 30 can illustratively be expressed in terms of objects ("entities") and properties, rather than in terms of tables and columns. The particular manner in which queries are expressed is described in greater detail below.

In any case, data access system 12 receives the query 30 and accesses class-table mapping 18. In this way, data access system 12 can determine the location of the data for the entities identified by query 30. Data access system 12 includes a translator 13 that translates query 30 into a relational database query 32 which is suitable for input to relational data store mechanism 14. In one illustrative embodiment, relational data store mechanism 14 is a SQL SERVER database server such as that available from the Microsoft Corporation of Redmond, Wash., that accesses a relational database 16. Therefore, data access system 12 receives queries 30 in terms of objects and translates those queries into an appropriate relational database query 32 that is then provided to the data store mechanism (or server) 14 which actually accesses the data in relational database 16.

Relational data store mechanism 14 retrieves the requested data and returns it in the form of relational database results 34. The results are returned to data access system 12 which then formulates the relational database results 34 into a requested result set 36. In one illustrative embodiment, result set 36 is requested in query 30. Query 30 may request that the results be output in the form of one or more objects or simply as a data set. In any case, data access system 12 arranges the relational database results 34 into the proper format and outputs them as result set 36. Data access system 12 hides the physical data store (mechanism 14 and database 16) from the users and developers enabling them to work in terms of entities rather than requiring them to know both the schema of database 16 and the syntax of the particular data store mechanism 14. Before describing this in greater detail, FIG. 2 shows one embodiment of an environment in which the present invention can be used.

Figure 2:
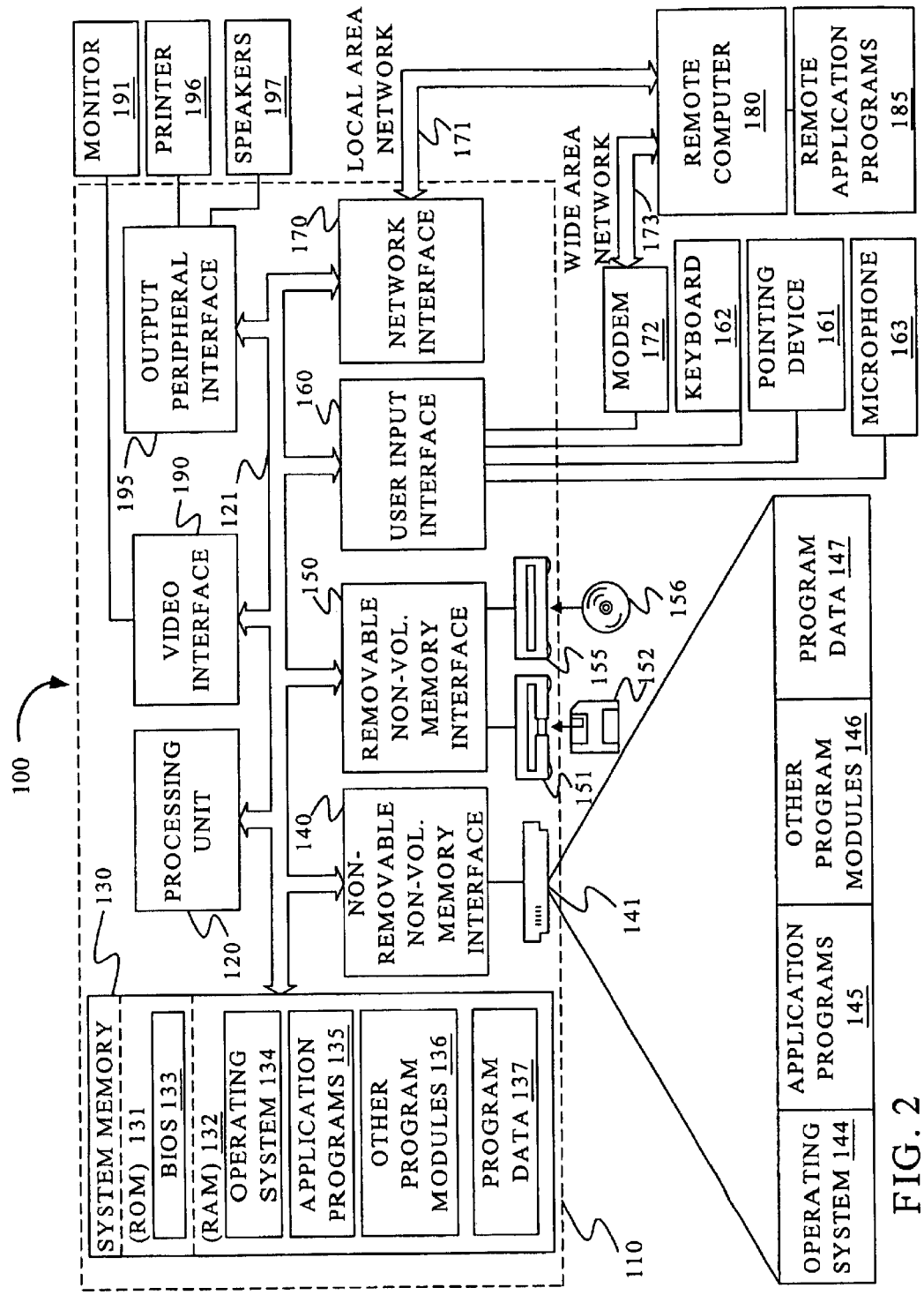
FIG. 2 is a block diagram of an environment in which the present invention can be used.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 2. However, the present invention can be carried out on a server, a computer devoted to message handling, or on a distributed system in which different portions of the present invention are carried out on different parts of the distributed computing system.

Criteria Object Model

Figure 3:
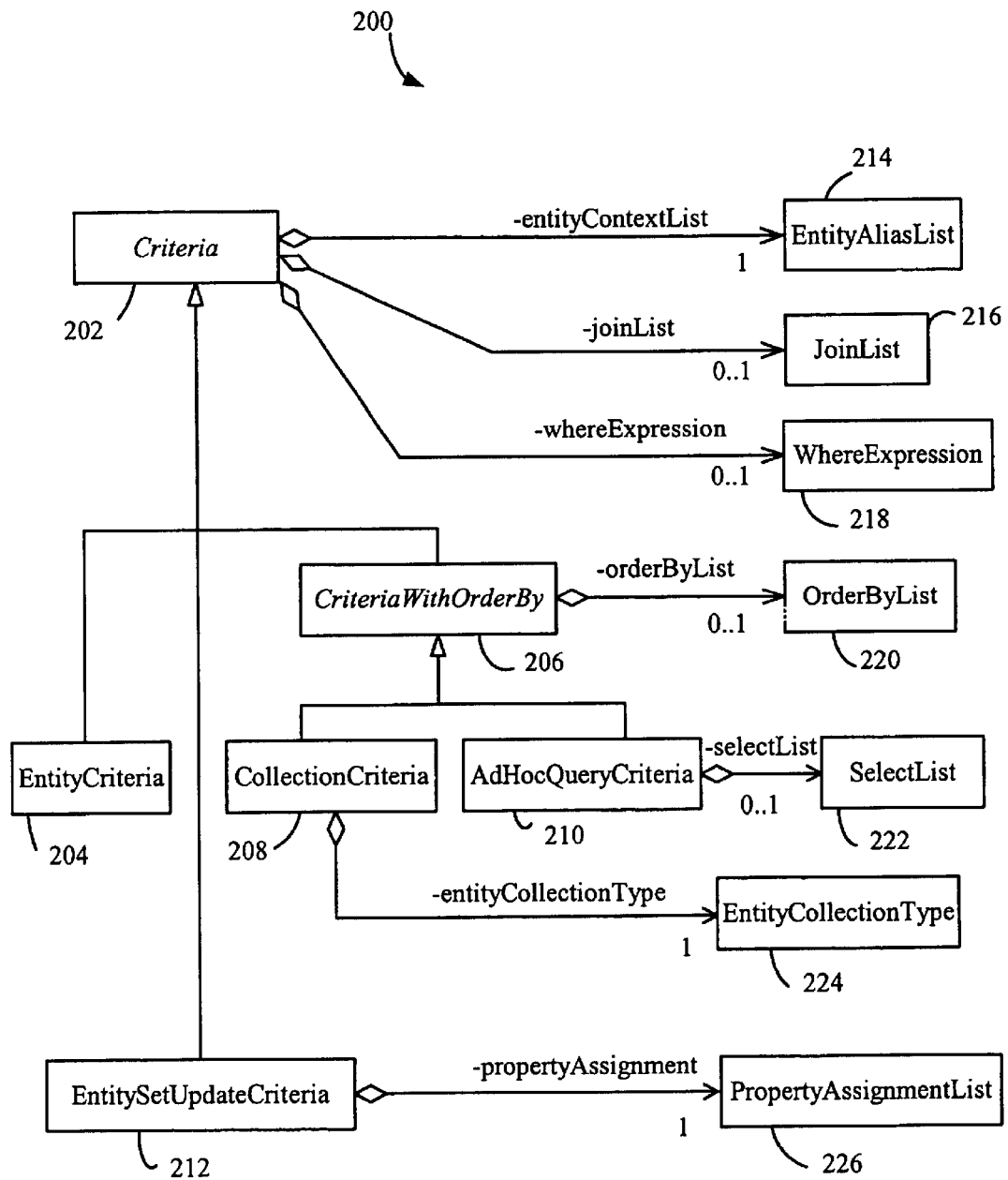
FIG. 3 is a UML object model class diagram in accordance with one embodiment of the present invention.

FIG. 3 shows a UML class diagram implemented by data access system 12. The class diagram shown in FIG. 3 defines what is referred to as a criteria subsystem 200. Criteria subsystem 200 enables users and developers to define criteria, which describe the entity or entities being queried, updated or deleted; or the entity or entities on which set operations are being performed. Each of the objects in FIG. 3 includes an application programming interface that exposes a variety of different methods which are described in greater detail in Appendix A hereto. A number of the features of the various objects, and methods exposed thereby, are discussed in the body of this description for the sake of clarity.

Object model 200 includes the following classes: Criteria 202, EntityCriteria 204, CriteriaWithOrderBy 206, CollectionCriteria 208, AdHocQueryCriteria 210, EntitySetUpdateCriteria 212, EntityAliasList 214, JoinList 216 WhereExpression 218, OrderByList 220, SelectList 222, EntityCollectionType 224 and PropertyAssignmentList 226.

In the diagram shown in FIG. 3, the hollow arrows define an "IS A" relationship. For example, EntityCriteria is a Criteria, and EntitySetUpdateCriteria is also a Criteria. The connectors having a diamond at one end and an open arrow at the other end illustrate that the class which is pointed to by the diamond holds a reference to the class that is pointed to by the open arrow. Thus, the Criteria class holds a reference to the EntityAliasList class. The numerals adjacent the open arrows indicate the number of references which are held. Therefore, each Criteria class 202 holds a reference to an EntityAliasList 214 and can hold a reference for up to one JoinList 216 and WhereExpression 218.

Criteria class 202 is the abstract base class for which each of the concrete criteria classes (EntityCriteria 204, CollectionCriteria 208, AdHocQueryCriteria 210, and EntitySetUpdateCriteria 212) are derived either directly or indirectly. Criteria class 202 holds references to instances of EntityAliasList 214, JoinList 216 and WhereExpression 218 which are exposed through public properties with the same names.

Criteria class 202 also defines a large set of static methods that are used to create Criteria instances and the components that are stored in them. These are described in greater detail in the Appendix. The constructors of all public Criteria classes are internal. This means that all users of Criteria 202 must use the static methods of the abstract Criteria class for instance creation. Criteria 202 cannot be instantiated since it is abstract.

EntityCriteria 204 is used to specify a single entity for retrieval. It is derived directly from the abstract Criteria 202, and thus inherits the EntityAliasList 214 referenced by Criteria 202 as well as the JoinList 216 and WhereExpression 218 properties referenced by Criteria 202. An instance of EntityCriteria 214 can be created by creating an EntityKey from which an EntityAliasList 214 and a WhereExpression 218 are internally generated, or by providing the instance of EntityAliasList 214 and WhereExpression 216 directly.

CriteriawithOrderBy 206 is derived from the abstract Criteria class 202 and thus inherits the properties referred to by Criteria 202. CriteriaWithOrderBy 206 holds a reference to an instance of OrderByList 220 which is exposed by a public property. CriteriaWithOrderBy 206, as with criteria 202, cannot be instantiated since it is abstract.

CollectionCriteria 208 is used for the retrieval of a collection of entities. It is derived from CriteriaWithorderBy 206, inheriting the EntityAliasList 214, JoinList 216, WhereExpression 218 and OrderByList 220 properties of CriteriaWithOrderBy 206 and Criteria 202. CollectionCriteria 208 adds an EntityCollectionType 224 which is exposed as a public property as well.

AdHocQueryCriteria 210 is used for the retrieval of entity data. It allows the user to combine the data of multiple entities of different types into a single result row with only the properties of interest included. The results of an AdHocQueryCriteria 210 query are returned in the form of a tabular result (or data) set, such as, for example, a Microsoft ADO.NET DataSet. The AdHocQueryCriteria 210 is derived from the abstract CriteriaWithOrderBy 206 class inheriting the properties EntityAliasList 214, JoinList 216, WhereExpression 218, and OrderByList 220. AdHocQueryCriteria 210 adds a SelectList 222 which is exposed as a public property. A number of instances of AdHocQueryCriteria 210 are given in the Appendix. Also, AdHocQueryCriteria 210 is discussed in greater detail with respect to FIGS. 5–7 below.

EntityAliasList 214 is used to contain a list of entity aliases (parent key, entity type pairings) that are used with instances of Criteria 202. The entity alias list associated with an instance of Criteria 202 enables data access system 12 to determine which server and database to work with, and which maps 18 to use for mapping entity properties to the database tables and columns. It also allows specifying the same entity with different names ("aliases") so that things such as self-joins can be performed. For EntityCriteria 204, the EntityType indicates the type of entity to instantiate. For CollectionCriteria 208, it indicates the type of entities to instantiate and put in a collection. Also, the entity type can be a base type. Therefore, the instances that are put into the collection may actually be descendents of an indicated entity type. For all types of Criteria 202 multiple entity aliases can be passed to the EntityAliases clause upon creation of Criteria 202. This allows all types of Criteria 202 to make explicit joins to arbitrary entities.

JoinList 216 is used to contain a list of explicit joins for an instance of Criteria 202. Each join includes a join type (such as inner, left, or right), a left alias name, a right alias name, and a Boolean expression that defines the relationship between the entities involved in the join.

WhereExpression 218 is used to specify the entity of interest. For CollectionCriteria 208, it is used to specify a set of entities. For AdHocQueryCriteria 210 it specifies the data rows to retrieve.

OrderByList 220 is used to define the sort order of the collection retrieved for a CollectionCriteria, or the sort order of the returned tabular result (or data) set rows for an AdHocQueryCriteria 210. The list contained in OrderByList 220 includes a list of properties or select list aliases. Each of these can be followed by an optional sort type indicator, such as ascending or descending.

SelectList 222 is used in the AdHocQueryCriteria 210 to define the columns that will appear in the resulting data set. A SelectList 222 can contain properties or expressions and each of these can be followed by an optional alias. An alias acts as an alternate name for the property or expression that follows. The aliases can also be used in the OrderByList 220.

EntityCollectType 224 is used to define the container type of a collection of an instance of CollectionCriteria 208. In other words, it defines the system type of the collection in which the retrieved entities are to be placed.

EntitySetUpdateCriteria 212 is used to update a set of entities. It allows the user to modify one or more properties of similarly constructed entities. The operation is similar to modification of data in one or more columns with respect to a set of rows, and in effect, EntitySetUpdateCriteria accomplishes that purpose in the database. However, instead of referencing in the modification request based on columns of the database, referencing is provided by entity properties.

EntitySetUpdateCriteria 212 is derived from the abstract Criteria 202 inheriting the properties EntityAliasList 214, JoinList 216 and WhereExpression 218. EntitySetUpdateCriteria 212 adds a PropertyAssignmentList 226, which is exposed as a public property. A number of instances of EntitySetUpdateCriteria 212 are given in the Appendix. Also, EntitySetUpdateCriteria is discussed in greater detail with respect to FIGS. 14–15 below.

Expressions

Current object-relational systems embody query languages that are usually textual. Textual queries have two well-known problems, which include that the syntax of the text is not verified until the query is run rather than at compile time like most program text, and that the queries are created through string concatenation. The resulting concatenated query string is difficult to read, particularly when expressions (boolean, arithmetic, relational, etc.) are embodied in the query.

Expressions are present in many components of object model 200. For instance, expressions can be present in JoinList 216, WhereExpression 218 and PropertyAssignmentList 226, to name a few. For the same purpose that the properties of the entities are translated by data access system 12 to determine a relational database request 32 that is suitable for input to relational data store mechanism 14 to retrieve the data or perform some other data operation, so too must the expressions used by criteria 200 be understood and translated to suitable expressions for relational data store mechanism 14.

Generally, as will be explained below, rather than representing a query with text, a query in the present system is represented by a parse tree constructed by the developer using an object model. Building an expression with an object model can be cumbersome so, in one embodiment, operator overloading can be used so that the developer can write or express natural looking expressions. A compiler at compile time is used to provide code that causes the parse tree to be generated at runtime. In order to accomplish this task, the compiler must build its own parse tree for the expression, which consequently has the beneficial effect of validating the expressions and ensuring that the code that is provided to build the parse tree will build a well-formed expression. A parse tree for an expression is a well-understood structure, which can then be used during translation to formulate expressions in the relational database language suitable for relational data store mechanism 14.

Generally, expressions comprise one or two operands and an operator. Depending on the operator, unary and binary expressions can be formed. A unary expression comprises an operator and one operand, while a binary expression comprises an operator and two operands, generally denoted as a "left operand" and a "right operand".

Operator Overloading

Operator overloading is a generally well-known technique used in programming languages. All unary and binary operators have predefined implementations that are automatically available in any expression. In addition to the predefined implementations, user defined implementations can also be introduced in some programming languages, for example Visual C#™ by Microsoft Corporation of Redmond, Wash. The mechanism of giving a special meaning to a standard operator with respect to a user defined data type such as classes or structures is known as operator overloading.

Generally, operator overloading entails providing a routine for each user defined operator. An exemplary call statement (pseudo-code) could be as follows:

Operator_+ (Left Operand, Right Operand, Result)

where the "Left Operand" and the "Right Operand" are provided as input to a routine herein identified as "Operator_+", which returns a "Result". However, typically operator overloading is used such that the Result obtained is in accordance with execution upon the Left Operand and the Right Operand. In contrast, in the present system, operating overloading is not used to operate on the operands, but rather, to obtain the intent of the expression during compile time and defer execution of the expression. Deferment is required because operator overloading is used to provide code to create a parse tree for the expression, where the parse tree is then translated and actually executed during run time by the data store mechanism 14.

Figure 4A:
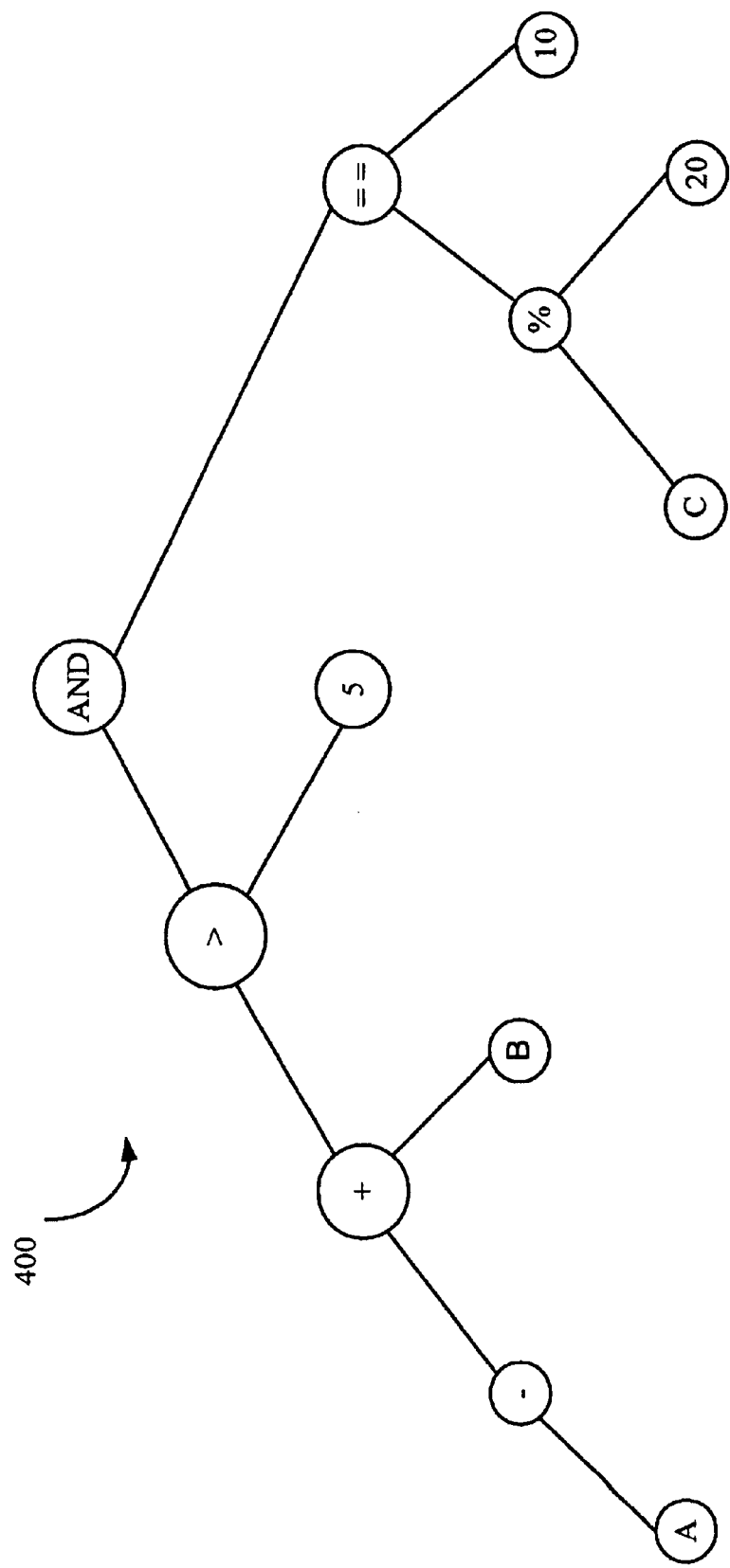
FIG. 4A is an exemplary parse tree.

For example, a parse tree 400 for the expression:

((−A+B)>5) AND ((C % 20)==10)

is illustrated in FIG. 4A. The system will defer execution by using the operators, such as the "+" operator, not to provide the code that will add "−A" and "B", but rather to provide the code that will create a node in the parse tree. Likewise, corresponding nodes would be created for various forms of terminals in the expression such as "5", "10", which herein are denoted as literals, or "A", "B", which would be representative of data members such as properties. It should also be noted that the expressions present in Criteria 200 are not parsed by the system at run time, but rather are parsed by the compiler at compile time. In particular, the compiler parses each expression and provides code that calls the predefined operator overloads at the correct time during runtime (so that the operator overloads generate pieces of the runtime parse tree), and eventually all the code needed to build a complete parse tree at runtime has been provided upon the compiler's completion of parsing the expression. This technique is particularly advantageous because the compiler will inform the developer when mistakes are present in the expression. In this manner, the developer is forced to correct the expression, thereby avoiding many errant expressions, which would otherwise only be found during execution of the application.

Figure 4B:
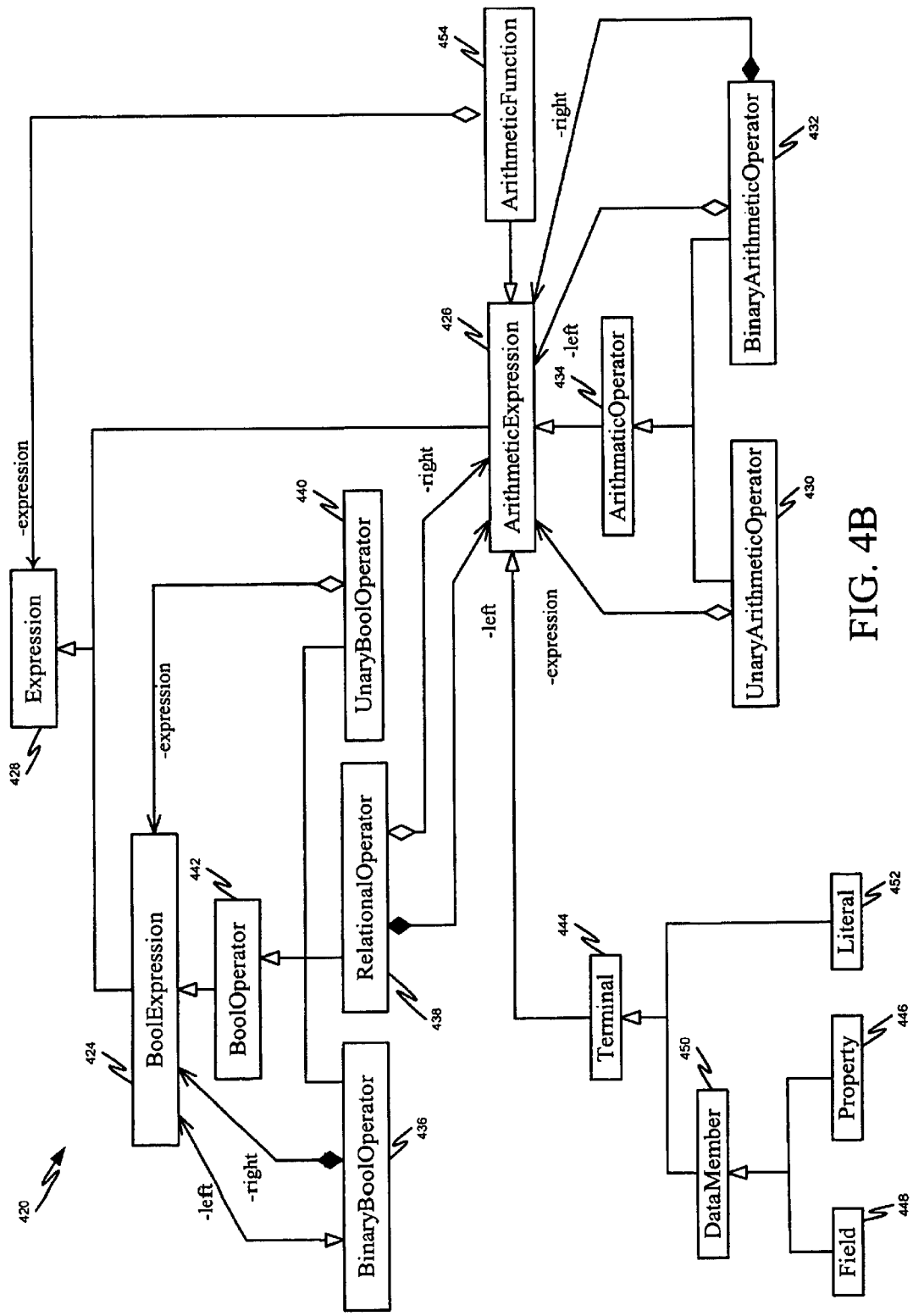
FIG. 4B is a UML object model class diagram for expressions.

FIG. 4B, illustrates the object model or class hierarchy 420 that is embodied in the operator overloading calls made by the compiler for processing an expression. The symbols present in FIG. 4B correspond to the symbols used in FIG. 3. In particular, the hollow arrows define an "IS A" relationship. For example, a Boolean expression 424, or an Arithmetic expression 426 are forms of expressions 428. Likewise, a Unary Arithmetic operator 430 or a Binary Arithmetic operator 432 are each forms of Arithmetic operators 434, which in turn is a form of the Arithmetic expression 426.

The connectors having a diamond at one end and an open arrow at the other end illustrate that the class, which is pointed to by the diamond holds a reference to the class that it is pointed to by the open arrow. The "left" and "right" notations denote the presence of left and right operands, respectively. The notation "expression" denotes the expression upon which the operator operates, while the numeral "1" indicates that the corresponding "left operand", "right operand", or "expression" is required. For example, Bool-Expression 424 requires left and right operands with a Binary Boolean operator 436 (e.g. AND, OR).

Completing the hierarchy of object model 420, Binary Boolean operator 436, Relational operator 438 and Unary Boolean operator 440 are each forms of Boolean operator 442. Terminal 444, which is a form of an Arithmetic expression 426, includes object properties 446 and fields 448 through a more general class of Data Member 450. Constants 452 can also be part of an expression and in the model of 420 are a form of a Terminal 444. An Arithmetic function 454 (SUM, MAX, MIN, etc.) is also a form of an Arithmetic expression 426.

Since the operator overload calls define specifically how many parameters must be present and of which type each parameter must be, the compiler, at compile time, properly evaluates the expression and indicates to the developer when errors are present.

The operator overload calls or methods are defined in the Appendix in accordance with the object model 420 illustrated in FIG. 4B. As indicated above, each of the operator overloads provides nodes of the corresponding parse tree for the parts of and eventually the whole expression. Each of the nodes comprises an object with the nodes comprising terminals or operators with connections formed by the presence of required left, right or unary operands or expressions. Another example may be helpful in further illustrating how a parse tree is formed from an expression.

Given the expression:

(Property) "CarItem.Cost">=15000 m &&

(Property) "CarItem.Sales"−

(Property) "CarItem.Discounts">1000000 m &&

(Property) "Dealer.State"=="ND"

Figure 4C:
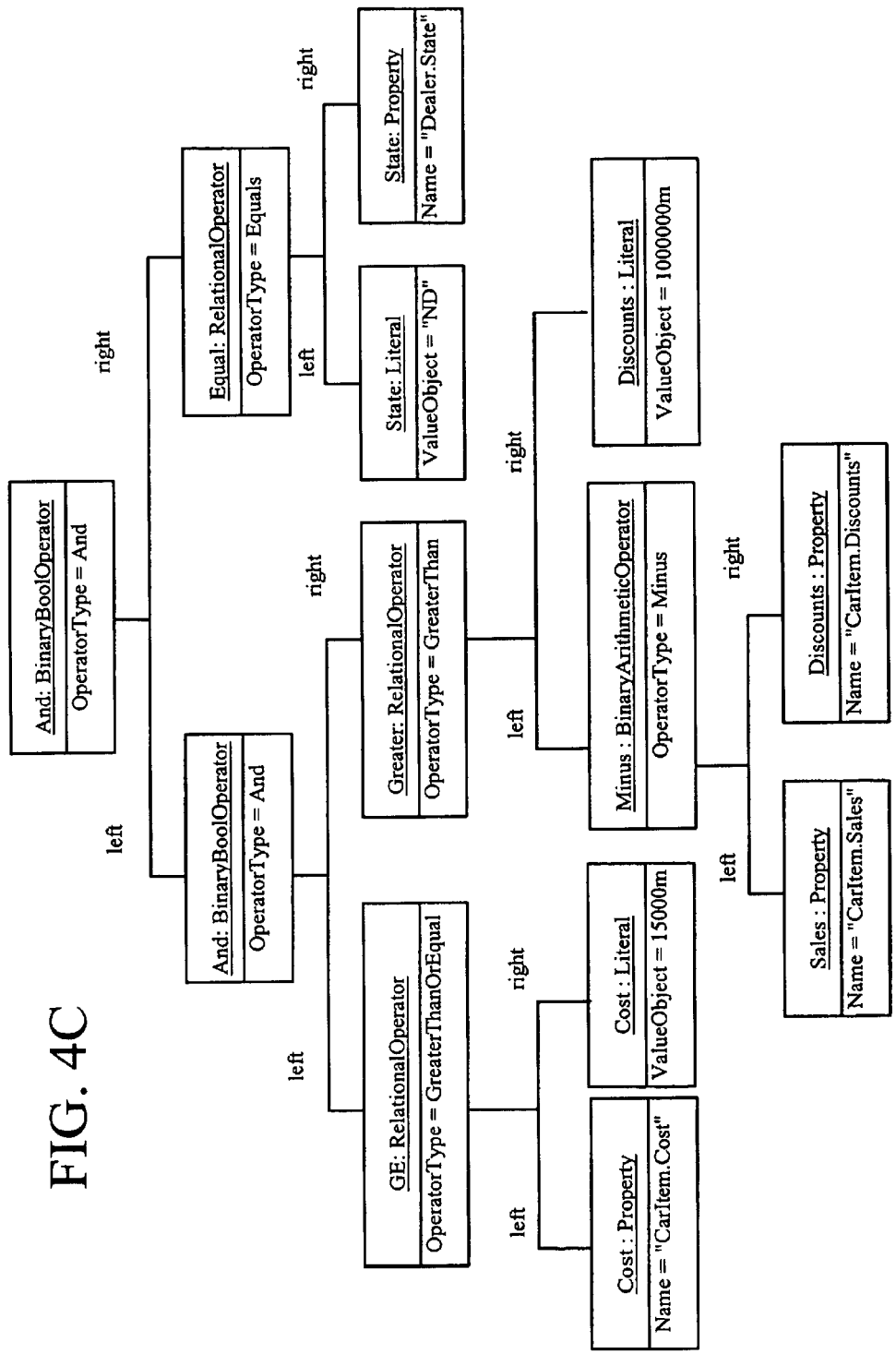
FIG. 4C is an exemplary parse tree with objects.

According to the object model 420 illustrated in FIG. 4B, this expression would form a parse tree 480 illustrated in FIG. 4C. Each box in FIG. 4C represents an object in memory and the lines represent references between the objects. Each expression object (i.e. the parse tree) would be assigned to the corresponding component of the Criteria object so that it can be accessed during translation. Referring back to FIG. 1, each query or other form of requested operation would have completely parsed expressions before the request 30 is even given to data access system 12.

It should be noted that in one embodiment, the compiler applies its precedence rules to the operators of the expression that it is evaluating when providing code to make the operator overload calls that form the runtime parse tree. Thus, again, evaluation of the expression is performed by the compiler, and in particular, whether to evaluate one operator before another operator in a given expression. For example, operators "*" or "/" are commonly evaluated in an expression prior to the operators "+" or "−". However, the expression can include parentheses as required by the developer to ensure desired evaluation or to depart from normal precedence rules. In other words, the compiler is used to perform lexical analysis and enforce well-formed expressions.

It should be also noted that the parse tree is but one form that can be used during translation of the expression. In other embodiments, the compiler can again be used for purposes of applying precedence in evaluation and enforcing proper expression by checking for the presence of the required number and type of the operands made with each operator overload call, but another form of output such as a text string could be outputted by the operator overload routine and then evaluated during translation of the query or other requested operation.

AD Hoc Queries

A number of problems exist with conventional query capabilities in existing object-relational technologies. For example, complete objects are returned even when only a small number of attributes or properties of an object may be desired. This places unnecessary stress on the system. Similarly, since conventional approaches read and write fields rather than properties, developers must expose the internal representation of their class to those performing queries. Similarly, in conventional technologies, only a single object is returned unless a parent/child relationship exists. Joins of the sort commonly used in relational query languages cannot be used to return properties from more than one entity using conventional object-relational technology.

AdHocQueryCriteria 210 addresses one or more of these problems. AdHocQueryCriteria 210 returns property values based on an input query and not the entire objects containing those property values. Similarly, it allows the return of data from any number of objects. These features are described in greater detail with respect to FIGS. 5–7.

As discussed above, rather than returning an entire object (or "entity") AdHocQueryCriteria 210 returns only a data set. This can be an enhanced result set that also contains the metadata for the entity or entities from which the values were obtained. Therefore, any special processing requirements associated with an underlying entity can be performed, or the underlying entity itself can be obtained, when necessary.

An example may be helpful. FIG. 5 illustrates two business objects, or entities, referred to as a "Dealer" entity and a "CarItem" entity. The Dealer entity is indicated by number 500 and the CarItem entity is indicated by number 502. Dealer entity 500 includes a metadata portion 504, and a plurality of attributes or properties 506. Properties 506 include, by way of example, an identifier (ID), a cost, a city and a state. Dealer entity 500 may, for the sake of this example, represent an automobile dealer in a business database. Entity 500 is mapped to a Dealer_Table 508 in a relational database. Table 508 includes a plurality of columns associated with each of the attributes 506 in entity 500. For example, Attributes 506 are illustratively mapped to columns 512 in table 508. The class-table mapping of Dealer entity 500 is provided in mapping 514.

Similarly, CarItem 502 includes a metadata field 516 and a plurality of attributes 518 which include, for example, an ID, and a vehicle identification number (VIN) property. Entity 502 thus, for example, represents an automobile which is in stock at a given dealer. Entity 502 is mapped to a CarItem_Table 520 in a relational database by class_table mapping 526. Each of the attributes are mapped to columns in table 520. Thus, for example, first attribute attributes 518 are mapped to columns 524 in table 520.

An example of AdHocQueryCriteria 210 is shown in FIG. 6. It can be seen that the first portion of FIG. 6 simply defines the class CarItem which is stored in the CarItem table 520 in the database. The second portion of FIG. 6 defines the class Dealer 500 which is stored in the Dealer_Table 508 in the database. These two business objects (or entities) are mapped to the database by maps 514 and 526, respectively.

Next in FIG. 6 the actual query is stated. The first criteria statement indicates that the query is an AdHocQuery and the following Criteria.EntityAlias statements identify the objects or entities involved in the query. The JoinList statement identifies entities that are joined to other entities in the query. The portion in the box illustrates the selection of several properties from the entities, rather than the entire entities.

The "Where" statement further defines the specific data to be obtained. It can thus be seen that the two entities involved are the CarItem entity and the Dealer entity. The JoinList indicates that an inner join is performed between CarItem and Dealer where the CarItem ID matches the Dealer ID.

The specific properties which are to be retrieved from these entities are the car item ID, cost and VIN properties and the dealer ID, city and state properties.

The Where statement further defines the properties to be retrieved as those in the CarItem entities where the make is indicated as a "Geo" and the model is indicated as a "Prism" and where the designated properties in the Dealer entity indicate that the dealer is from "ND".

In order to retrieve this data, data access system 12 first receives the query. This is indicated by block 530 in FIG. 7. Next, data access system 12 reads the maps 514 and 526 which are related to the entities listed in the query. This is indicated by block 532 in FIG. 7. Based on maps 514 and 526, data access system 12 then identifies columns in the associated tables that are required to fill the requested properties (those properties requested in the queries). This is indicated by block 534 in FIG. 7.

Based on the identified columns, data access system 12 then generates a relational database query 32 (shown in FIG. 1) which is applied against relational data store mechanism 14 (also shown in FIG. 1) to retrieve only the desired columns. Generating the relational database query is indicated by block 536 in FIG. 7.

Data access system 12 then receives the relational database results and transforms those results into the desired result set. This is indicated by block 538 in FIG. 7. Recall that it may be desirable to have such a result set be enhanced to not only include the requested data, but to include at least an identity of the source entity from which the data was retrieved such that any special processing can be performed, or such that the entity, itself, can be retrieved in full. Thus, data access system 12 illustratively attaches to the result set information (such as metadata) necessary to identify the entity containing any property that is returned in the result set. Of course, metadata is data about fields, properties and classes themselves. For example, metadata about a class includes its name, type, what properties and methods it contains, etc. . . This allows programs to learn about, and interact with, instances of a class at runtime, rather than requiring that knowledge to be pre-recorded in the program. While the metadata is shown as part of the entity in FIG. 1, it is in most embodiments not stored in database 16 but is maintained by system 12 instead. This is indicated by block 540. The result set is thus illustratively in terms of property values and property names instead of column values and column names. However, the results are also only the desired data and not the entire object.

Translation

Join Translation

As discussed with respect to FIG. 1, data access system 12 translates query 30 into a relational database query 32 which is applied to relational data store mechanism 14. In many instances, the translation is simple and straight forward. However, there are a number of areas in which translations can be quite difficult.

For example, there will be times when a developer wishes to join two objects by any arbitrary property on those objects. In that case, in query 30, the developer specifies which properties on either object they wish to join, and can include any arithmetic operators, relational operators, Boolean operators, unary operators, etc., as necessary. In doing so, the developers may express the queries in terms of qualified object references combined with expressions separated by the operators. The qualified object references thus require implicit joins, since the joins are not explicitly stated. Also, care must be taken so that if an object is referenced multiple times in an object property join expression, and if it has the same qualifier, then only one relational database join is made to that object's table with the correct join condition.

Thus, in one embodiment, the query is parsed into a parse tree, as discussed above with respect to expressions, and a directed acyclic graph (DAG) is built from the parse tree. A directed acyclic graph is a graph in which there are no paths to follow that allow the same node to be visited twice. By building a DAG containing the objects being joined, and their joins to each other, the graph can be traversed in order to produce the correct joins in the correct order in relation to one another.

Figure 8:
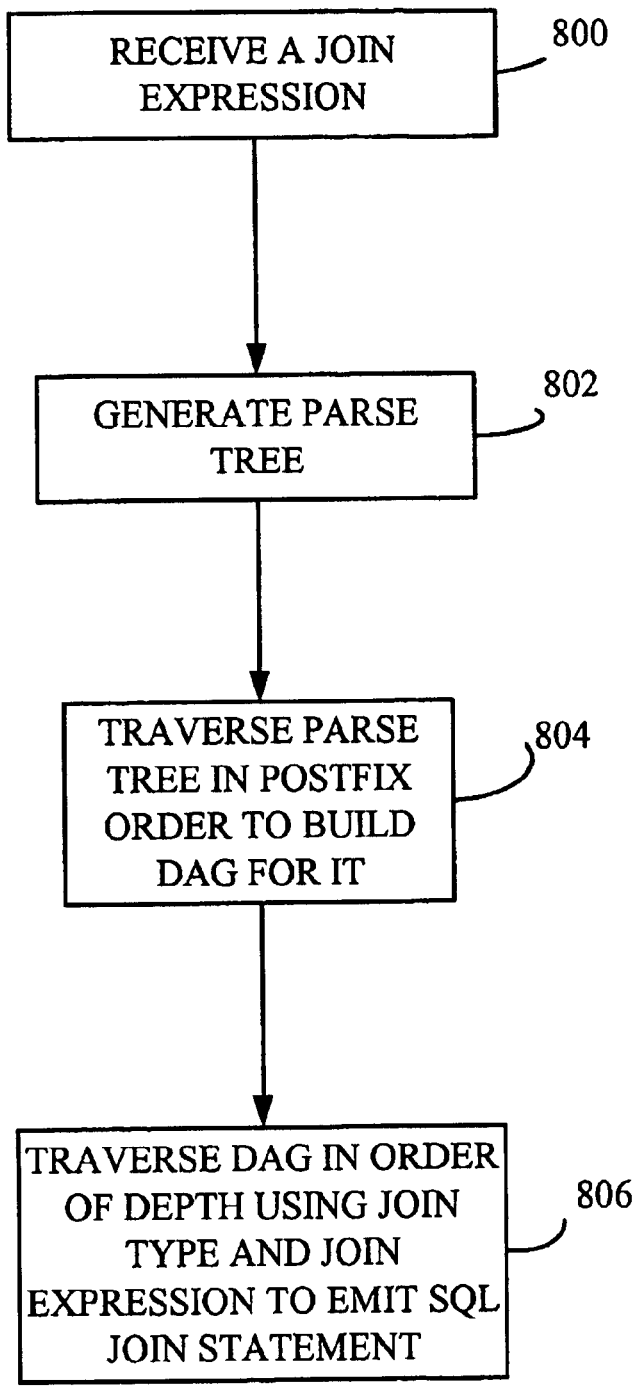
FIG. 8 is a flow diagram showing join translation.

FIG. 8 is a flow diagram illustrating the overall process of translating joins. First, a join expression is received. This is indicated by block 800. Next, a parse tree is generated from the join expression as indicated at block 802. Generation of parse trees is described in greater detail above with respect to expressions.

Once the parse tree is generated, translator component 13 in data access system 12 traverses the parse tree in post-fix order to build a directed acyclic graph (DAG) for the parse tree. This is indicated by block 804. Each node of the DAG represents an object within the join expression that is mapped to a different row in the relational database. As mentioned above, there are explicit joins which are specified by the developer. However, there are also implicit joins which are introduced because a property reference crosses the boundary between two objects that are mapped to different rows by class-table mapping 18 (shown in FIG. 1).

Each node in the DAG created for the parse tree has directed edges to other nodes, each of which refers to an object to which the original object joins. The nodes have a unique identity referred to as a qualifier. The qualifier for a node is the object path taken to reach the object represented by the node. For example, in the property path "Order.Customer.Address.City", the qualifier for "address" is referenced through a customer that is referenced through an order. Therefore, there are three qualifiers "Order", "Order.Customer", and "Order.Customer.Address". No two nodes in the DAG share the same qualifier.

In order to produce the translated output for the relational database (such as in SQL), and in order to produce the translation of the joins in the correct order in relation to one another, the DAG is traversed by the translator component according to the depth of each node. This is indicated by block 806. The depth of a node corresponds to the number of edges on the longest path between the node and the starting node. The starting node is referred to as having a depth 0. The depth of a node is assigned when it is added to the graph, and the depth of the nodes are updated as necessary (either during creation of the graph or when graph construction is complete).

An example will now be discussed to further illustrate the process shown in FIG. 8. In the example, assume that a developer wishes to query database 16 for all orders with the following restrictions:

Either:

There exists a customer of that order whose preferred employee lives in the same city as the supplier of some item sold by the company;

AND

The date the order occurred was after the discontinued date of the item sold by the company;

OR

There exists a customer of that order who lives in the same city as the warehouse where an item sold by the company is located.

An object property join expression that represents this type of Criteria can be represented by the following:

((Order.Customer.PreferredEmployee.City==Item.Supplier.City) AND (Order.OrderDate<Item.DiscontinuedDate)) OR (Order.Customer.City==Item.Warehouse.City)

Figure 9:
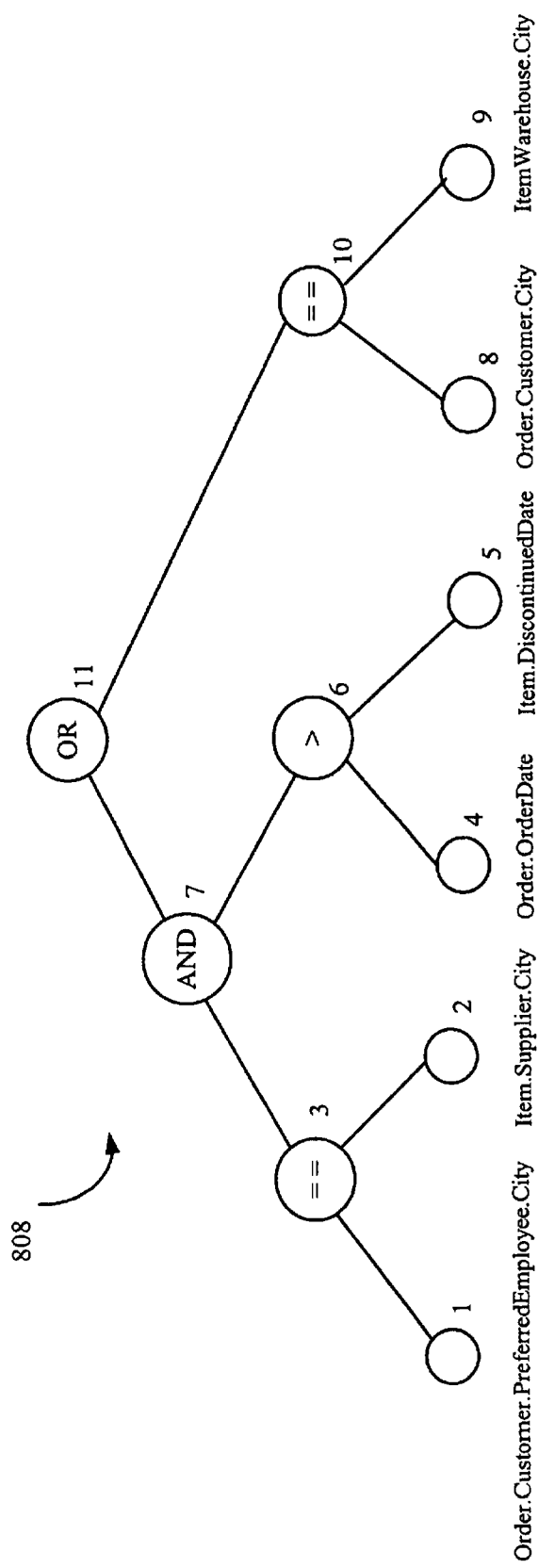
FIG. 9 is an exemplary parse tree.

FIG. 9 illustrates a parse tree 808 generated from this join expression. It can be seen that each of the leaves of the parse tree correspond to properties in the join expression, while each of the ancestor nodes (or internal nodes) corresponds to an operator.

In accordance with one embodiment, parse tree 808 is walked in post-fix order and a DAG is built for it. By post-fix order, it is meant that the tree is traversed in depth first order and a node is processed after its child nodes are visited. The post-fix order in which the tree is walked corresponds to the numerals adjacent each node in the tree. Thus, it can be seen that the first node processed is the lowest and left-most node in tree 808.

Figure 10A:
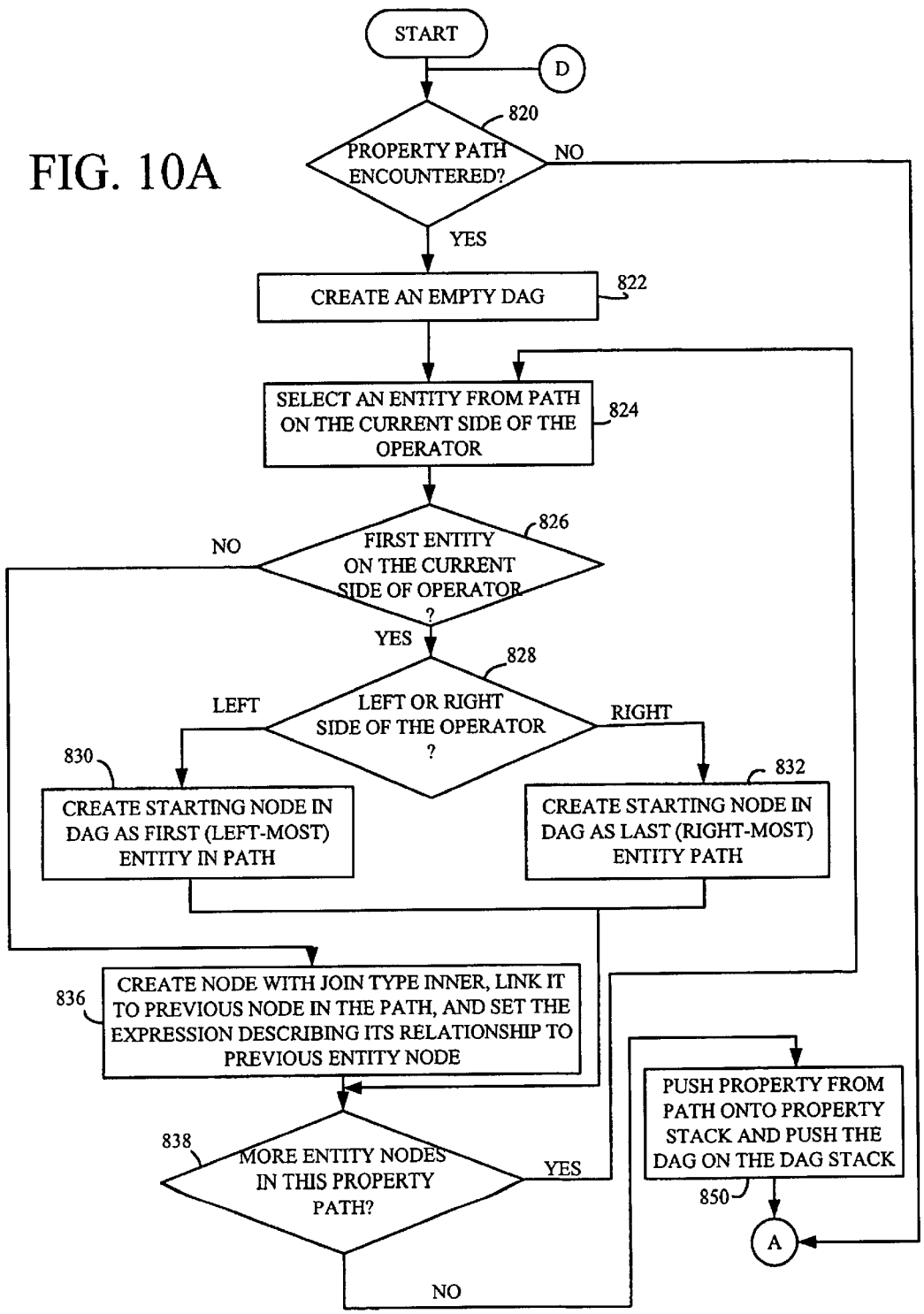
Figure 10B:
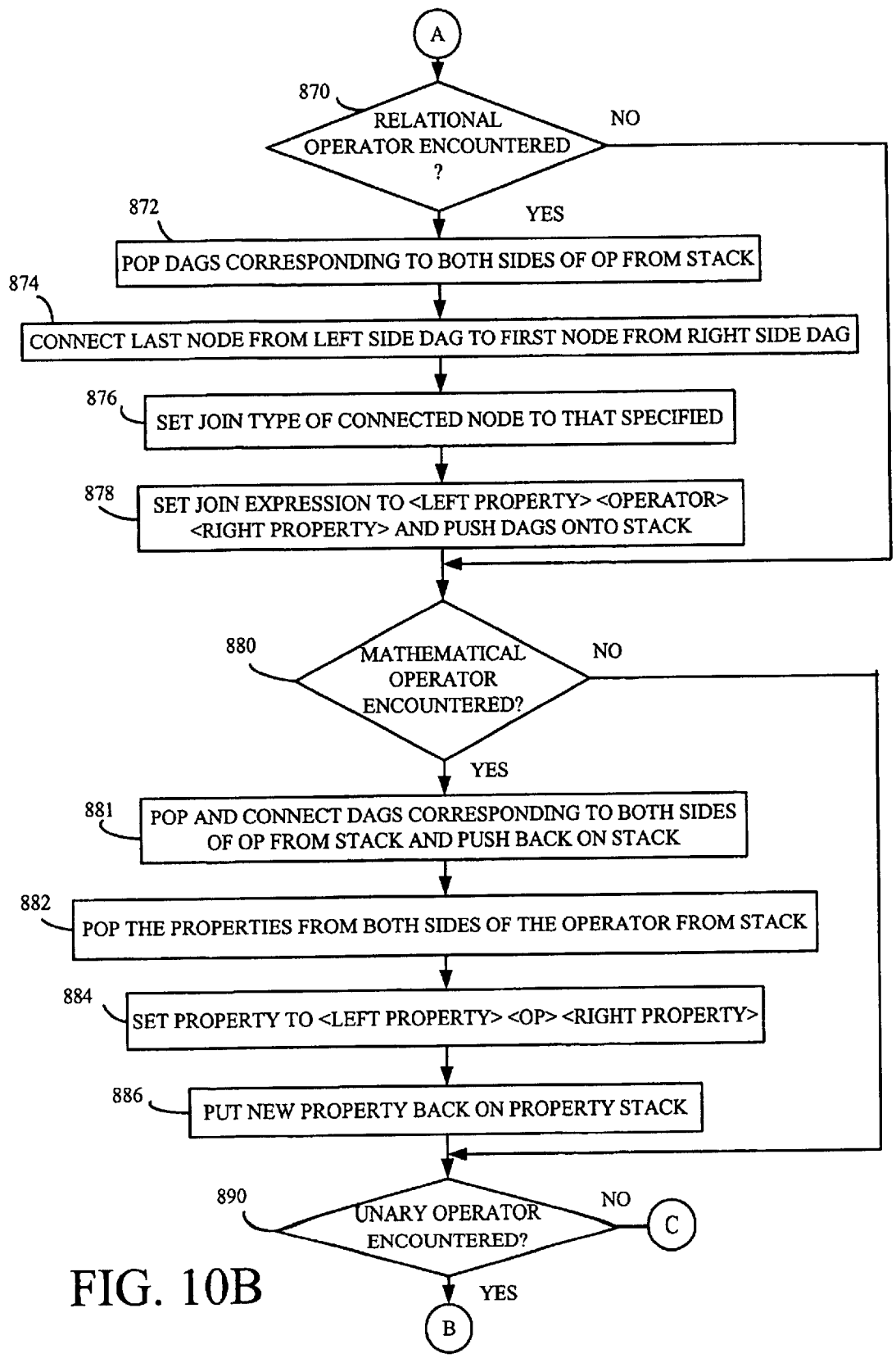
Figures 1, 10C:
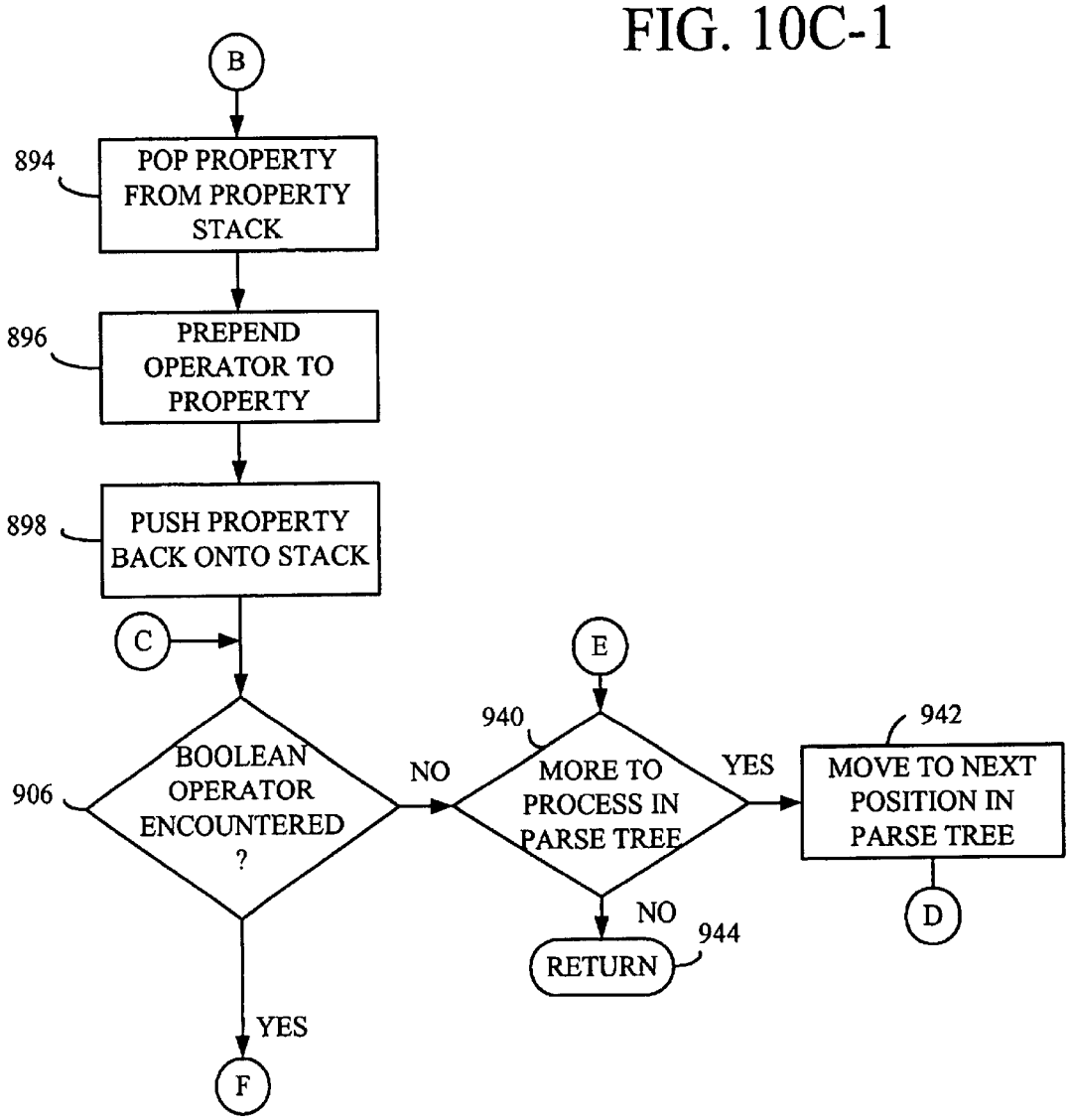
Figures 2, 10C:
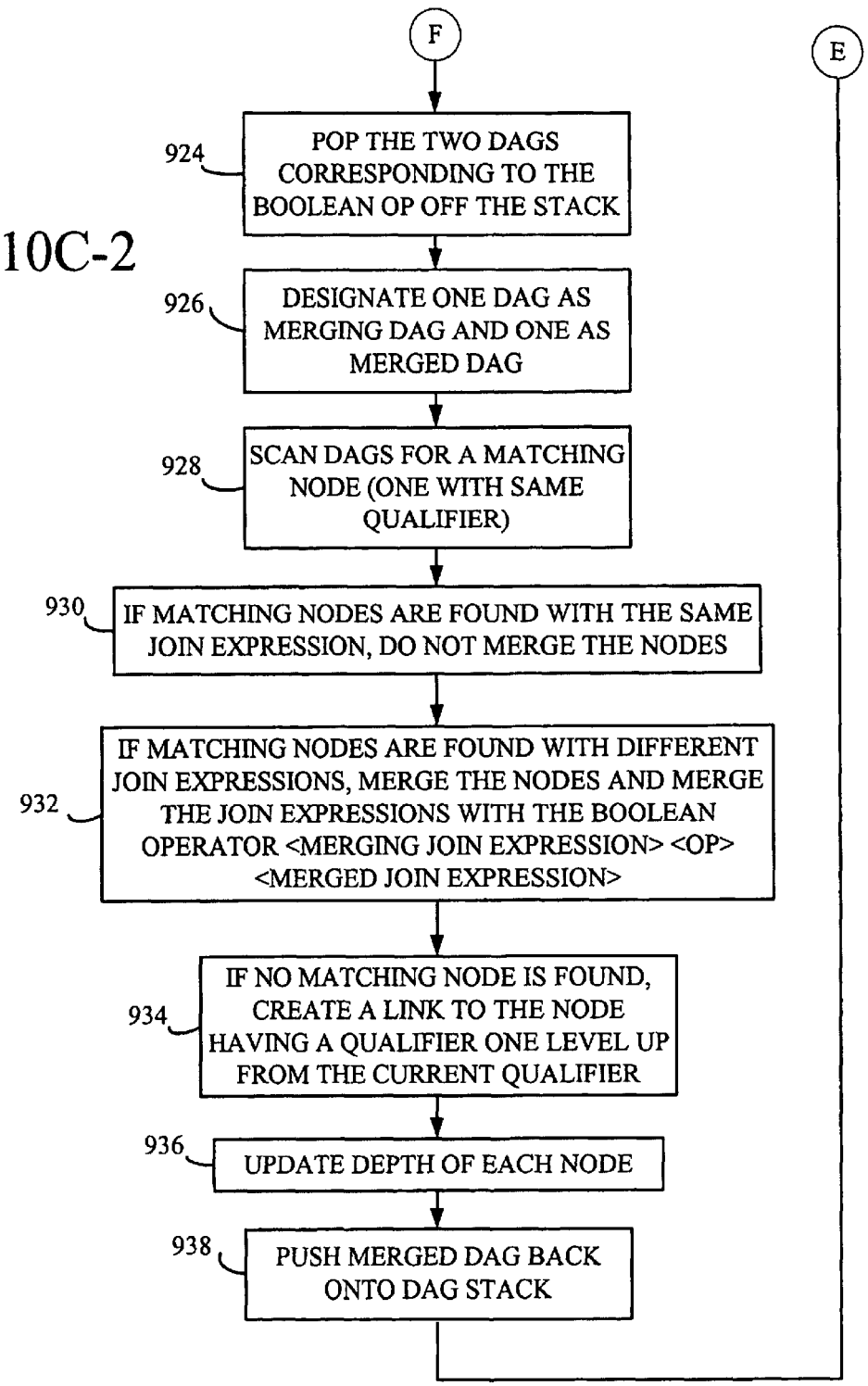

FIGS. 10A–10C represent a flow diagram that better illustrates traversing parse tree 808 to build a DAG corresponding to tree 808. These operations are carried out by the translation component 13 in data access system 12 (shown in FIG. 1).

It is first determined whether the node currently being processed corresponds to a property path. This is indicated by block 820. Of course, node 1 in parse tree 808 (the first node encountered) is a property path "Order.Customer.PreferredEmployee. City". Thus, the translator component creates an empty DAG. This is indicated by block 822 in FIG. 10A.

Having created an empty DAG and pushed it on a DAG stack, the translator component 13 selects an entity from the property path. This is indicated by block 824. If the entity chosen is the first entity on the current side of the operator (in this example on the left side of the "==" operator designated by node 3 in tree 808), then the translator component 13 must identify a starting node in the DAG it is about to begin creating for tree 808. Determining whether the encountered entity is the first entity on this side of the operator is indicated by block 826.

To designate a starting node in the DAG, the translator component 13 determines whether the node being processed is on the left side or right side of the operator in tree 808. This is indicated by block 828. If the entity is on the left side of the operator, then the starting node in the DAG is created as the first (left-most) entity in the property path being processed. This is indicated by block 830.

However, if the entity is on the right side of the operator, then the starting node in the DAG is created beginning with the last (right-most) entity in the property path. This is indicated by block 832. This reverse ordering on the right side of the operator can be understood if the difference between the object and database domains is examined more closely. From an object standpoint, the expression "Order.Customer.Preferred Employee.City==Item.Supplier.City" shows that the Order object is linked to the Item object by way of qualified object references. However, from a database standpoint, the Order table is never directly joined to the Item table. In fact, not even the Employee table is directly joined to the Item table. From a physical database table view, therefore, the only way to start from the Order table and arrive at the Item table is to join the tables in the following way "Order_Table To Customer_Table To Employee_Table To Supplier_Table To Item_Table". In other words, the only way to get from an order to an item is through a supplier. Thus, joins on the right hand side of an expression are done in the reverse order that they are referenced in the property path.

Figure 11A:
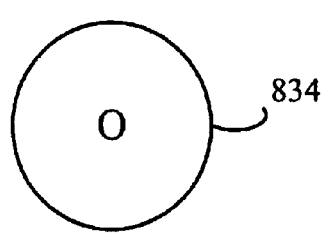
FIGS. 11A–11G illustrate building a DAG.

Assuming, therefore, that the property path corresponding to the first node in parse tree 808 is being processed, and assuming that the first node in the DAG is being created, the entity chosen is the "Order" entity. This corresponds to the first node in the DAG, and is indicated by node 834 in FIG. 11A.

Having identified the "Order" entity as the first node in the DAG, the translator determines whether any additional entity nodes remain in this property path which must be processed. This is indicated by block 836 in FIG. 10A. If so, the next entity from the property path is selected at block 824 and it is again determined whether this is the first entity on this side of the operator at block 826. Of course, since the "Order" entity has already been processed on this side of the operator in tree 808, the next entity to be processed will be the "Customer" entity. This is not the first entity on the left side of the operator in tree 808 and therefore processing will continue at block 836.

Figure 11B:
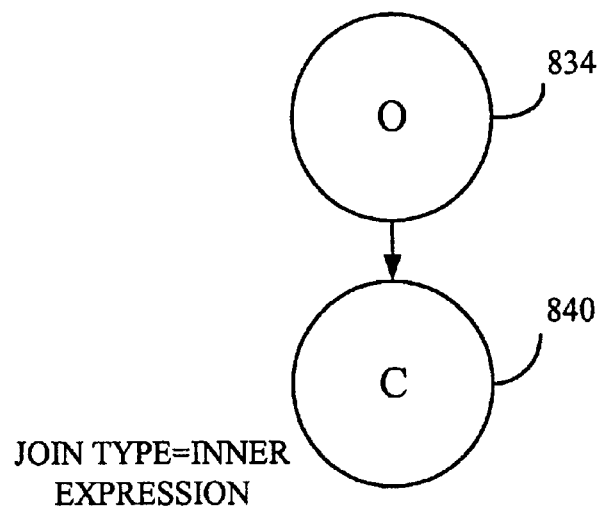

With the "Customer" entity a node will be created with the join type "inner" and the node for the "Customer" entity will be linked to the previous node in the path, and the join expression associated with that node will be set to describe its relationship to the previous entity node. FIG. 11B illustrates this in greater detail. It can be seen that the starting node 834 in the DAG has already been created. The next node created is the customer node 840. It can be seen from FIG. 11B that the customer node 840 has been created and provided with a join type "inner" and it has also been connected to the previous node (the "Order" node 834). This is indicated by the arrow between the two nodes. Similarly, it can be seen that the expression corresponding to node 840 has been set.

The join between the "Order" and "Customer" nodes represents the implicit join through qualified object references between the "Order" and "Customer" entities. The reason that this is designated as an "inner" join is because the order must have a customer for the desired join requirement to be true. The join expression is provided by the developer and resides in class-table mapping 18. For example, the developer will illustratively provide join expressions indicating how any given entity is to join to ancestor nodes (those further up the tree in a DAG). This information is stored in the class-table mapping. Therefore, when the translator determines that an entity is to be joined to a previous entity in a DAG, it simply reads the corresponding join expression from the class-table mapping 18 (shown in FIG. 1) and assigns that as the join expression for that node in the DAG.

Figure 11C:
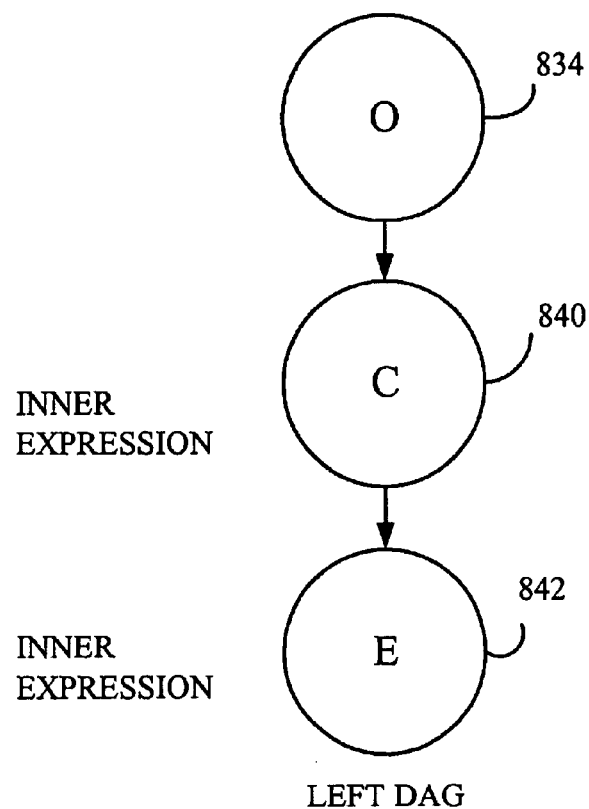

Having created both the starting node 834 and the subsequent node 840 in the DAG (shown in FIG. 11B) it is then determined whether there are any additional entity nodes in this property path, again at block 838. Of course, with respect to node one in parse tree 808 shown in FIG. 9, there is an additional entity in the property path, (i.e., the "PreferredEmployee"node). Since this is not the beginning node, processing proceeds to block 836 where a node in the DAG corresponding to this property path is created for the "PreferredEmployee" entity. This is shown in FIG. 11C as node 842.

Node 842 is again connected to the previous node 840 and the join expression corresponding to node 842 is set to describe its relationship to the previous entity node 840. Again, the join type is set to "inner" because this is an implicit join, and the join expression is simply read from the class-table mapping 18.

Processing then again proceeds to block 838 where it is determined that there are no additional entity nodes to process in this property path. Therefore, the translator pushes the property from the present path onto a property stack, and the DAG just constructed is pushed onto a DAG stack. This is indicated by block 150.

Figure 11D:
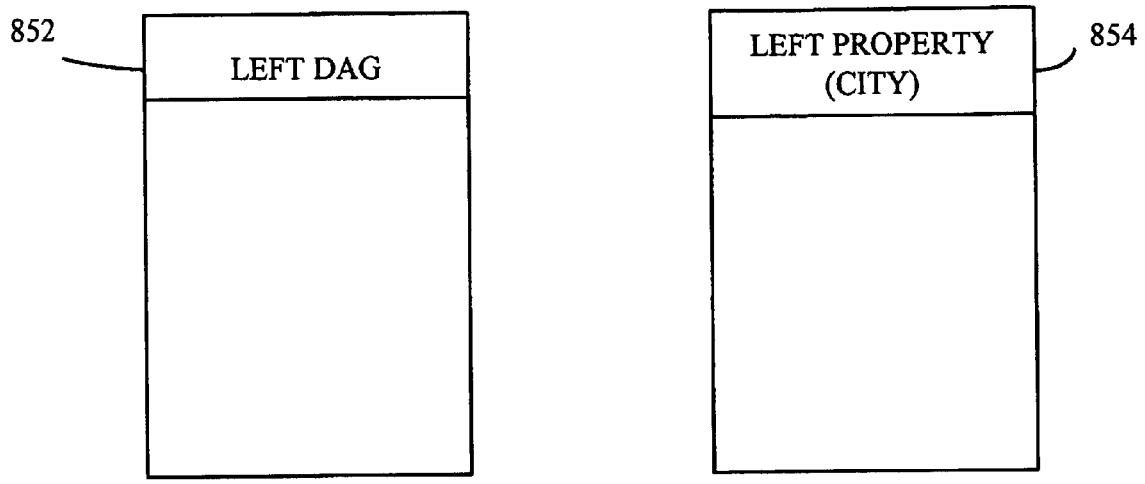

The property and DAG stacks are better illustrated in FIG. 11D. In the embodiment illustrated, DAG stack 852 and property stack 854 are first-in-last-out stores. The DAG placed on DAG stack 852 is the DAG corresponding to the expression which is on the left side of the operator node three of parse tree 808. The DAG is thus referred to as the "left DAG".

Thus, to this point, FIG. 10 has illustrated how property paths are processed into DAGS. This will be done for each of the property paths indicated by the leaf nodes of parse tree 808. Therefore, the "Item.Supplier.City" property path corresponding to node two in tree 808 will also be processed in this fashion.

Figure 11E:
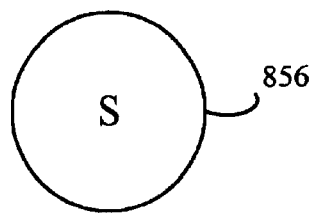

One area of difference should be noted. When node two in tree 808 is encountered, again with respect to FIG. 10, block 820 will indicate that a property path has been encountered and at block 822, the translator will create an empty DAG and push it onto the DAG stack. Then, the first entity in the property path "Item.Supplier.City" will be selected as shown in block 824 and it will be determined that it is the first entity on the right hand side of the expression designated in node 3 of tree 808. Thus, in block 832, the first node in the DAG for this property path will be created as the last (right-most) entity in the path (i.e., the "Supplier" entity). Thus, the first node in the DAG is illustrated in FIG. 11E and that node 856 corresponds to the Supplier entity.

The next entity chosen will be the "Item" Entity which will be processed at block 836 of FIG. 10A. Thus, the next node will be created (node 858 in FIG. 11F) and it will be linked to the previous node (node 856). The join type will be set to "inner" and the expression describing its relationship to the previous entity node will also be set. This is all illustrated in FIG. 11F.

Figure 11F:
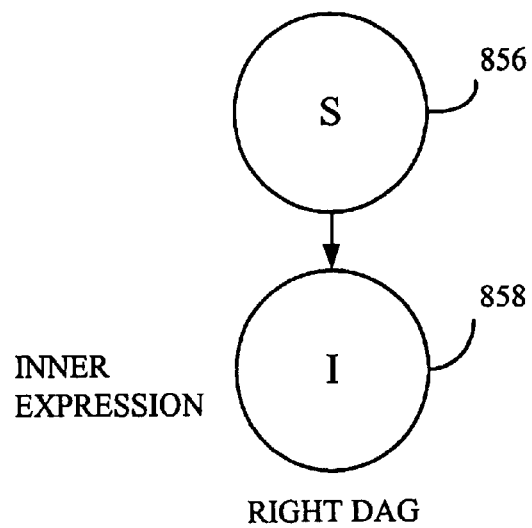
Figure 11G:
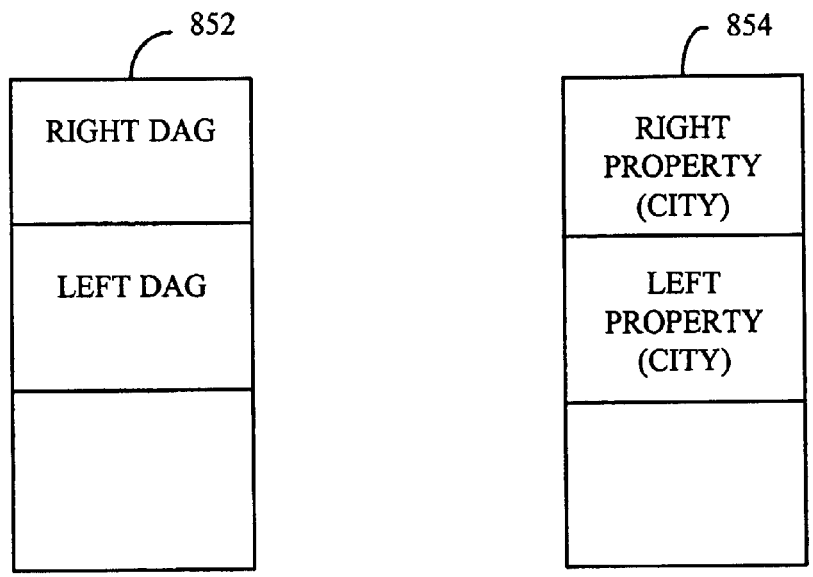

FIG. 11F also shows the complete DAG for the expression on the right hand side of the relational operator indicated by node three in tree 808. It is thus referred to as the "right DAG". Since the DAG has been completely formed for that property path, it will be pushed onto the DAG stack as will its associated property (the "Supplier.City" property) as indicated at block 850 in FIG. 10A. This is illustrated in FIG. 11G which shows that DAG stack 852 now not only contains the left DAG which was originally pushed onto the stack, but it also contains the right DAG which was subsequently pushed onto the stack. Similarly, the property stack 854 contains not only the left property corresponding to the left DAG, but the right property corresponding to the right DAG as well.

Once the two property paths indicated by nodes one and two in the tree have been processed, processing will continue with respect to node three, since both sides of that relational operator have been computed at a lower depth. Therefore, processing proceeds from block 850 to block 870 where the translator determines whether the next node encountered in parse tree 808 is a relational operator. Of course, the identity operator illustrated by node three in tree 808 is a relational operator and therefor processing will move to block 872 in FIG. 10B.

In accordance with block 872, both DAGS in DAG stack 852 (which correspond to the left and right sides of the relational operator) are popped off of DAG stack 852. The last node from the left side DAG is then connected to the first node of the right side DAG. This is indicated by block 874 and is also better illustrated in FIG. 12.

Figure 12:
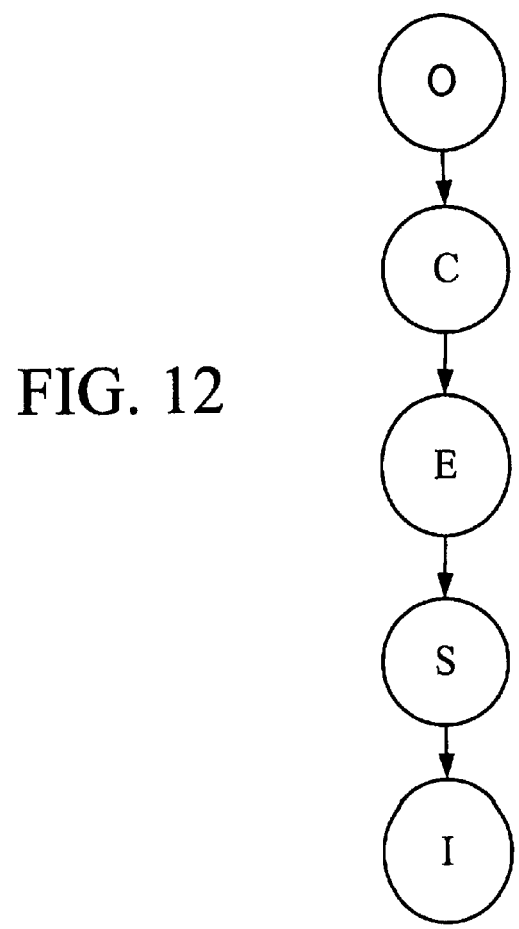
FIG. 12 shows a merged DAG.

It can be seen in FIG. 12 that the nodes O-C-E represent the left side DAG while the nodes S-I represent the right side DAG. The last node in the left DAG (the E-node) is connected to the first node in the right DAG (the S-node). However, this leaves additional work to be performed.

It can be seen from FIG. 11F that the S-node 856 has no join type or expression associated with it, since it was the first node in a DAG. It is no longer the first node in a DAG as shown in FIG. 12. Therefore, the join type and the join expression must be generated for the node. Since the join represented by the relational operator is an explicit join, the join type is simply set to that specified by the developer. This is indicated by block 876.

In order to set the expression associated with the join, the two expressions are popped off of the property stack 854 and are joined by the relational operator. Therefore, the join expression corresponding to the S-node in the DAG shown in FIG. 12 becomes "Employee.City==Supplier.City". The DAG is then pushed back onto the DAG stack as is its associated property. Setting the join expression and pushing the DAGS back onto the stack is indicated by block 878 in FIG. 10B.

Other types of operators may be encountered in a parse tree as well. While no mathematical operators are illustrated in the examples shown in FIG. 9, a mathematical operator may be encountered. If so, this is handled by the processing section beginning at block 888. In accordance with one embodiment, a mathematical expression can only be applied against two properties that are in the same object (or entity). Therefore, if a mathematical expression is encountered as indicated at block 880, then The DAGs corresponding to the two-sides of the operator are popped off the stack, connected and the single DAG is pushed back on the stack. This is indicated by block 881. The properties corresponding to the expressions on both sides of the mathematical operator are popped from the property stack. This is indicated by block 882.

The property assigned to the node for the entity under consideration in the DAG stack is set by joining the left property and the right property by the operator. This is indicated by block 884. For example, assume that a DAG has been generated for a property path "Customer.Order.Tax" and for another property path "Customer.Order.Subtotal". Assume further that those two property paths are joined in their parse tree by the mathematical operator "+". When that mathematical operator is encountered, the property associated with the entity will be "Order.Tax+Order.Subtotal". The new property is then put back on the property stack as illustrated by block 886.

Still other operators may be encountered. A unary operator is handled by the processing beginning at block 890. If a unary operator is encountered as illustrated by block 890, the property associated with that property path is popped from the property stack and the unary operator is prepended to the property and the property is then pushed back on the property stack. This is indicated by blocks 894, 896, and 898.

If a Boolean operator is encountered, this is handled by the processing beginning at block 906. Merging DAGS on a Boolean expression will be described with respect to FIGS. 10 and 13. In sum, each side of a Boolean expression has its own corresponding tree and thus has its own corresponding DAG. When a Boolean operator is encountered while processing a property join expression, the two trees (representing the two operands of the Boolean expression) are merged together.

Figure 13:
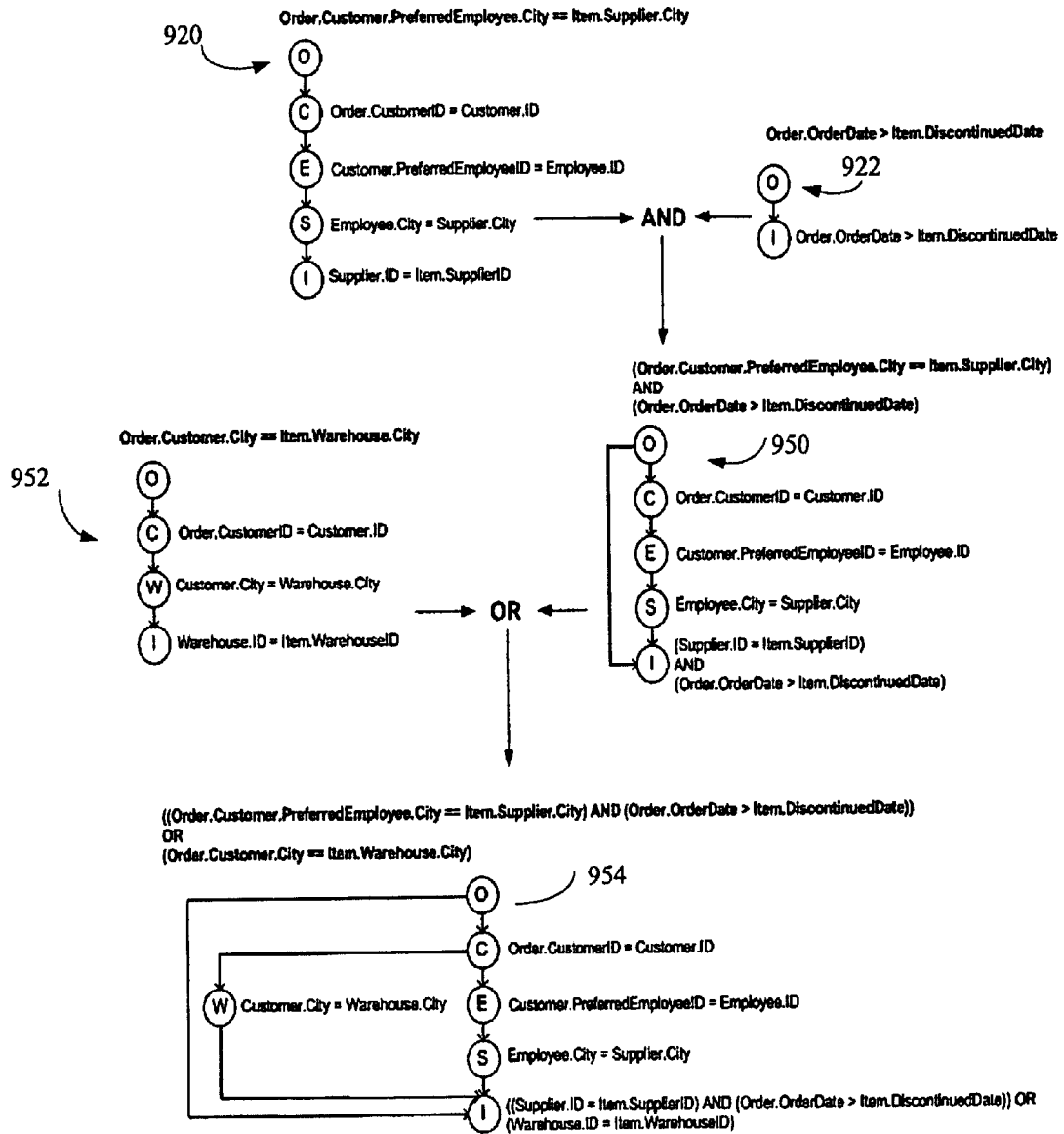
FIG. 13 shows merging DAGs according to Boolean operators.

FIG. 13 illustrates the process of building and joining DAGS that represent the objects involved in the exemplary join expression. The expression text in bold at the top of each DAG is the expression from the object query that the DAG represents. The non-bold text along side each node of the DAG indicates the join expression that joins the previous node to it. For example, the upper portion of FIG. 13 shows that DAGS 920 and 922 are joined by the Boolean operator "AND". This corresponds to node seven in parse tree 808 in FIG. 9.

In order to join these DAGS, and referring again to FIG. 10C, the two DAGS 920 and 922 corresponding to the Boolean operator "AND" are popped off of the DAG stack. This is indicated by block 924. One of these DAGS (either 920 or 922) is designated as the merging DAG and the other is designated as the merged DAG. It does not matter which is designated as the merging or merged DAG, but for the purposes of this discussion, the merged DAG will be the one containing the DAG that results from the merge. Designating the DAGS is indicated by block 926.

Next, the DAGS 920 and 922 are scanned for matching nodes. By matching it is meant that the nodes have the same entity qualifier. This is indicated by block 928.

If matching nodes are located, and they have the same identical join expression then the nodes are not merged, but instead the node in the merging DAG is simply ignored. This is done in order to avoid duplicate join expressions. This is indicated by block 930.

If matching nodes are found with different join expressions, then the nodes are merged together and the join expressions are merged with the Boolean operator so that the merging join expression and the merged join expression are connected by the Boolean operator as follows <merging join expression><Boolean operator> <merged join expression>. Merging nodes and expressions in this fashion is indicated by block 932.

For example, the "Item" node of DAG 920 is merged with the "Item" node of DAG 922. The resulting node shown in DAG 950 has the join expression "Item.Supplier.ID==Supplier.ID" merged with the join expression "Order.OrderDate<Item.DiscontinuedDate" to result in a merged expression "(Item.Supplier.ID==Supplier.ID) AND (Order.OrderDate<Item.DiscontinuedDate)".

Similarly, FIG. 13 shows that DAGS 952 and 950 are joined by an OR expression to obtain the final DAG 954. It can be seen that the "Order" nodes and the "Customer" nodes are identical and the nodes on the right side (the "merging" nodes) are therefore ignored. Similarly, the "Item" nodes are merged and their corresponding expressions are joined by the "OR" expression shown in DAG 954.

Sometimes, no matching node is found for one or more of the nodes in either the merged or merging DAGS. If that is the case, it is handled by processing at block 934 in FIG. 10C. If no matching node is found, a link is created to that node from the node having a qualifier one level higher than the qualifier under consideration. This can be seen with respect to node W in DAG 952. There is no matching node in DAG 950. Therefore, a link is created to node W from node C, which has a qualifier one level higher than node W. Of course, node W is connected to node I and is therefore connected to that node in the resultant merged DAG 954 as well.

Once the final DAG has been generated, the depth of each node in the DAG is updated. This is indicated by the numerals adjacent each node in final DAG 954. It is also illustrated by block 936 in FIG. 10C. It can be seen that there are three paths between the first node in DAG 954 and the final node. The depth corresponding to the final node is that which corresponds to the longest path between the first node and the final node in DAG 954. Therefore, the depth associated with node I is four even though one of the paths to node I comes directly from node O.

With the node depth thus updated, the merged DAG 954 is pushed back onto the DAG stack. This is indicated by block 938 in FIG. 10C.

If, at block 906, no operator has been encountered, then the translator determines whether there are anymore nodes in the parse tree 808 to be processed. This is indicated by block 940. If so, then the translator moves to the next position in the parse tree, again moving in post-fix order. This is indicated by block 942. Once all of the nodes in the parse tree have been processed, DAG processing is complete as indicated by block 944.

Having generated the final DAG for the parse tree, the DAG is traversed beginning at depth O (i.e., the starting node). All nodes with the depth one greater than the current node are processed and their join data is output. It can be seen that implicit joins are illustratively always emitted as inner joins, while explicit joins are inner, left, outer, or right outer joins, as defined by the developers specifying the joins. This process is continued, incrementing the depth to be searched in the DAG each time until the ending node is reached. There is only one ending node and it represents the final node for purposes of join translations with respect to this expression.

To complete the above example, the following is an illustrative output from the translator of an SQL FROM clause:

```
FROM Order TBL
INNER JOIN CustomerTbl ON
    OrderTbl.CustomerID=CustomerTbl.ID
INNER JOIN Warehouse Tbl ON
    CustomerTbl.City=WarehouseTbl.City
INNER JOIN EmployeeTbl ON
    CustomerTbl.PreferredEmployeeID=EmployeeTbl.ID
INNER JOIN SupplierTbl ON
    EmployeeTbl.City=SupplierTbl.City
INNER JOIN ItemTbl ON
    ((SupplierTbl.ID=ItemTbl.SupplierID) AND
    (OrderTbl.OrderDate>
    ItemTbl.DiscontinuedDate)) OR
    (WarehouseTbl.ID=ItemTbl.WarehouseID)
```

The first Join in the from clause "Inner Join CustomerTbl ON. . . " represents the implicit Join through qualified object references between the "Order" and "Customer". The reason it is an Inner Join is because the Order must have a Customer for the desired Join requirement to be true.

The second Join "Inner Join WarehouseTbl ON. . . " represents the explicit Join defined in the property Join expression between the customer and warehouse. The Inner Join type used for this Join is supplied by the developer along with the property join expression.

The third Join "Inner Join EmployeeTbl ON. . . " represents the implicit Join through qualified object references between the "Customer" and "Employee".

The fourth Join "Inner Join SupplierTbl ON. . . " represents the explicit Join defined in the property join expression between the "Employee" and "Supplier".

The fifth Join "Inner Join ItemTbl ON. . . " represents all implicit Joins through qualified object references as well as explicit Joins defined in the property join expression. It is an Inner Join exclusively because the Inner Join type is supplied by the developer. It illustratively cannot be a left Join because it would contradict the semantics requested by the developer.

It can thus be seen that this aspect of the system provides translation of object Joins to relational database Joins, in the proper order even where the object Joins are extremely complex.

Translation of Queries with Inheritance

Another area where translation is not straightforward is for an inheritance hierarchy. Objects in an inheritance hierarchy may be mapped to more than one table in the relational database, making a direct translation from an object query to an equivalent SQL query quite difficult. Each row in the SQL result must represent all of the data necessary to create and fill a single object.

Some difficulties which present themselves include creating the proper joins between the tables to which each class in the inheritance hierarchy is mapped (especially if there is more than one). Also problematic are polymorphic queries, which are queries given against a base class wherein data necessary to create and fill objects in response to the query require obtaining data from a descendent class type. Sorting the results according to the user's request is difficult as well. Similarly, once the data is retrieved, determining the type (or class) of the data in each row of the result set so that an object of the proper type may be returned can cause problems.

Figure 14:
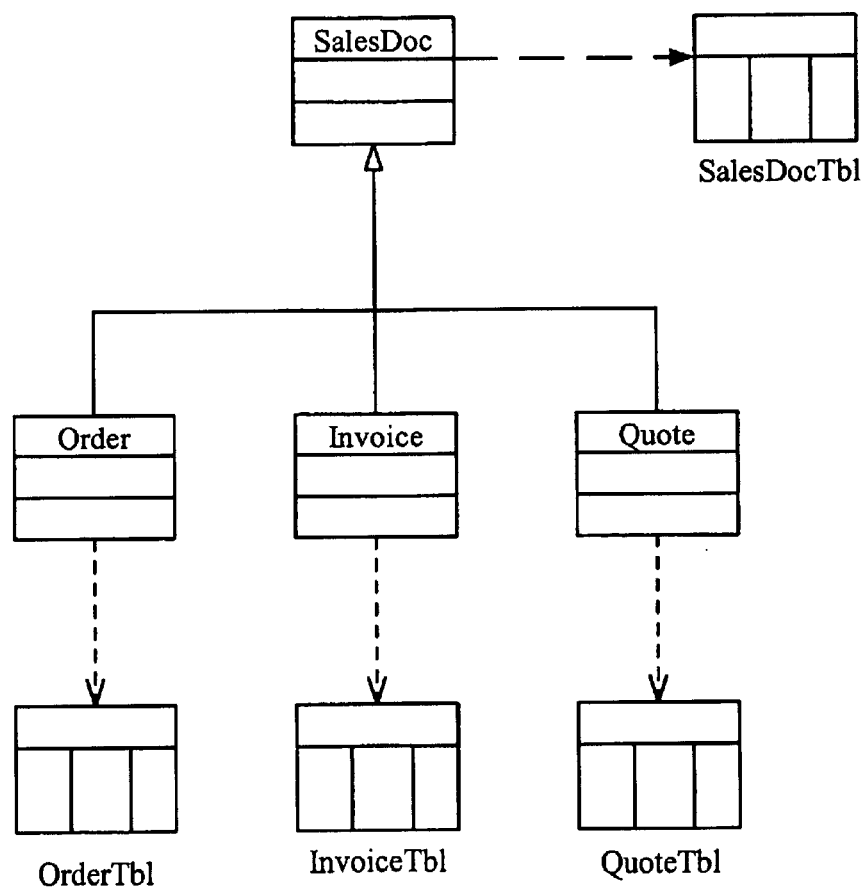
FIG. 14 is a UML diagram showing concrete entities derived from a concrete entity, all mapped to separate class tables.

A number of examples may be helpful. FIG. 14 is a UML diagram illustrating an inheritance hierarchy in which each of the entities is a concrete entity and each is mapped to its own table. In the specific example illustrated, the SalesDoc entity and each of its descendent entities are concrete, again meaning that instances of the class may be created. This is in contrast to abstract classes, which cannot be instantiated. The SalesDoc maps to the SalesDocTbl. Each descendent also stores its SalesDoc data in the SalesDocTbl and also has its own separate table just for those properties unique to it. Querying for all SalesDoc objects may return an instance of any of the four concrete classes: SalesDoc, Order, Invoice or Quote.

Figure 15:
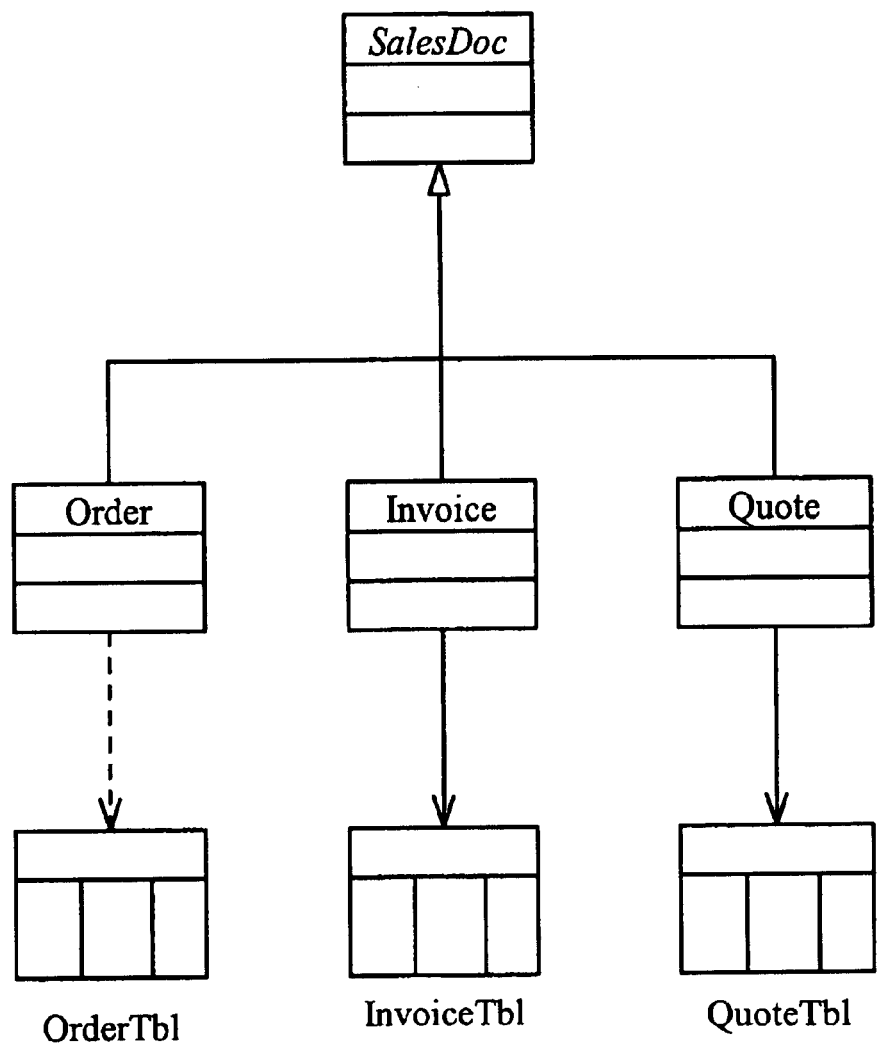
FIG. 15 is a UML diagram with concrete entities derived from an abstract entity.

Another scenario in which translation of an inheritance entity can be difficult is illustrated in FIG. 15. A number of the items in FIG. 15 are similar to those shown in FIG. 14. However, in FIG. 15, the SalesDoc entity is abstract and each of its descendents are concrete. The SalesDoc data is stored in each descendent's table. That is, the SalesDoc data is stored in the OrderTbl, the InvoiceTbl and the QuoteTbl.

Figure 16:
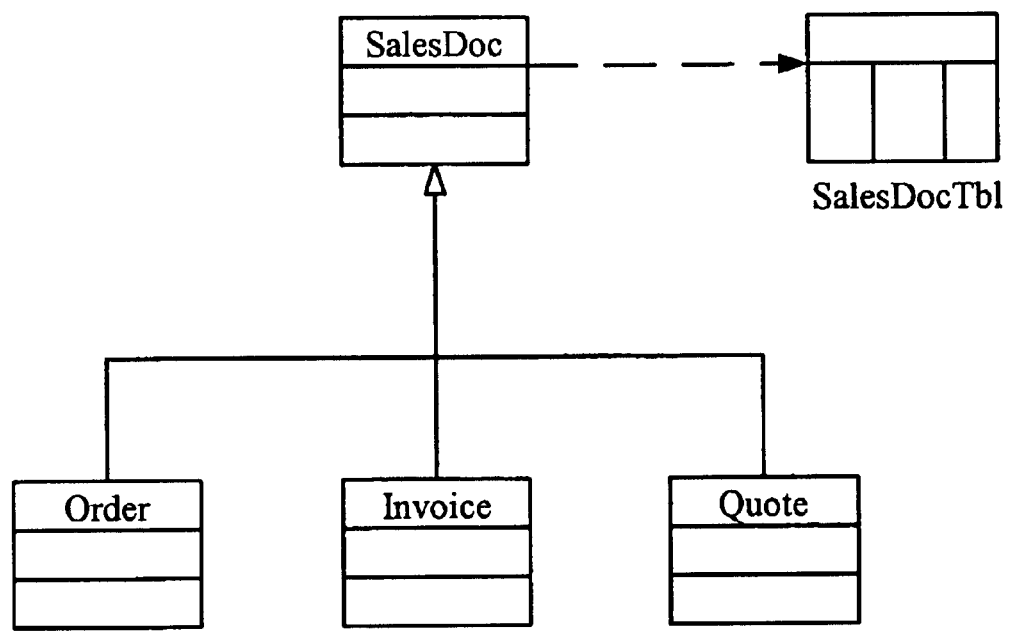
FIG. 16 is a UML diagram showing concrete entities derived from a concrete entity, all mapped to a single table.

Yet another scenario which can be problematic is shown in FIG. 16. In that Figure, the SalesDoc and each of its descendents are concrete. The SalesDoc and each of its descendents store their data in the SalesDocTbl. A type indicator specified in the O-R mapping provides information about a column in the table and distinguishes one type from another.

In order to handle all of these, and other scenarios (such as an arbitrary combination of these three scenarios), one embodiment of the translation algorithm translates queries on objects that include inheritance by using a tree structure having nodes referred to herein as "entity groups". The entities in these groups may also be referred to, in this context, as "classes". The algorithm first generates the entity group tree and then processes (or traverses) the tree in order to translate the queries into SQL. This is described in greater detail with respect to FIG. 18, which is a flow diagram illustrating translation of an object query which involves objects that have inheritance.

First, the translator component 13 receives the object query. This is indicated by block 1050 in FIG. 18. Next, the translator creates an initial entity group tree with nodes corresponding one-to-one with classes in the inheritance hierarchy.

Figure 17:
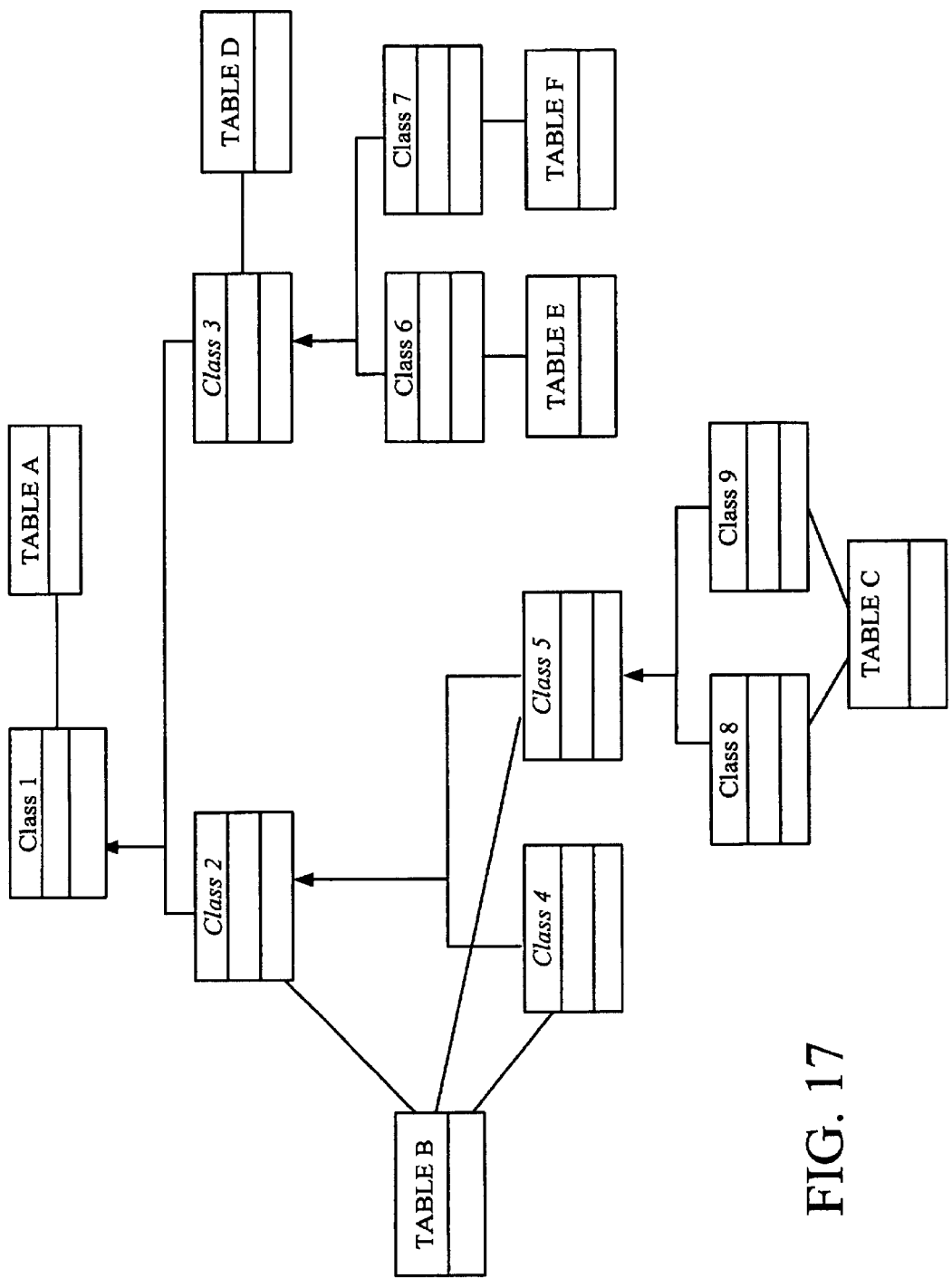
FIG. 17 is a UML diagram of an inheritance hierarchy, showing class tables for the entities illustrated.

An example of such an initial tree is shown in FIG. 17. The initial tree in FIG. 17 includes nine classes, of which classes 1, 6, 7, 8, and 9 are concrete classes and the remaining are abstract classes. FIG. 17 also illustrates tables to which each of the classes are mapped. In order to create the initial tree shown in FIG. 17, the query will identify the entity in the inheritance hierarchy for which data is sought. The translator creates the initial tree whose nodes correspond one-to-one with classes in the inheritance hierarchy. All ancestors and all descendents of the entity being queried are placed in the tree.

The content of the nodes in the tree includes a class list that initially contains the class at the corresponding position in the inheritance hierarchy, but may contain several classes, if they map to the same table. The node also includes a table that is the table from the O-R mapping for that class, if any, and the child nodes correspond to descendents of the class in the inheritance hierarchy, if any. The initial tree illustrated in FIG. 17 is then traversed by the translator 13.

In traversing the tree, the translator groups entities that share the same table in the inheritance hierarchy. This is indicated by block 1054 in FIG. 18 and is further illustrated by the flow diagram in FIG. 18-1. The tree is traversed in prefix order and is reduced. By prefix order is meant that the tree is traversed beginning at the top and descending all the way down the first branch before processing other branches and processing a parent node prior to processing any of its descendents. For example, a first node is chosen as the current node. The translator determines whether the current node has the same table as any child nodes. This is indicated by block 1060 in FIG. 18-1. If so, then the child node is merged into the parent node as indicated by block 1062.

In order to merge the two nodes, the child node is removed from the parent's child node-list, and the child's class list is copied to its parent's class list. The child's child node list is also copied to the parent's child node list.

An example of this type of merge is illustrated by classes 2, 4 and 5 in FIG. 17. It can be seen that class 2 is the parent of classes 4 and 5, but the descendent classes 4 and 5 share the same table (Table B) as class 2. Therefore, the children nodes (class 4 and class 5) are merged into the parent node (class 2).

Once the child nodes of the current node have been merged into the parent, if required, then the translator 13 determines whether any children of the current node share the same table. This is indicated by block 1064 in FIG. 18-1. If so, those children are merged with one another. An example of this is also shown in FIG. 17. Classes 8 and 9 are children of class 5, and share the same table, Table C. Thus, when the node corresponding to class 5 is being processed, classes 8 and 9 are merged together. Merging the nodes is indicated by block 1066 in FIG. 18-1.

In order to merge the two child nodes, both children are removed from the parent's child class list. A new node is created whose class list is the aggregate of the two children, and the new node is added to the child node list of the parent.

If any of the changes to the initial entity group tree have changed the processing in the previous blocks, then processing reverts back to block 1060. For example, certain nodes may be merged together, which would change the answers to the questions posed in blocks 1060 and 1064. If that is the case, processing reverts back to those blocks so that the nodes can be appropriately merged. This is indicated by block 1068 in FIG. 18-1, and continues until the tree structure stabilizes.

Once all of the merges have been conducted, then the columns for each entity in the present entity group (the current node) are added to the list of selected columns. This is indicated by block 1070 in FIG. 18-1.

Figure 19:
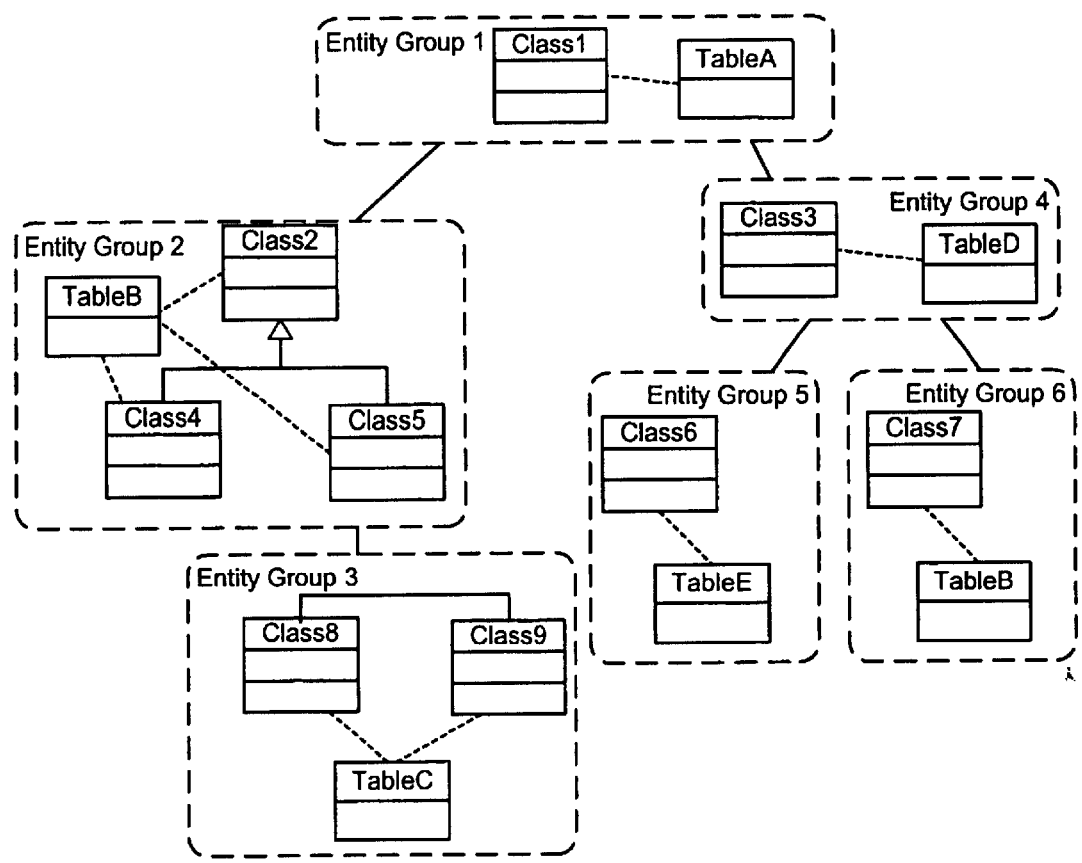
FIG. 19 illustrates the inheritance hierarchy of FIG. 17 formed into a tree of entity groups.

At this point in the processing, the entity group tree will be complete. An example of an entity group tree for the inheritance hierarchy shown in FIG. 17 is illustrated in FIG. 19. It can be seen that each of the classes has its own entity group except for classes 2, 4 and 5, all of which share the same table, and classes 8 and 9, both of which share the same table as well.

Figure 20:
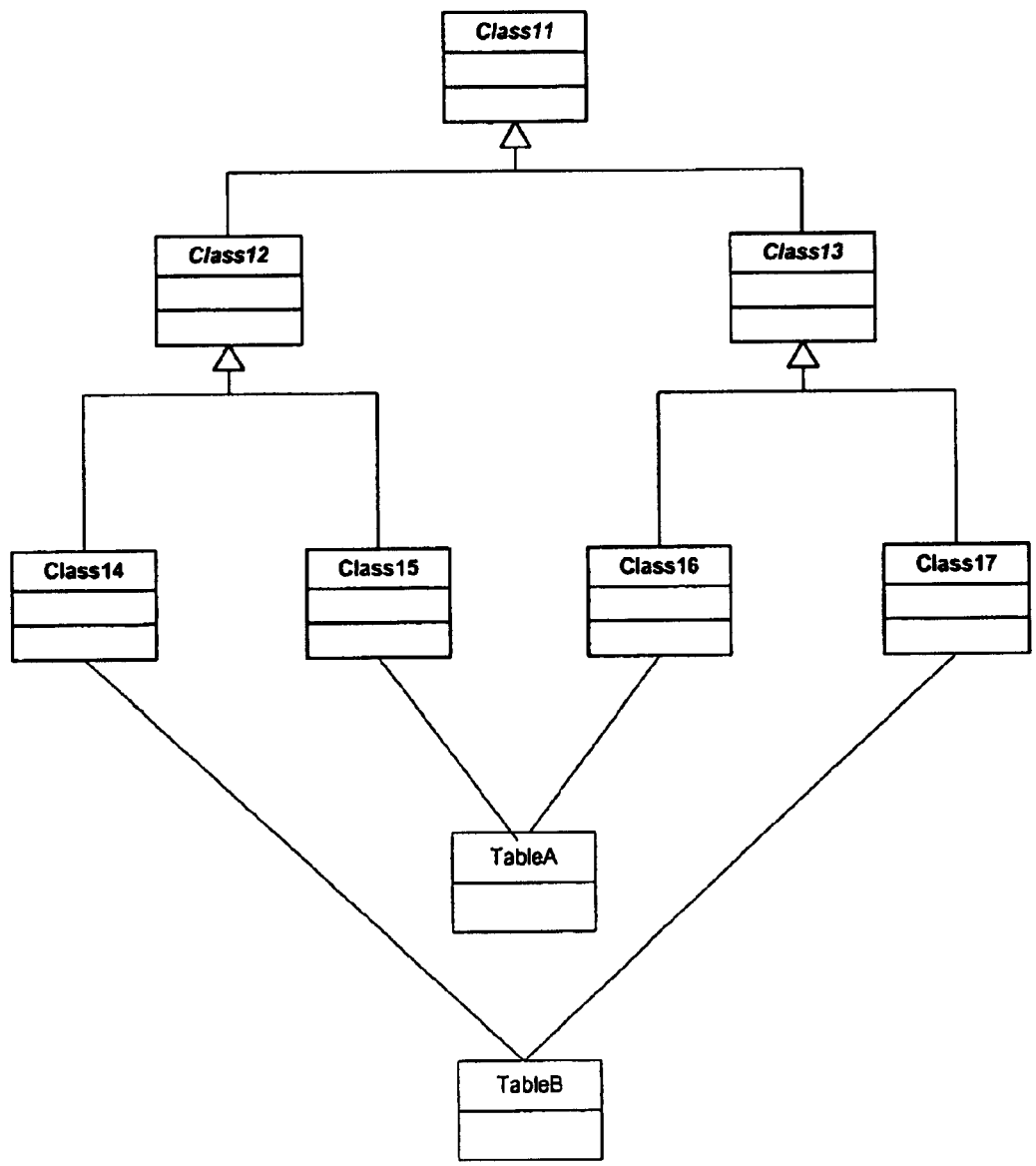
FIG. 20 illustrates another inheritance hierarchy.

Another example of a inheritance hierarchy which can be processed into an entity group tree is shown in FIG. 20. FIG. 20 illustrates that classes 11, 12 and 13 do not have a table, but that classes 14 and 17 both share Table B, while classes 15 and 16 share Table A.

Figure 21:
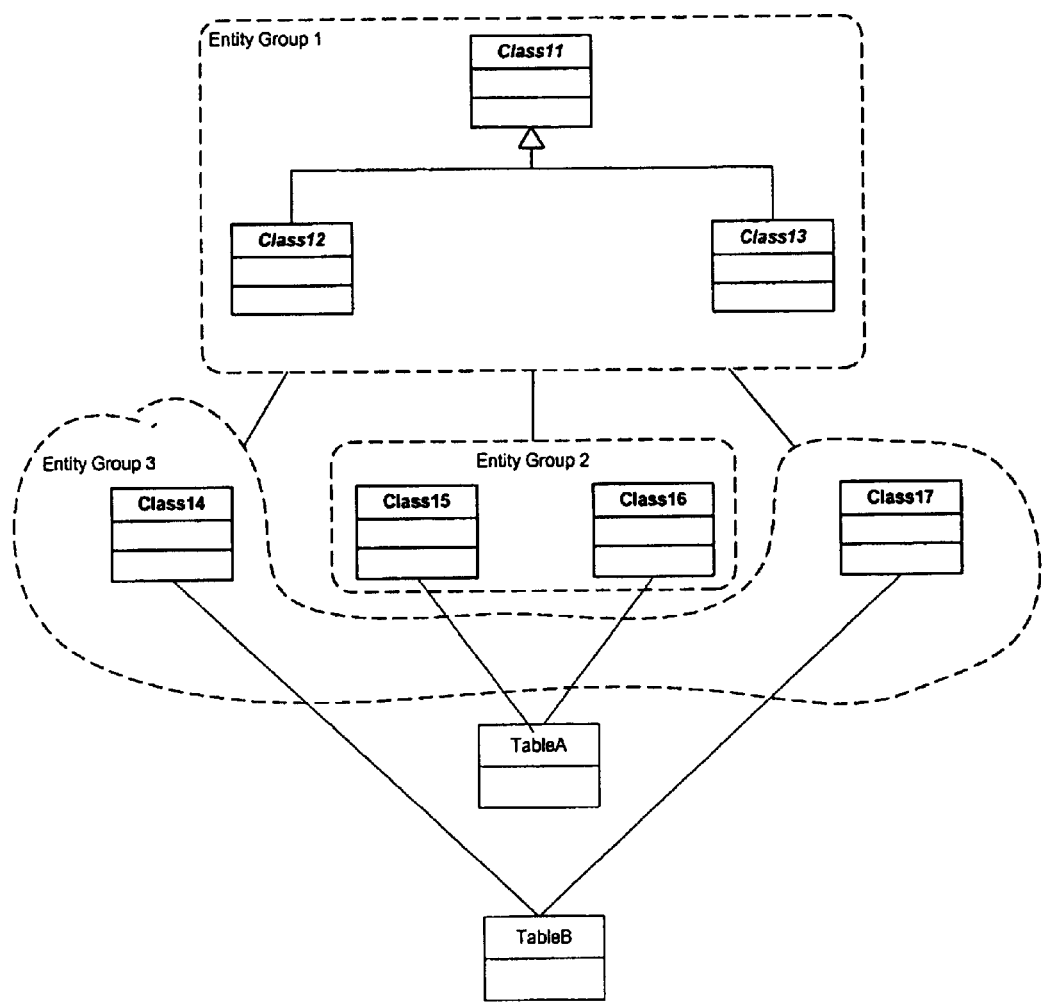
FIG. 21 illustrates the inheritance hierarchy shown in FIG. 20 formed into entity groups.

FIG. 21 illustrates the entity group tree formed in accordance with one embodiment of the present algorithm based on the inheritance hierarchy shown in FIG. 20. FIG. 21 illustrates that classes 11, 12 and 13 have been grouped together into an entity group because none of them have a table, entities 14 and 17 are grouped together because they share Table B, and entities 15 and 16 are grouped together into an entity group because they share Table A.

Figure 18:
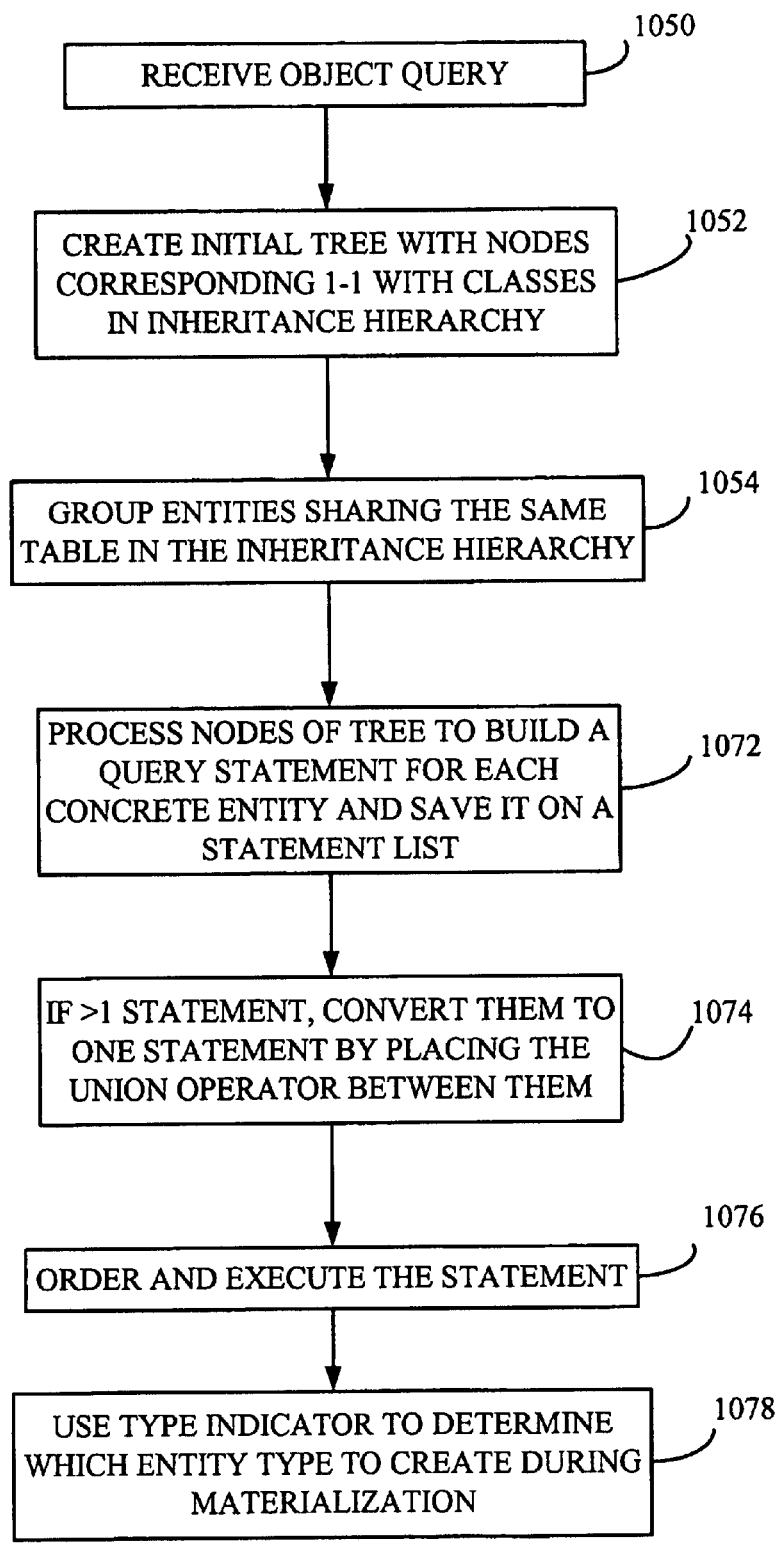
FIG. 18 is a flow diagram illustrating one embodiment of an algorithm for translating queries that have inheritance.

Returning again to where processing left off in FIG. 18, once the entities have been grouped together to form the entity tree, the nodes of the tree are processed to build a query statement for each concrete entity, and that query statement is saved on a statement list. This is indicated by block 1072 in FIG. 18. If more than one statement exists, then they are converted into one statement by placing the "UNION" operator between them. This is indicated by block 1074. The statement is then ordered and executed and the type indicator is used to determine which entity type to create during materialization (after the query results have been returned). This is indicated by blocks 1076 and 1078 in FIG. 18.

FIG. 18-2 illustrates processing the nodes of the entity group tree (illustrated by block 1072 in FIG. 18) in greater detail. First, the translator 13 determines whether more than one query is involved.

This is because once the query is executed against the database, a large number of rows may be returned. The system needs to know which class the search result is for. When a "UNION" operator is involved, that means that there is more than one concrete class which is being queried. Thus, a new column is introduced into the select statement. In one embodiment, the column is simply a number that tells which select statement is being referred to in the result set. Therefore, when a row is returned in the result set, it provides this number so that the translator can determine that this portion of the result set corresponds to a similarly identified select statement which will, in turn, identify the entity that was queried for this information. This number is referred to as the synthesized type indicator.

If the translator determines that only a single query is involved, then the synthesized type indicator column is omitted from the query. This is indicated by blocks 1100 and 1102 in FIG. 18-2. However, if, at block 1100 it is determined that more than one query exists, then a query number is specified as a literal and placed in the synthesized type indicator. This is indicated by block 1104. This is also illustrated in greater detail in Table 1 below.

TABLE 1

--SalesDoc Query
SELECT 0 AS EntityType, sd.*, null, null, null FROM SalesDocTbl AS sd
LEFT JOIN OrderTbl as o ON (sd.SalesDocID = o.SalesDocID)
LEFT JOIN InvoiceTbl as i ON (sd.SalesDocID = i.SalesDocID)
LEFT JOIN QuoteTbl as q ON (sd.SalesDocID = q.SalesDocID)
WHERE o.SalesDocID IS NULL AND i.SalesDocID IS NULL AND q.SalesDocID IS NULL
UNION
--Order Query
SELECT 1 AS EntityType, null, o.*, null, null FROM SalesDocTbl AS sd
INNER JOIN OrderTbl AS o ON sd.SalesDocID = o.SalesDocID
UNION
--Invoice Query
SELECT 2 AS EntityType, null, null, i.*, null FROM SalesDocTbl AS sd
INNER JOIN InvoiceTbl AS i ON sd.SalesDocID = i.SalesDocID
UNION
--Quote Query
SELECT 3 AS EntityType, null, null, null, q.* FROM SalesDocTbl AS sd
INNER JOIN QuoteTbl AS q ON sd.SalesDocID = q.SalesDocID For example, Table 1 illustrates the SQL query results for the inheritance hierarchy illustrated in FIG. 14. It can be seen that the first query is to the SalesDoc entity. The numeral immediately following the word "select" is in the synthesized type indicator column. Since this is the first query, the synthesized type indicator is set to numeral 0. It can also be seen that there is more than one query involved, since there is more than one concrete class in the inheritance hierarchy. The column alias given for the synthesized type indicator is "EntityType".

Next, having assigned a synthesized type indicator, if necessary, the list of columns selected in the present node is added to the select list in the query. This is indicated by block 1106 in FIG. 18-2. This can also be seen by the select list which follows the word "EntityType" in the SalesDoc query in Table 1. The select list is specified in shorthand as "sd.*,null, null, null." This indicates that all columns in the sd (SalesDocTbl) table are to be retrieved. The "null" indicators are set for the columns of the three classes not being queried. The queries are connected together by the "UNION" operator, and the number and types of the columns in selected lists of each statement must be the same. Therefore, the "null" value is set for the non-queried classes to ensure that the statement has the same number of columns as the other statements in the UNIONs.

Next, the table from the least derived entity that has a table is added to the "FROM" clause. This is indicated by block 1108 in FIG. 18-2. The "least derived" entity is the entity furthest up in the inheritance hierarchy. In the example illustrated in FIG. 1, the SalesDoc entity is the least derived entity and its table is thus added to the "FROM" clause.

A join is then added between each of the entity group ancestors that have a table. The join is added on the primary key columns as specified in the O-R mapping. This is indicated by block 1110 in FIG. 18-2. This can also be seen in the example illustrated in Table 1. It should also be noted that the join used to join the table for a base class to the table for a descendent class is specified in the O-R mapping for the descendent class.

Next, restrictions provided by the user are added to the Where clause. This is indicated by block 1112 in FIG. 18-2. Again, Table 1 illustrates a number of restrictions that have been placed in the Where clause. When these restrictions are added, the restrictions are enclosed in parentheses and separated from other restrictions with the Boolean "AND" operator, if necessary.

Having added restrictions specified by the user, restrictions specified by the algorithm are next added to the Where clause. Therefore, the type indicator restrictions are separated for each concrete entity, with an "OR" statement. The result of joining the restrictions with an OR statement is placed in parentheses and added to the Where clause as well, separated by the "AND" operator, if necessary. This is indicated by block 1114.

In order to obtain the type indicator restriction for each concrete entity, the translator traverses up the inheritance hierarchy from the present entity and adds the type indicator for each abstract entity separated by Boolean AND operators. Also, a developer can specify in the O-R map whether a type indicator on a concrete entity applies to derived entities, in which case such type indicators are also added.

If the query specifies a concrete entity that has descendents in a different table, then a left join is introduced to each of the descendent group tables, and a check is added to the "Where" clause for the null primary key for each descendent group's table.

Finally, the completed query statement is saved on a statement list as indicated by block 1116.

By applying this algorithm to the inheritance hierarchy illustrated in FIG. 14, it can be seen that the query for the SalesDoc entity needs to be careful not to return the SalesDoc data for any of its descendent entities. This is achieved, as described above, by left joining to the descendent table and only returning those rows where the descendent tables key field are null (meaning that no data is returned for them).

While each row contains data for an instance of just one class, the SQL query results may have several rows and thus contain any one or all of the classes in the inheritance hierarchy. The additional column having the alias EntityType (the synthesized type indicators) is always selected. As discussed above, it is assigned a constant value that indicates which of the queries in the UNION set produced a given row.

By way of further example, Table 2 shows a translated query for the inheritance hierarchy shown in FIG. 15, and Table 3 shows the query for the inheritance hierarchy shown in FIG. 16.

TABLE 2

--Order Query
SELECT 0 AS EntityType, o.*, null, null FROM OrderTbl AS o
UNION
--Invoice Query
SELECT 1 AS EntityType, null, i.*, null FROM InvoiceTbl AS i
UNION
--Quote Query
SELECT 2 AS EntityType, null, null, q.* FROM QuoteTbl AS q

TABLE 3

-- Query
SELECT sd.TypeDiscriminator, * FROM SalesDocTbl AS sd

In the scenario exhibited in FIG. 16, instances of all four classes are in the same SQL table. Therefore, only one SQL query is generated to read the data.

Also, since all four classes are mapped to the same table, this means that the developer has already (in the schema for example) indicated that the table for the classes will be the same. Thus, the developer must know which type is in the result set. Therefore, the developer must have added a type indicator into the table. It should also be noted that the developer can use as many type indicators as is desired. Since the type indicator is already in the table, the entity type column is not needed.

The present system must also formulate the select statements so that they are compatible with one another. In other words, in SQL, there is a restriction on the "UNION" operator. Select statements can only be combined by this operator if they have the same number and type. For example, a select statement:

Select A, B, C and D can be joined by the operator "UNION" with a select statement:

Select E, F, G and H

Because both have four items in the select list, so long as the data type A is the same the data type E, the type B is the same as the type F, the type C is the same as the type G and the type D is the same as the type H. In other words, the data types in the select list may be "string", "integer", etc. So long as the number of items and the types in the same positions in the select list are the same, the select statements can be joined by the UNION operator.

Result Set Format

It can be seen that when a request is made to retrieve an entity, the request is translated into a SQL select statement which is sent to the relational database store mechanism 14. Store mechanism 14 returns a result set in response to the query. The result set is then processed by data access system 12, and the appropriate entities are created based on knowledge of the original request and data found in the result set.

In order for this to work properly, the query's select list must be constructed such that it produces a structure in the result set that is recognizable by the data accessing system 12. The structure, along with knowledge of the original query (the metadata generated during preparation of the query) allows entity instances to be created from the result set data. If the result set does not arrive in a predictable structure, it is no more than a set of ordinary database columns. However, if the predictable structure is present, an entity graph can be created from the result set.

Figure 22:
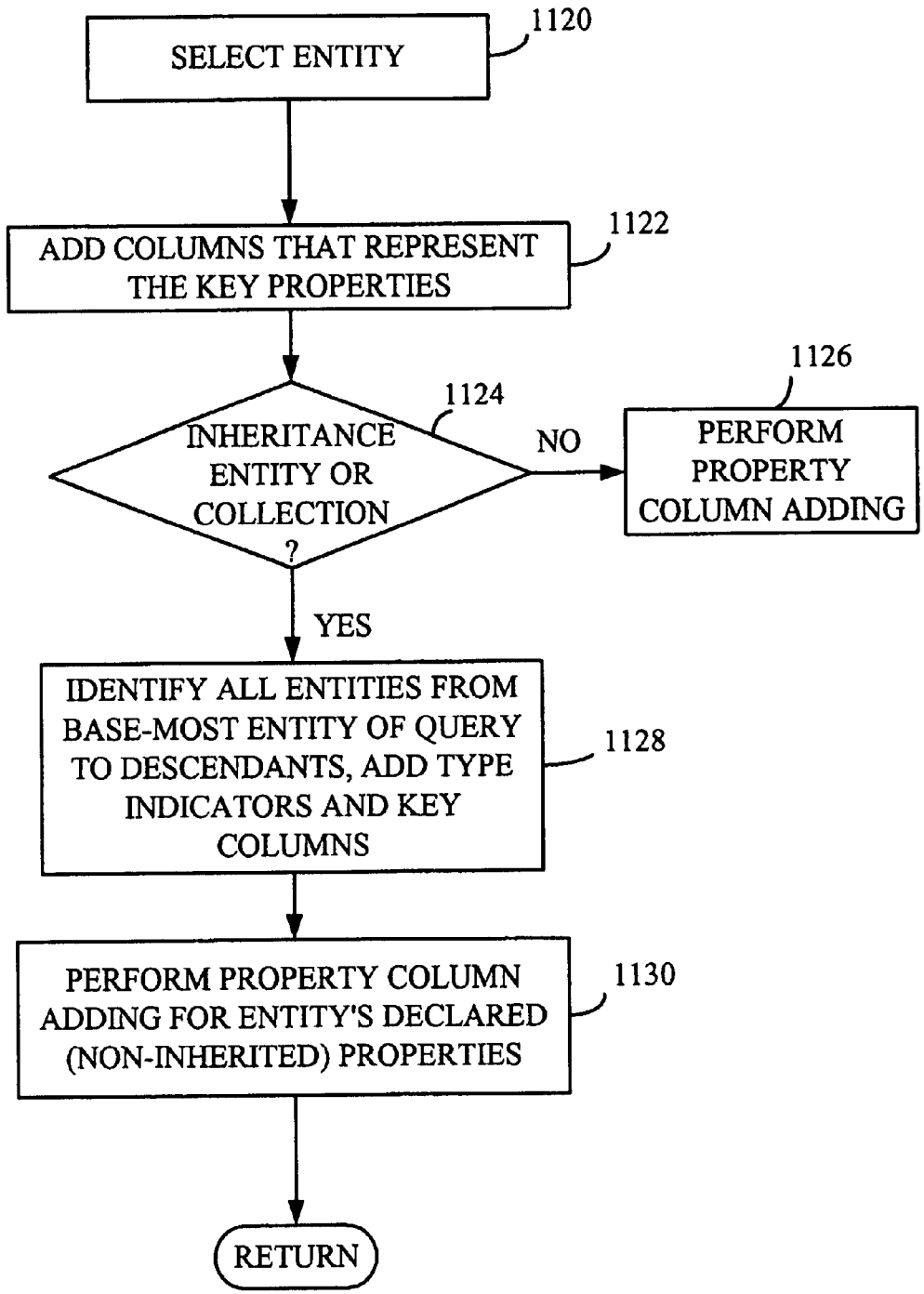
FIG. 22 is a flow diagram illustrating the construction of a query select list to define the structure of the result set expected by the system.

FIG. 22 is a flow diagram illustrating how the select list can be constructed such that it defines the structure of an expected result set for data accessing system 12. It can be seen from the following description that the metadata that reflects the structure of the result set is created while the select list is being constructed. Specific construction of the metadata is not shown since it can be implemented in one of a wide variety of forms. For purposes of the present discussion, it is sufficient to understand that the structure of the result set is represented in some form of metadata which is used later to translate the result set data into an entity instance, and the particular form which the metadata takes is not important.

First, an entity which is being queried is selected. This is indicated by block 1120 in FIG. 22. Next, the columns that represent the key properties in the entity are added to the select list. This is indicated by block 1122.

The translator then determines whether the present entity is one with inheritance or is a collection. This is indicated by block 1124. If not, then the property column adding algorithm illustrated in FIG. 23 is performed as indicated by block 1126.

However, if at block 1124 it is determined that the present entity contains inheritance or is a collection, then all entities from the base-most (least derived) entity of the entity being queried all the way through its descendents are identified, any type indicators specified for the entity in the O-R map are added and the key columns are added. This is indicated by block 1128.

Figure 23:
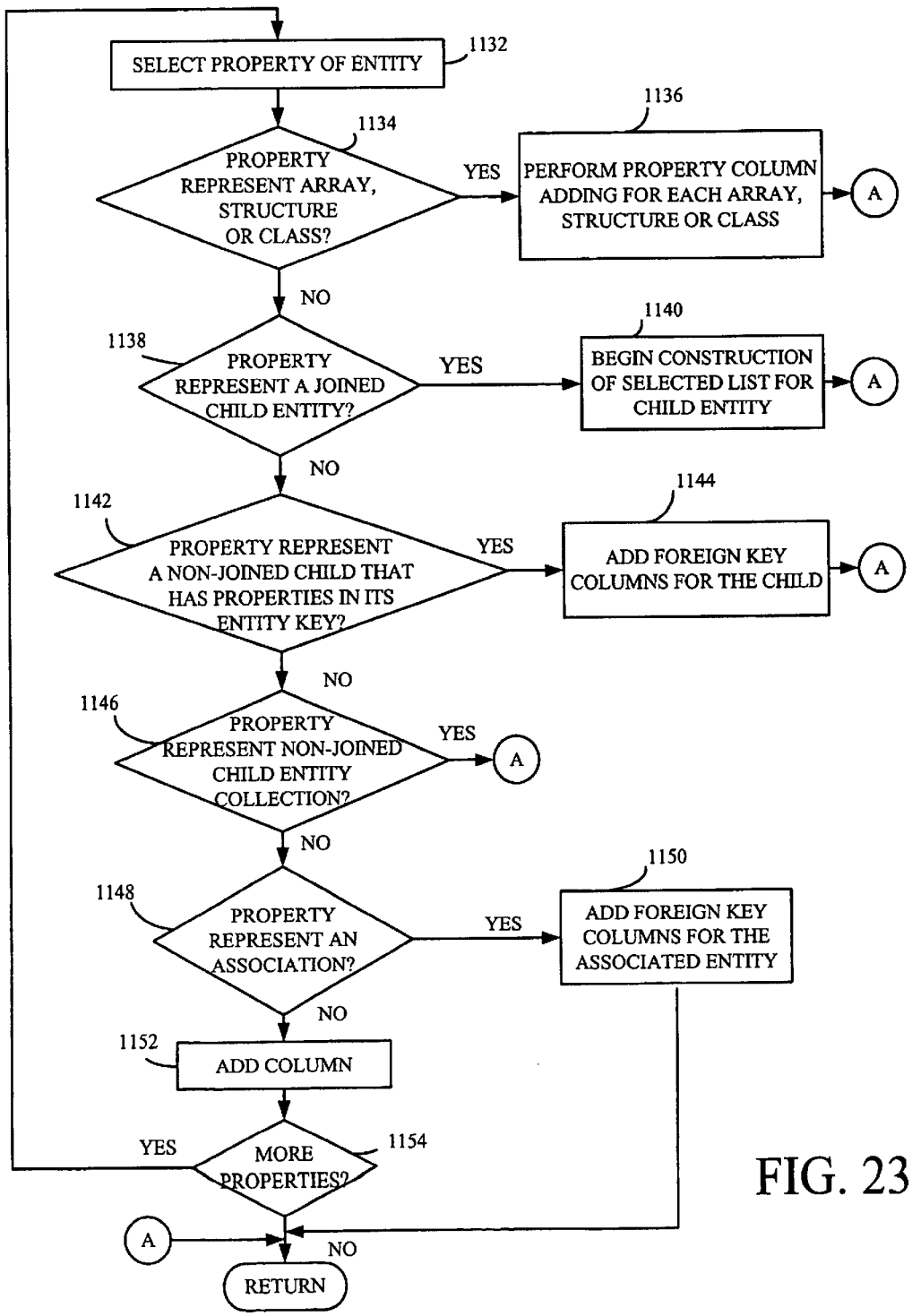
FIG. 23 is a flow diagram illustrating how columns that store data for selected properties are added to the select list.

Having identified all of the entities, the algorithm illustrated in FIG. 23 which performs property column addition to the select list, is, for each entity in turn, performed for each of the identified entity's declared (non-inherited) properties. This is indicated by block 1130.

The property column adding operations performed by the translator are illustrated by the flow diagram in FIG. 23. First, for the current entity, a property of the entity is selected. This is indicated by block 1132. The translator then determines whether the selected property represents an array, struct or class that is not an entity. This is indicated by block 1134. If so, then the property column adding algorithm illustrated by FIG. 23 is performed for each property or element in the array, struct or class. This is indicated by block 1136.

If the property does not represent an array, struct or non-entity class (in this context, a class does not have its own O-R map while an entity does, and the entity map describes its classes map), the translator then determines whether the property represents a joined child entity (that is, an entity that is to be read by the same SQL statement as its parent). This is indicated by block 1138. If so, then construction of a select list for the child entity is begun. This is indicated by block 1140. In other words, the process represented by the flow diagram of FIG. 22 is begun again for the child entity.

If the property does not represent a joined child entity at block 1138, the translator determines whether the property represents a non-joined child (that is, an entity that is to be read in a SQL statement different from its parent) that has properties in its entity key. This is illustrated by block 1142 in FIG. 23. It should be noted that if the child entity has no properties in its key, then no columns are added since the entity is identified through its parent's key. However, if the child does have properties in its entity key, then the foreign key columns for the child are added to the select list. This is indicated by block 1144.

If the property does not represent a non-joined child at block 1142, then the translator determines whether the property represents a non-joined child entity collection. This is indicated by block 1146. If so, no columns are added to the select list. The child entities in the collection are identified through the parent key in the parent. The foreign key is on the child's table and since the parent table is being read, there is nothing to select for the child.

However, if the property does not represent a non-joined child entity collection at block 1146, then the translator determines whether the property represents an association. This is indicated by block 1148. If so, the foreign key columns for the associated entity are added to the select list as indicated by block 1150.

If, at block 1148, the translator determines that the property does not represent an association, then it merely represents a data property and the column(s) for that property are added to the select list. This is indicated by block 1152.

The translator then determines whether there are more properties in the current entity to process as indicated by block 1154. If so, processing returns to block 1132. If not, however, the entity has been fully processed.

Figure 24:
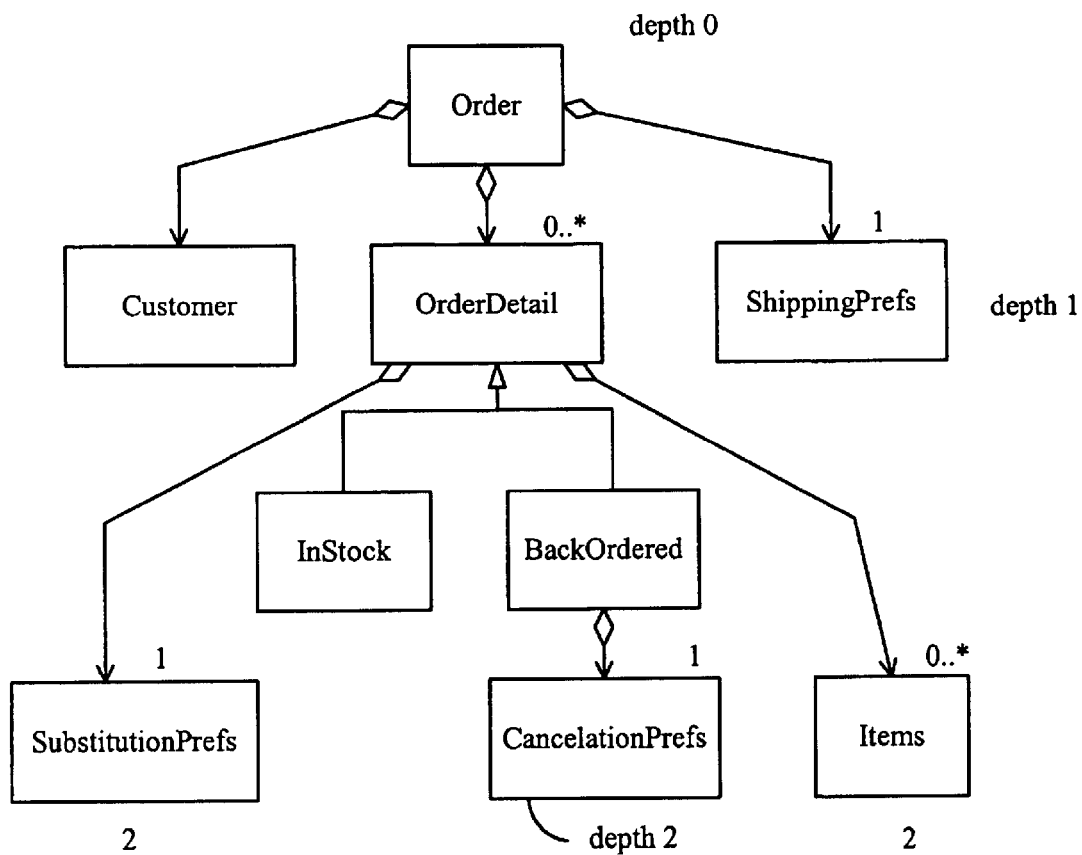
FIG. 24 is a UML diagram illustrating a graph structure to be queried.
Figure 26:
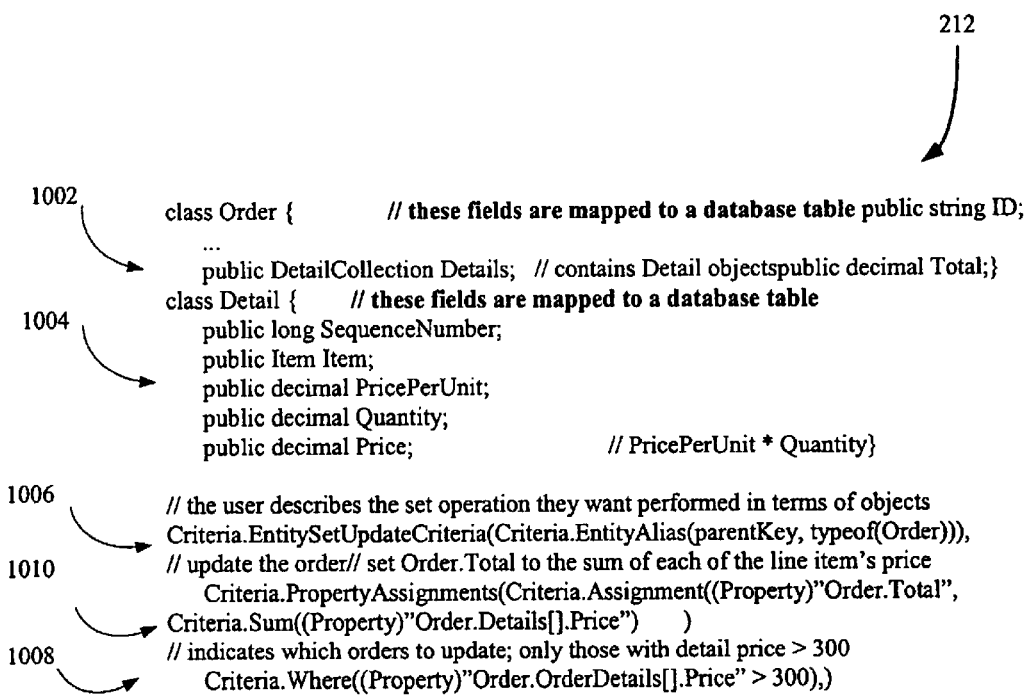
FIG. 26 illustrates a set operation.
Figure 27:
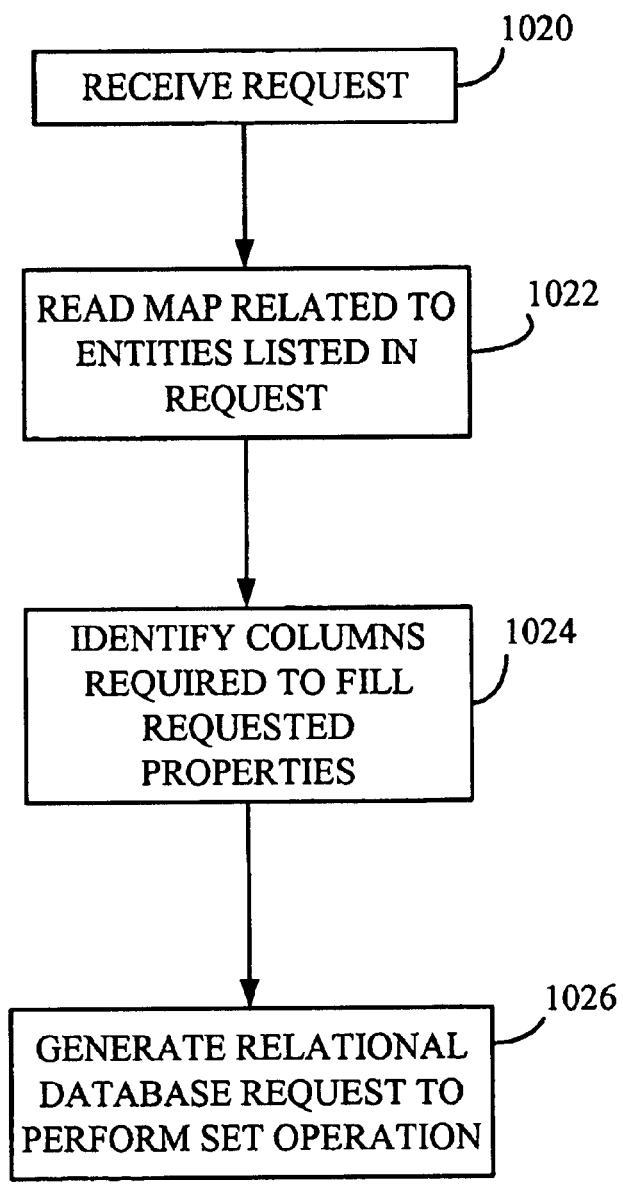
FIG. 27 is a flow diagram illustrating the operation of a set operation.
Figure 28:
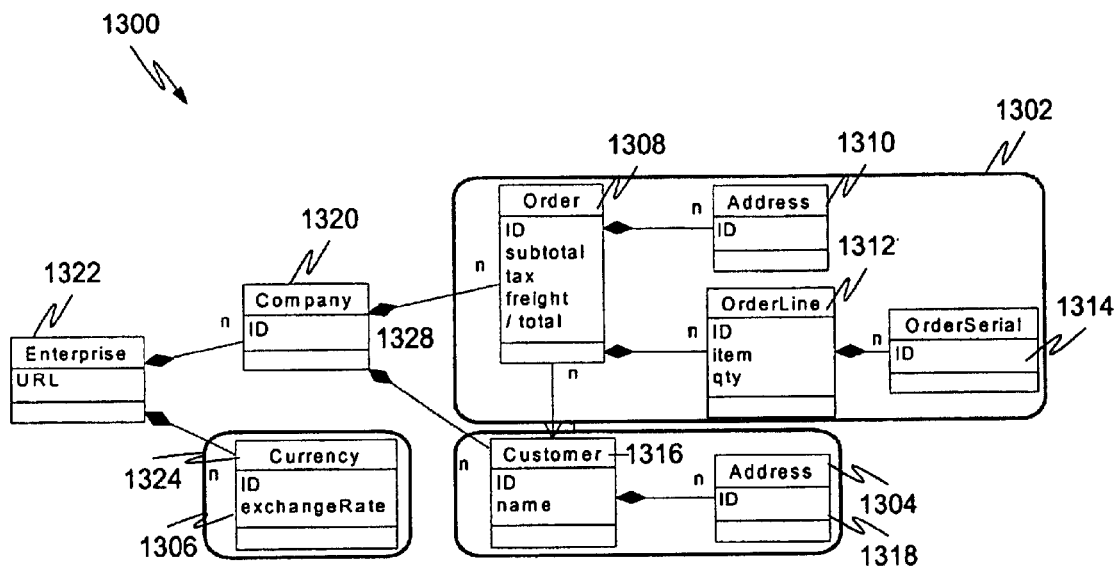
FIG. 28 is a pictorial representation of a containment hierarchy.

FIG. 24 is a UML diagram of a containment hierarchy for an Order entity. Applying the algorithms described with respect to FIGS. 22 and 23 to the diagram of FIG. 24 yields a select list as shown in FIG. 25. FIGS. 25A and 25B illustrate exemplary class definitions, in pseudo-code, for the entity Order and the entity OrderDetail.

Therefore, it can be seen that the translator first adds the key columns, in this case the ID column, for Order to the select list 1160. Next, the translator adds the date column. Then, the translator encounters the Details collection. The translator thus continues to add the columns for the OrderDetaills key fields, in this case ID. The translator then encounters the SubstitutionPrefs class and goes through the process of adding all columns representing SubstitutionPrefs and its properties. Thus, the translator executes the algorithms illustrated in FIGS. 22 and 23 for the SubstitutionPrefs class.

Having completely processed the SubstitutionPrefs class, the translator processes the inheritance entities InStock and BackOrdered and its child CancelationPrefs. In other words, columns identifying the entities and non-inherited properties for all of the entities in the inheritance hierarchy for OrderDetail are added to the select list 1160. Thus, all properties are processed, one entity at a time.

The translator then encounters the Items collection and all columns identifying entities in the Items collection and non-inherited columns for the Items collection are added to the select list. The column for the miscellaneous property is then added. As indicated by the bracket 1162, the entire OrderDetail class has now been processed and its columns have been constructed into the select list 1160.

The translator then continues through the class definition of Order thus placing in the select list the columns for Tax, Subtotal, and Total. The translator then goes back through the algorithms shown in FIGS. 22 and 23 to add all columns identifying the ShippingPrefs class and columns for its properties.

It can thus be seen that the translation algorithm combines all of the containment hierarchy illustrated in FIG. 24 into a single select list that is structured as expected in the result set for data accessing system 12.

In order to create an "order by" clause for the SQL statement, a number of rules are illustratively applied. First, an entity being selected or ordered must have its key fields in the OrderByList unless it is a singleton composition or association as defined by the Unified Modeling Language (UML). If any entity's key consists of multiple fields, they must be grouped together within the "order by" clause. An entity's depth (which refers to the number of compositions or associations required to reach the entity from the entity being queried) determines its position in the "order by" clause. All entities with the depth of zero are be located in the "order by" clause before entities with a depth of one, and so on. The ordering of entities that share the same depth does not matter, except that singleton compositions or associations for that depth are listed prior to collections.

Therefore, again referring to FIG. 24, if the Order entity is being queried, then it has a depth of zero. The ShippingPrefs entity has a depth of the one and the OrderDetail entity also has a depth of one, but it is placed in the "order by" clause after the ShippingPrefs entity, because the ShippingPrefs entity is a singleton. Of course, in the InStock and BackOrdered entities are in an "isA" relationship with OrderDetail, so they also have a depth of one.

The SubstitutionPrefs, CancellationPrefs and Items classes all have a depth of two. However, the Items class is placed in the "order by" clause last because it is a collection.

ResultSet Processing

Having now discussed how to format the select list in a variety of different scenarios so that the relational database query can be executed against the relational database, the way that a result set is processed into an entity (such as in the containment hierarchy diagram shown in FIG. 24) can be discussed.

Recall that, as the select list 1160 in FIG. 25 is created, the metadata describing the entities from which data is being retrieved is generated and saved. Table 4 illustrates an algorithm that can be used to build an entity graph instance given a result set expected by data accessing system 12, and its corresponding metadata.

In the format shown in Table 4, the steps with parenthesized numbers are executed in a fashion similar to subroutines. In other words, after completing them, they return to the programming module that called them. For the steps within each of the "subroutines", execution flow moves to the next line, unless otherwise indicated. Execution begins by performing the steps indicated by (1).

TABLE 4

(1) Build the root entity or entity collection . . .
   a. For the entity or entity collection,
      perform (2).
(2) Reference the result set metadata to determine
   what type of complex data type is being built . . .
   a. If this is an array, struct, or class,
      perform (3).
   b. If this is an entity or entity collection,
      do the following:
         i. If this entity or entity collection is
            being loaded eager non-joined, do the
            following:
               1. Emit an additional query to the
                  database to get the child result
                  set. (At this point, the child
                  result set is processed. When
                  finished with the child result
                  set, we return to where we left
                  off in the parent result set. )
               2. Proceed to step iii.
         ii. If the load of this entity or entity
            collection is deferred, do the
            following:
               1. Attach information to the entity
                  or entity collection to allow an
                  additional query to be generated
                  and executed if this property is
                  accessed later.
               2. Skip the remaining lines of (2).
         iii. If this is an entity, perform (4).
         iv. If this is an entity collection, do
            the following:
               1. Reference the result set metadata
                  to get the type of the
                  collection, and create a new
                  instance of the collection.
               2. Starting on the current row do
                  the following:
                     a. Perform (4) for the entity
                        defined in the row.
                    b. Add the entity to the
                        collection.
                    c. Keep moving to the next row
                        in the result set until you
                        move past the last row, or
                        the entity key value of the
                        entity defined in the row is
                        different from the previous
                        entity, or the entity
                        defined in the row has a
                        different parent than the
                        previous entity (determined TABLE 4-continued from the parent key
      information in the row).
   d. If positioned after the last
      row, or the parent changed,
      or the entity key value of
      the entity defined in the
      row is equal to that of the
      first entity in the
      collection, then the
      collection is built-move
      back to the starting row,
      and proceed to (2)c.
      Otherwise, go back to
      (2)b.iv.2.a.
   (Note: a collection is represented in
   the result set in a range of rows.
   The key columns of the current entity
   and all its parent entities up to the
   root of the current result set are
   referenced to determine if a row is
   within this range. Also, if a
   collection has a child collection
   (direct or indirect) then the values
   of each of the parent collection's
   entities will potentially be
   duplicated across multiple rows. This
   must be taken into account when
   creating the parent collection.)
  c. If this is not the root entity, attach the
    new instance to its parent.
(3) Create an array, struct, or class instance and
  initialize it with the appropriate data from the
  result set . . .
  a. Reference the result set metadata to get
    the type of the array, struct or class, and
    create a new instance of that type.
  b. Populate the properties of the new array,
    struct, or class instance by performing
    (6).
(4) Reference the result set metadata to determine
  if this is an inheritance entity . . .
  a. If this is not an inheritance entity, do
    the following:
     i. Reference the result set metadata to
       get the type of the entity and entity
       key, and create new instances of each.
     ii. Populate the entity key instance by
       performing (5).
     iii. Attach the entity key to the entity.
     iv. Populate the properties of the new
       entity instance by performing (6).
  b. If this is an inheritance entity, do the
    following:
     i Reference the result set metadata and
       the row's type discriminator columns
       to get the type of the entity and
       entity key, and create new instances
       of each.
     ii. Populate the entity key instance by
       performing (5).
     iii. Attach the entity key to the entity.
     iv. For each "fragment" that makes-up of
       this entity type, perform (6). (A
       fragment is a range of columns in the
       result set which represents the
       declared (non-inherited) properties of
       an entity in the inheritance
       hierarchy. The result set will
       contain fragments for all entities in
       the inheritance hierarchy from the
       base-most entity involved in the query
       up to and including all its
       descendents. However, the concrete
       entity that is being instantiated may
       be made-up of a subset of the
       fragments in the result set. Namely,
       the ones that represent the entities
       on the path from the base-most entity
       to the concrete entity.)
(5) Populate the properties of the key . . .
  a. For each property in the key, retrieve the
    value from the result set and assign it to
    the property. (Note: It is possible for a
    key to not have properties.)
(6) Populate the properties (or a subset of the
  properties) of the instance . . .
  a. While populating the properties:
     i. If the property is a simple type (int,
       enum, string, etc.), retrieve the
       value from the result set and assign
       it to the property.
If the property is complex data type, perform (2).

Therefore, assume that a query result has been returned in a plurality of columns from the relational database. Also assume that the metadata corresponding to those query results has been retrieved from memory in data accessing system 12. First, the root entity for entity collection corresponding to the search results is created. This is indicated by (1) in Table 4. For the entity or entity collection, the subroutine identified by (2) in Table 4 is performed.

In that subroutine, the result set metadata is referenced to determine what type of complex data type is being built. If it is an array, struct or non-entity class, then subroutine (3) is performed. In subroutine (3), the array, struct or class instance is created and initialized with the appropriate data from the result set. This is accomplished by referencing the result set metadata to obtain the type of the array, struct or class, and by creating a new instance of that type. The new array, struct or class is then populated with properties by performing subroutine (6).

In subroutine (6), a population of properties takes place. In order to populate the properties, if the property is a simple type (such as an integer, enumerator, string, etc.), the value of the property is retrieved from the result set and is simply assigned to the property in the instance. If the property is a complex data type, then subroutine (2) is performed for that data type.

Under (2)b of Table 4, if the complex data type being built is an entity or entity collection, then two different things can be performed. First, the entity or entity collection may be loaded eager non-joined. In that case, child entities will not have been read by the query the first time around, so another query is created in order to read the child nodes. Once the child result set is retrieved, the child result set is processed and processing continues in the parent result set where it was left off. When that is complete, processing proceeds to step iii under (2).

On the other hand, if under (2)b it is determined that the load of the entity or entity collection is deferred, then information is added to the entity or entity collection in order to allow an additional query to be generated and executed if the property is accessed later. That being the case, the remaining steps in (2) are skipped.

If processing has continued to (2)iii, then it is determined whether the present complex data type is an entity. If so, then subroutine (4) is executed. Similarly, if under (2)iv the present entity is a collection, then, for each entity in the collection, subroutine (4) is performed.

A collection is represented in the result set as a range of rows. The key columns of the current entity and all its parent entities up to the root of the current result set are referenced in order to determine if a row is within this range. Also, if a collection has a child collection, then the values of each of the parent collection's entities will potentially be duplicated across multiple rows. This is taken into account when creating the parent collection.

Assuming that the property is either an entity or an entity collection under (2)iii or (2)iv, then processing proceeds to (4) in Table 2. In that case, the result set metadata is referenced to determine if the present entity is an inheritance entity. If it is not an inheritance entity, then the result set metadata is referenced to obtain the type of the entity and entity key and to create new instances of each. The entity key instance is populated by performing (5) and the entity key is attached to the entity. The properties of the new entity instance are populated by performing (6).

If the current entity is an inheritance entity, then the result set metadata is referenced and the type discriminator columns for the rows which have been returned are also referenced in order to determine the type of entity and entity key, and a new instance of each is created. The entity key instance is populated by performing (5) and the entity key is attached to the entity. For each fragment that makes up each entity type, the fragment is populated by performing (6).

A fragment is a range of columns in the result set that represents the declared (non-inherited) properties of an entity in the inheritance hierarchy. The result set contains fragments for all entities in the inheritance hierarchy from the base-most entity involved in the query up to and including all of its descendents. However, the concrete entity that is being instantiated may be made up of a subset of fragments in the result set; namely, the fragments in the result set that represent the entities on the path from the base-most entity to the concrete entity.

Population of the properties of the entity key (5) is performed for each property in the key. The value of that property is retrieved from the result set and is assigned to the property. Of course, it should be noted that it is possible for a key not to have properties. In that case, no properties are populated.

It can be seen at this point that the full current entity being worked on has now been created from the result set and the corresponding metadata. In order to form a graph, such as that shown in FIG. 24, the current entity must be placed in the graph. Therefore, at (2)c, if the current entity which has just been built is not the root entity, then it is attached to its parent in the graph.

This type of processing is performed for each entity represented in the result set until the full graph is generated. Thus, the newly generated graph can be returned to the client by data accessing system 12.

Set Operations

Another problem that exists with current object-relational systems is that changes to persistent objects are performed one object at a time outside of the database. Thus, in order to change or update a property of a set of objects, each object is brought out of the database, manipulated and sent back one at a time.

EntitySetUpdateCriteria 212 addresses the aforementioned problem. EntitySetUpdateCriteria 212 allows the developer to express updating a set of objects in terms of properties of the objects. Referring to FIG. 1, the request is formulated at 30. The request 30 is provided to the data access system 12, which translates request 30 to a suitable relational database request 32 that can be executed by the relational data store mechanism 14. In one embodiment, the relational data store mechanism 14 executes within the computer having the relational database 16, or with fast access thereto, such that the corresponding columns for each of the properties requested in request 32 can be updated or otherwise changed without the need for other components of the system, such as data access system 12, to receive the corresponding data.

FIG. 14 illustrates an example of EntitySetUpdateCriteria 212. Like the AdHocQueryCriteria 210, EntitySetUpdateCriteria 212 includes portions 1002 and 1004 that define the classes, herein "Order" and "Detail", respectively, having fields which are mapped to corresponding database tables. In particular, these two business objects (or entities) are mapped to the database tables by maps stored at 18 in FIG. 1. In portion 1006, the developer states the set operation he/she wants performed in terms of objects, herein EntitySetUpdateCriteria. Portion 1008 defines the set to be updated via the alias and "Where" expression, while portion 1010 defines properties to be updated and provides new values for these properties via value expressions.

The developer defines a set to be updated by providing the alias via Criteria.EntityAlias. In the illustrative example of FIG. 14, the objects of the "Order" class will be updated. The "Parent Key" provides a unique ID for the parent of the class of objects to be updated, which defines the scope of the objects to be updated.

The "Where" statement is similar to the "Where" statement as provided in AdHocQueryCriteria 210 illustrated in FIG. 6 and includes typically expressions referencing object properties in order to define the set of objects that will be updated. In this example, only those orders having a detail with price greater than 300 will be updated.

The "PropertyAssignments" statement specifies a list of one or more objects. Each item in the list defines a property of the object to be updated and specifies an expression for the new value of the object.

As indicated above, new values for updating properties are specified via expressions. Expressions were discussed above in more detail, but in summary are composed from properties, constants and operators. In addition, aggregate functions can also be implemented in the expression. In the example illustrated in FIG. 14, "Criteria.Sum" adds all the details prices for the order and enters the new value in the "Order.Total" property. Other aggregate functions that are supported include finding the maximum value in a set, finding the minimum value in a set, or computing the average value. As appreciated by those skilled in the art, other set computations could also be implemented.

It should be noted that references can be made to related objects for performing operations on sets. For example, properties of parent objects can be references when updating lower-level (child) objects. Likewise, one can also reference indirect relations, such as grandchildren, or associated or child objects of parent objects.

EntitySetUpdateCriteria is an example of a set based operation specified in terms of object properties. In the illustrated example, it sets the value of a property to the value of a sum expression in terms of other properties. Other set based operations, which can be performed by relational data store mechanism 14 without retrieving data pertaining to the objects individually and passing the data to data access system 12, include removing a set of objects as a unit, moving a set of objects from one location to another (an example is moving General Ledger transactions from the ledger table to a history or archive table), or copying a set of objects from one location to another. Generally, the set operation is performed in terms of types of classes of objects identified with statement such as "EntityAlias" and where the "Where" expression defines the set of objects of the class, and an action (e.g. updating, moving, deleting, copying) is then defined by a statement similar to Property.Assignments.

The steps involved in performing a set operation such as EntitySetUpdateCriteria are illustrated in FIG. 15. At step 1020, a set operation request is made by passing a corresponding set operation criteria such as EntitySetUpdateCriteria to the data access system 12. Data access system 12 reads the corresponding map 18 at step 1022 to identify the columns effected by the properties mentioned in "PropertyAssignments" at step 1024. A suitable relational database request 32 such as a SQL UPDATE statement is then provided to relational data stored mechanism 14 at step 1026 to implement the desired set operation.

Containment Hierarchy

Figure 29:
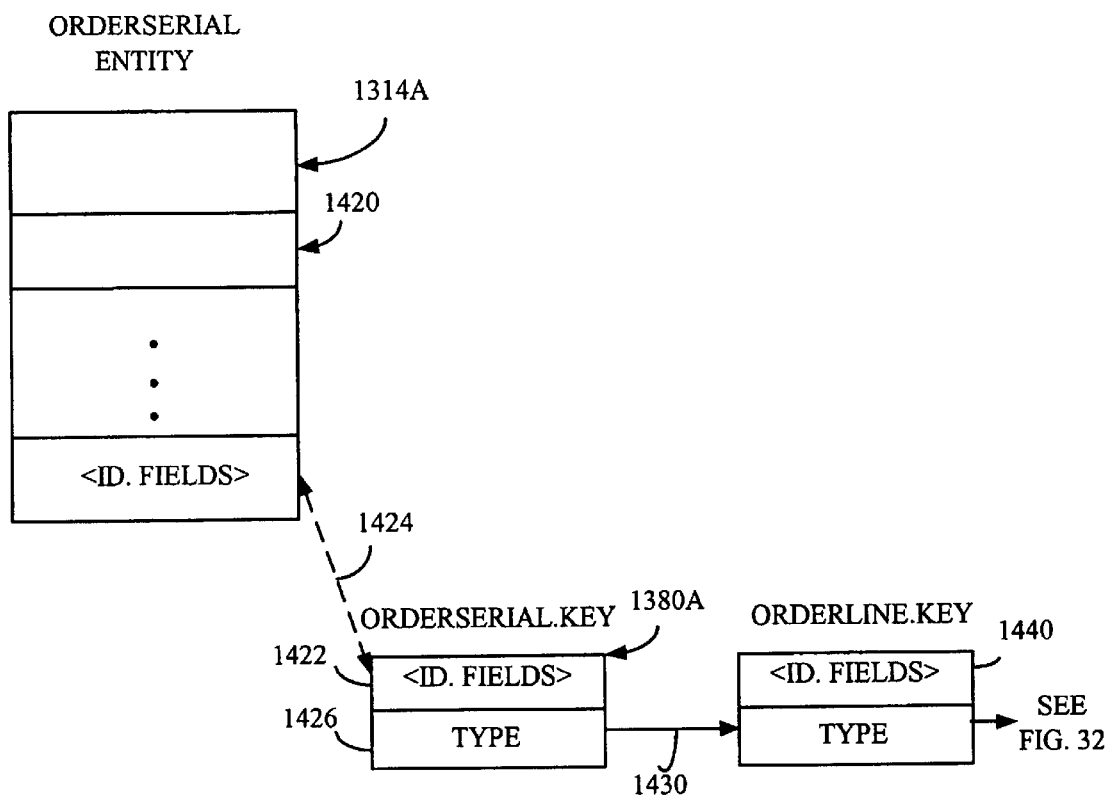
FIG. 29 is pictorial representation of an entity and an entity key.

FIG. 29 is an example of a hierarchical structure 1300 of an exemplary application comprising objects or entities. As illustrated, entities can be organized as components 1302, 1304 and 1306, which can comprise one or more entities. A component, as used herein, is one or more entities grouped together to achieve a common purpose. Although modules implementing the present invention may not include references to components, a developer may want to design the application with components in mind.

In the exemplary embodiment, the entities or objects are organized in a parent/child relationship. Component 1302 includes those entities that constitute an Order for a company. In particular, an Order entity 1308 includes information such a subtotal, tax, freight and total properties. An Address entity 1310 is a child entity of the Order entity 1308 and may include information pertaining to the shipping address for a specific order. Likewise, the Order entity 1308 may include a number of OrderLine entities 1312, while each OrderLine entity 1312 can comprise one or more OrderSerial entities 1314 having further information. It should be noted that the notation "n" in FIG. 29 is used to indicate that the particular entity could comprise a number of identically structured entities. For example, as indicated above, one or more OrderSerial entities 1314 can be a child entity(indicated by the diamond line) of an OrderLine entity 1312.

In the example herein illustrated, component 1304 generally pertains to Customer information and includes a Customer entity 1316, where each Customer entity 1316 can include one or more Address entities 1318.

The Customer entities 1316 and the Order entities 1308 are each child entities of a Company entity 1320, the set of which comprise child entities of an Enterprise entity 1322. Component 1306 comprising, in this example, one or more currency entities 1324 is also a child of the Enterprise entity 1322.

Besides the parent/child hierarchy of structure 1300, there also exists, in this example, a uni-directional association between classes of entities. A class is a set of similarly structured entities. As indicated above, all of the Order entities 1308 fall within an Order class. Likewise, the Customer entities 1316 pertain to a Customer class. The association indicated by arrow 1328 denotes that a class may know of another class. In this example, the Order class knows about the Customer class, but does not incorporate or own it such as in the case of a parent/child relationship.

Entity Key

An entity manages data. The entity preserves its internal data and the integrity of its relationships with other entities. Data of the entity is accessed through properties. Each entity is a form of an abstraction. Characteristics of an entity also include that it has an identity, represented by a subclass of an abstract class "EntityKey". Within the overall hierarchy, each entity that manages data in structure 1300 is location independent in that it does not know where it is stored or who owns it. However, the EntityKey is used to define its relationship with other entities and can be thought of as being represented by the connections in FIG. 29.

An instance of an entity may be contained within an instance of another entity. The contained entity is called the child, while the container is called the parent. A child instance cannot exist longer than its parent and must have one and only one parent. The set of all such relationships for an application is its containment hierarchy. This sort of hierarchy parallels many business applications. It has been found that supporting this hierarchy makes the system a better fit for developers in constructing business applications.

FIG. 29 is an example of a containment hierarchy for an application. The containment hierarchy describes the types of entities and their corresponding parent-child relationships. There is a root of the containment hierarchy, herein illustrated as the "Enterprise" container 1322. The root container or entity commonly supplies the address of a server for the containment hierarchy, although classes or instances can be located on other servers or computer readable media. In one embodiment, the root entity supplies the URL (Universal Remote Locator) of the server. In this embodiment, another broad class of containers are the Company entities 1320.

It should be noted that the containment hierarchy is not the same as an inheritance hierarchy. Inheritance hierarchy is a classification of relationships in which each item except the top one is a specialized form of the item above it. In the example of FIG. 29, the Order class 1308 and the Customer class 1316 are not specialized forms of the Company class 1320. Rather, the Order class 1308 and the Customer class 1316 are different classes holding different types of information. This is not to say inheritance can not be present in the Containment Hierarchy. In some embodiments, an inheritance hierarchy may be present for any class. Thus, for example there can be variations within a class such as variations of the Customer class 1316

There are three forms of entities in an application. The forms include the component containers "Enterprise" 1322 and "Company" 1320, primary entities and supporting entities. The primary or root entity is the focus of a component container of the same name, while supporting entities are either children of the primary entity or its peers. For example, the Order component 1302 consists of the Order root entity 1308, while the Address 1310, OrderLine 1312 and OrderSerial 1314 are supporting entities. The data for entities is usually stored in database tables such as described above with respect to FIG. 1. Components are a unit of logical design and do not interact with the database.

As indicated above, each of the properties in an entity 20 is mapped to a corresponding entity table 26 and a specific column 28 in a given entity table 26 as illustrated in FIG. 1. Each entity table also includes, in addition to columns for the attributes, one or more columns that identify all the parents of a particular entity. Referring to FIG. 34 and using OrderSerial by way of example, the OrderSerial Table 1350 would include columns for identifiers, in particular, "Company_id" 1352, "Order_id" 1354, OrderLine_id 1356 and Serial Number 1358, which may comprise one of the attributes, and which may function as its own identifier (id).

In a relational database, interaction with the table would require specifying each of the identifiers in order to identify and work with the data associated with a particular entity, in this example, data associated with a specific OrderSerial entity 1314. However, this information is inferred from its parent in the containment hierarchy. For instance, if one is working with a particular OrderLine entity 1312 and now wants to inquire about, or perform an action upon, a OrderSerial entity 1314, the data access system 12 can ascertain which OrderSerial entity or entities the user is referring to without needing to reidentify the parents of the entity. In the present invention, the containment hierarchy allows the relationship of the tables (i.e., the identifiers such as illustrated in FIG. 34), and hence, the relationship of the entities, be an implicit background piece of information. In other words, the identity of the entity is inferred from parent/child relationship so that it doesn't need to be restated or managed in other ways. In a relational database system, the identifiers found in the tables used to identify the entity are called a primary key, wherein the combination of the identifiers is unique. However, typically, primary keys are just a collection of columns and have no rich behavior attached to them. In addition, user selected identifiers may only be unique within a certain scope (such as a single business unit) and not unique over the entire range of the application. Surrogate keys, which are commonly generated by the application and hidden from the user, may be unique, but they do not describe hierarchies such as who is the parent of the entity referred to by the identifier.

Another aspect of the present invention is an EntityKey that solves these problems, in particular, the EntityKey associated with each entity allows each entity to be unique throughout the containment hierarchy, as well as infer from the position of the entity within the containment hierarchy who the parents are. An entity is an object that is identified by an entity key, or stated differently, the key for an entity. An EntityKey serves the same function as the primary key on a relational table; however, unlike a relational primary key it is universally unique across the application space and is hierarchical, i.e. it is aware of its position in the hierarchy. In the architecture, the EntityKey is a defined class that is distinct from the entities. The EntityKey class can be mapped to a relational database table in a manner similar to entity 20, class-table mapping 18 and entity table 26. Every entity throughout the hierarchy has one and only one EntityKey value. Given the key for an entity, one can retrieve the entity, whether it is on a local server, or located in a wide area network such as the Internet.

Figure 30:
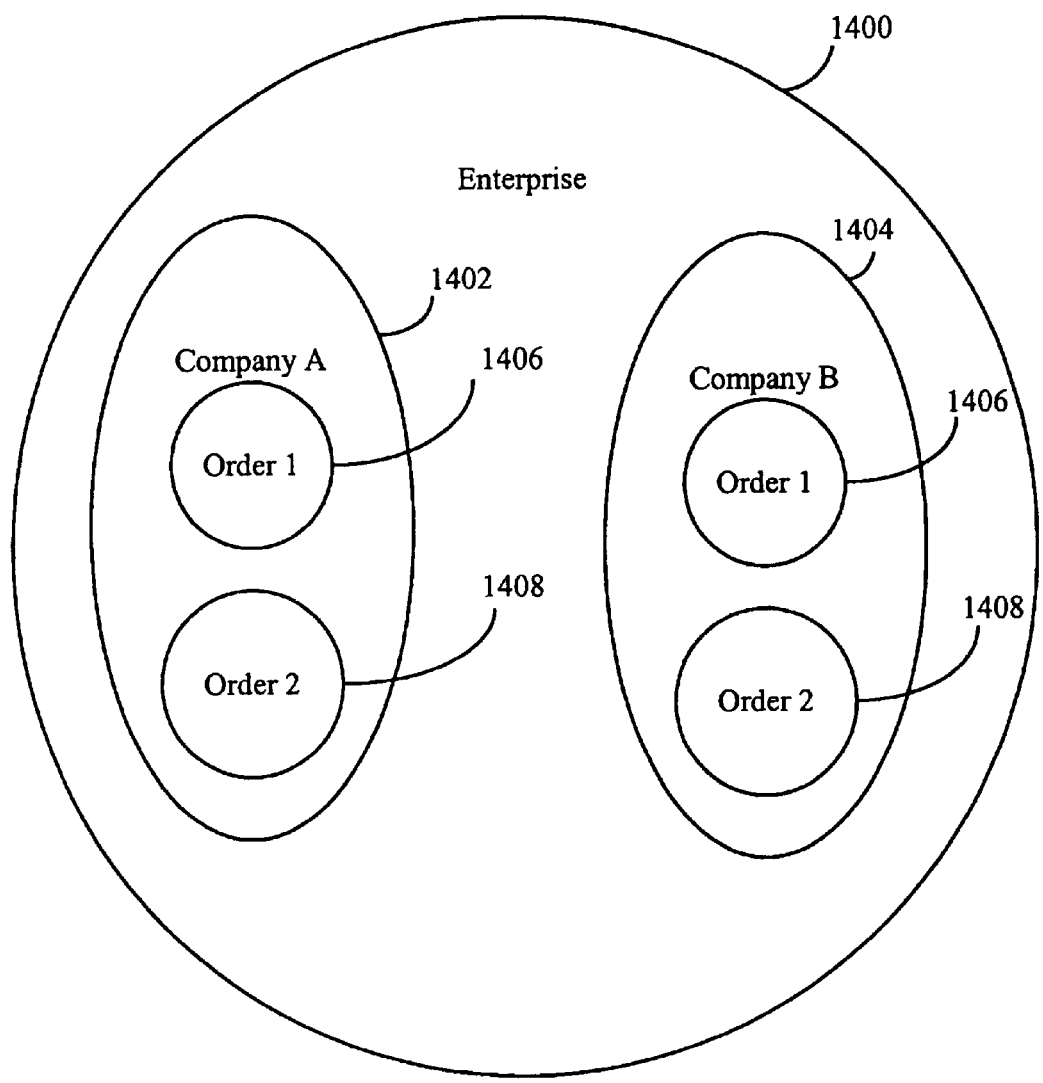
FIG. 30 is a pictorial representation of a business application.

Each EntityKey contains, for purposes of this concept, three pieces of information: the type or class of the entity to which it refers, the ID of that entity to which it refers and information as to the EntityKey of the parent to that entity. FIG. 30 is a pictorial representation of an EntityKey (herein, OrderSerial.Key) 1380 A for a particular OrderSerial entity 1314 A.

Figure 31:
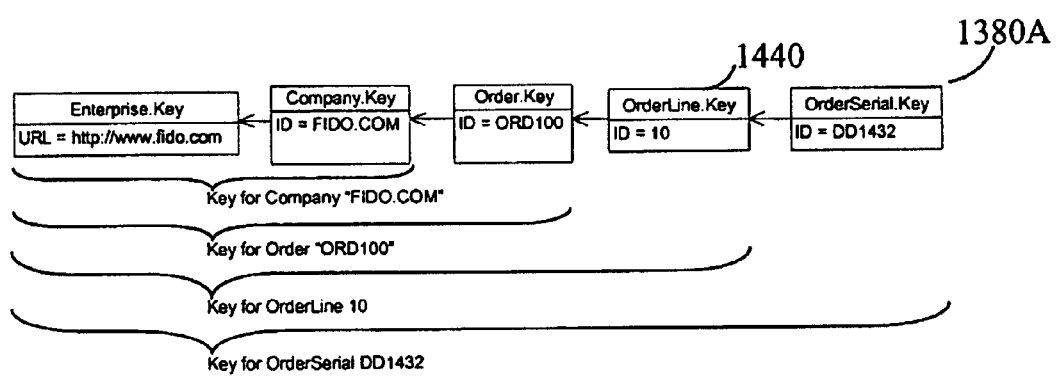
FIG. 31 is a pictorial representation of an entity key.

An entity in the hierarchy is fully identified by its identifier plus that of its parents. In this manner, the same local identifier can be used in two or more locations of the overall space because different parents would be involved in uniquely identifying the entity. This may be more readily apparent by pictorially representing the Enterprise space of FIG. 29. Referring to FIG. 31, the Enterprise is indicated by circle 1400. The Enterprise 1400 can include a plurality of companies, herein Company A 1402 and Company B 1404. However, each Company 1402 and 1404 can have two Orders, both having the same identifier, herein "Order 1" 1406 and "Order 2" 1408. Nevertheless, entities within Company A 1402 would still be uniquely identified with respect to entities of Company B 1404 although the identifiers for Order 1 1406 and Order 2 1408 have been used within each Company because each of the entities is uniquely identified by its associated key having the parent/child relationships of the hierarchy.

It should be noted that in many applications, the data for Company A is stored in a completely different database then the data for Company B.

There is also a separate, independent class associated with OrderSerial 1314 herein identified as OrderSerial.Key. In general, the EntityKey is of a separate class than the class it refers to. Entity 1380 A is an example of an object of the OrderSerial.Key class. Referring back to FIG. 30, the OrderSerial entity 1314 A contains all the attributes 1420 relevant to the Order Serial, which could be any number of attributes. The OrderSerial.Key 1380 A contains a subset of one or more attributes of the OrderSerial entity 1314 A specifically, the OrderSerial.Key includes identifier attributes 1422. Thus, if OrderSerial entity 1314 A includes a thousand attributes, but two of the attributes make each OrderSerial entity unique, those attributes get copied into the OrderSerial.Key to form the identifier back to the entity. Arrow 1424 represents the common identifier attribute or attributes between entity 1314 A and entity 1380 A.

The attribute or attributes of the OrderSerial.Key that make each entity of OrderSerial unique is the first element of an EntityKey, which thereby allows the key to be associated with a particular entity.

A second element of an EntityKey is the type 1426 of the entity to which it has an identifier. In the present example, the type of the class is OrderSerial.

A third element of an EntityKey is information about the EntityKey of the parent of the entity. In the present embodiment, this information is a reference, indicated by arrow 1430, to the parent key 1440 corresponding to the parent of entity 1314 A. In other words, the third element could be a reference to another key. This structure makes EntityKeys recursively defined However, it should be understood that some or all of the parent key information could be stored in the EntityKey directly, if desired. It should be understood that these forms and other similar forms for storing and accessing EntityKey information is intended to be covered herein.

Figure 32:
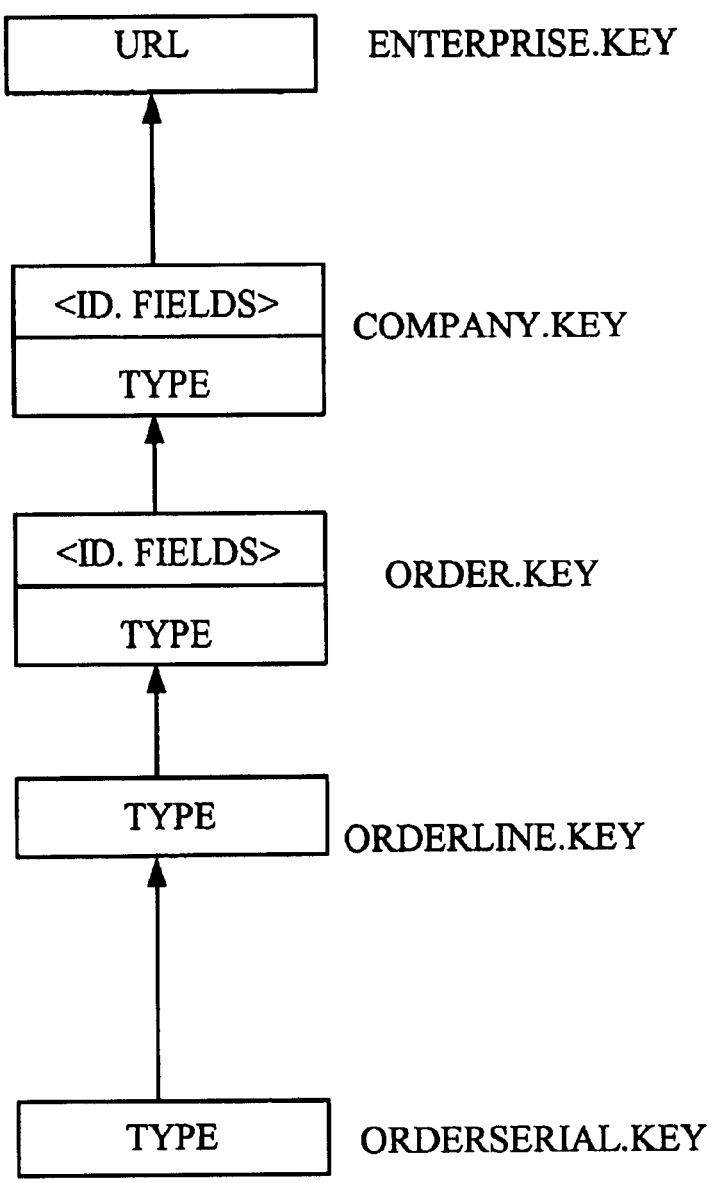
FIG. 32 is a pictorial representation of a blended key.

Referring now to FIG. 32, EntityKeys are provided for an entity of Company, an entity of Order, an entity of OrderLine and entity of OrderSerial. In this example, the ID constitutes one field and the type can be ascertained from the name of the key. For example, type OrderSerial is obtained from the name OrderSerial.Key. References to parent keys are illustrated by arrows. Thus, again, the location of an entity in the hierarchy is completely defined by the associated EntityKey.

In the recursive form of storing EntityKeys, it should be noted that although each EntityKey includes type or class information to which it pertains it does not know the type or class of its parent. That information is found by looking at the type information in the parent key that it references. This is a particularly advantageous feature for it allows classes to be reused throughout the containment hierarchy. Referring back to FIG. 29, it is illustrated that the Order class 1302 has a child class of Address 1310. Likewise, the Customer class 1316 also has a child class of Address 1318. The Address classes 1310 and 1318 are actually conceptually the same; but the instances are disjoint since they are under different parents. However, the entities are uniquely defined in each form of Address class, wherein each Address class 1310 and 1318 may be stored in a different database table. In this manner, one can describe a position in the containment hierarchy without forcing a class to forever be in that position.

As explained above, each EntityKey has information such as a reference to its parent key, but it does not know what type of parent it is. The decision of what type of parent is made or defined by the mapping(s) 18 illustrated in FIG. 1 for the complete set of classes and tables.

The set of identifiers 1422 as illustrated in FIG. 30 of an EntityKey corresponds to the primary key columns of a table holding the data for that entity. Referring to FIG. 34, assume that the primary key of the table holding OrderSerial entities is Company_ID 1352, Order_ID 1354, OrderLine_ID 1356, and Serial Number 258. The identifier attribute 322 in the OrderSerial.Key 280A is mapped directly to the last of the primary key columns, while the parent keys of 280A are mapped to columns 252, 254, 256 in a similar fashion. This EntityKey to database key correspondence also extends to foreign keys. All simple associations between entities are implemented using keys. For example, in FIG. 29, Order-.Key would have a reference of type Customer.Key that implements the association from Order to Customer. This key can easily be mapped to the Customer foreign key in the Order table.

It should also be noted that tables are commonly designed with surrogate rather than intelligent keys. An intelligent primary key is seen and specified by the end user, while a surrogate primary key is generated by the application and hidden from the user. Surrogate keys are often used to allow renaming the user visible identifier of a table without database impact or to save space when the size of the primary key is very large and often referenced in foreign keys. When surrogate keys are used, the table will have the surrogate primary key and an alternate key having the user visible identifier.

Both intelligent and surrogate EntityKeys are supported. In the present embodiment, if a surrogate EntityKey is used its ID properties are private (since they are generated and hold ho meaning to the consumer of the entity); otherwise they are public.

Class Key

A second related abstraction is the Class Key. Since a given entity can be used in more than one place in the containment hierarchy, there is a mechanism for indicating which node in the hierarchy to process. The Class Key is that mechanism and contains two pieces of information: the type of the entity to which it refers and information as to the Class Key of the parent of the entity. Note the similarity to the definition of the EntityKey. In fact, the EntityKey is a derivative of and inherits from the Class Key, thereby allowing an EntityKey to be supplied anywhere a Class Key is required. Thus the Class Key is also hierarchically defined. The illustration of FIG. 32 of an EntityKey can be changed into an illustration of a Class Key by simply removing the entity identifiers (IDs).

Generally the Class Key can be used to reference a node in the containment hierarchy as it pertains to classes of entities, particularly describing uniquely a name for each class in the hierarchy as well as its position in the hierarchy. In contrast, the EntityKey provides a unique name for each entity in the containment hierarchy and describes its position in the hierarchy.

The EntityKeys and Class Keys are used when performing create, read, update and delete operations on business objects or entities. For example, when reading an entity, a parent key referring to a component container should be provided. This provides a scope for the read and also makes it easier for the developer to specify a complex location in the hierarchy.

Figure 33:
FIG. 33 is a pictorial representation of a database table.

Besides EntityKeys and Class Keys, another form of key is a blend between these keys. As discussed above, an EntityKey is a form of a Class Key, but includes further information to a particular entity (i.e., its identifier attributes). By simply using a chain of Class Keys followed by Entity Keys, all the entities under a particular parent can be ascertained. FIG. 33 illustrates an example of a blended key 1544. In this example, EntityKeys have been provided for the Enterprise, Company and Order, which in turn has specified a particular Order entity. However, since the OrderLine.Key and the OrderSerial.Key do not include Ids, they are Class Keys. The blended key 1544 of FIG. 33 could be received by the data access system 12 to formulate a query for data store mechanism 14 to retrieve all series for a particular order, irrespective of line.

Although the present invention has been described with reference to particular embodiments, workers skilled in the art will recognize that changes may be made in form and detail without departing from the spirit and scope of the invention.

What is claimed is:

1. A computer-implemented method of constructing a relational database select list from a query expressed in terms of entities, comprising:

selecting an entity or entity collection to be queried;

adding columns representing identifier properties of the selected entity or entity collection to the select list; and if the selected entity or entity collection involves inheritance, then identifying entities from a least derived entity corresponding to the selected entity or entity collection to all descendants, and adding columns representing the identifiers of the identified entities to the select list;

adding columns representing non-inherited properties for the identified entities to the select list;

and further comprising:

if the selected entity or entity collection does not involve inheritance, then adding columns representing properties of the selected entity or entity collection to the select list.

2. The method of claim 1 wherein adding columns representing properties comprises:

determining whether a selected property represents a multi-column unit; and if so, adding columns associated with the multi-column unit to the select list.

3. The method of claim 2 wherein the multi-column unit represents at least one of an array, struct, class or entity.

4. The method of claim 1 wherein adding columns comprises:

selecting a property from the selected entity or entity collection to be queried;

determining whether the selected property represents a joined child entity of the selected entity or entity collection; and if so, generating a select list for the joined child entity and combining the select list for the joined child with the select list for the selected entity or entity collection.

5. The method of claim 1 wherein adding columns comprises:

selecting a property from the selected entity or entity collection to be queried;

determining whether the selected property represents a non-joined child entity collection; and if so, adding nothing from the non-joined child entity collection to the select list.

6. The method of claim 1 wherein adding columns comprises:

selecting a property from the selected entity or entity collection to be queried;

determining whether the property represents an associated entity; and if so, adding identifier columns of the associated entity to the select list.

7. The method of claim 1 and further comprising:

storing metadata associated with the select list, the metadata describing how columns in the select list relate to the selected entity or entity collection being queried.

8. A computer readable medium storing instructions that cause a computer to construct a relational database select list from a query expressed in terms of entities, by performing the steps of:

selecting a unit, that comprises an entity or entity collection to be queried;

adding columns representing identifier properties of the selected unit to the select list; and if the selected unit involves inheritance, then identifying entities from a least derived entity corresponding to the selected unit to all descendants, and adding columns representing the identifiers of the identified entities to the select list;

adding columns representing non-inherited properties for the identified entities to the select list;

and further comprising: if the selected unit does not involve inheritance, then adding columns representing properties of the selected unit to the select list.

9. The computer readable medium of claim 8 wherein adding columns representing properties comprises:

determining whether a selected property represents a multi-column unit; and if so, adding columns associated with the multi-column unit to the select list.

10. The computer readable medium of claim 8 wherein adding columns comprises:

selecting a property from the selected unit to be queried;

determining whether the selected property represents a joined child entity of the selected unit; and if so, generating a select list for the joined child entity and combining it with the selected list for the selected unit.

11. The computer readable medium of claim 8 wherein adding columns comprises:

selecting a property from the selected unit to be queried;

determining whether the selected property represents a non-joined child entity collection; and if so, adding nothing from the non-joined child entity collection to the select list.

12. The computer readable medium of claim 8 wherein adding columns comprises:

selecting a property from the selected unit to be queried;

determining whether the property represents an associated entity; and if so, adding identifier columns of the associated entity to the select list.

13. The computer readable medium of claim 8 and further comprising:

storing metadata associated with the select list, the metadata describing how columns in the select list relate to the selected entity being queried.

* * * * *